US006983426B1

(12) United States Patent
Kobayashi et al.

(10) Patent No.: US 6,983,426 B1
(45) Date of Patent: Jan. 3, 2006

(54) METHOD AND APPARATUS FOR DISPLAYING CONTENT IN AN ARRAY HIERARCHICAL STRUCTURE

(75) Inventors: Motoki Kobayashi, Chiba (JP); Reto Wettach, Tokyo (JP)

(73) Assignee: Sony Corporation, Tokyo (JP)

( * ) Notice: Subject to any disclaimer, the term of this patent is extended or adjusted under 35 U.S.C. 154(b) by 789 days.

(21) Appl. No.: 09/689,092

(22) Filed: Oct. 12, 2000

(30) Foreign Application Priority Data

Oct. 28, 1999 (JP) ............................... P11-306647

(51) Int. Cl.
*G06F 3/00* (2006.01)
*G06F 9/00* (2006.01)
*G06F 17/00* (2006.01)

(52) U.S. Cl. .................... 715/854; 715/765; 715/841
(58) Field of Classification Search ................ 345/841, 345/840, 837, 835, 830; 715/503, 854, 765
See application file for complete search history.

(56) References Cited

U.S. PATENT DOCUMENTS

| 5,623,613 A | * | 4/1997 | Rowe et al. ................ 345/841 |
| 5,704,051 A | * | 12/1997 | Lane et al. ................. 345/855 |
| 5,787,417 A | * | 7/1998 | Hargrove ........................ 707/4 |
| 6,065,022 A | * | 5/2000 | Ueki ........................... 715/503 |
| 6,262,722 B1 | * | 7/2001 | Allison et al. ................ 725/39 |
| 6,292,812 B1 | * | 9/2001 | Hacker ........................ 715/506 |

OTHER PUBLICATIONS

Shneiderman, Ben. Designing the User Interface. Reading, MA: Addison Wesley Longman, 1998, p. 259.*
Excel 5.0 For Windows. Danvers: Star Series, 1995, pp. 2 and 14.*

* cited by examiner

Primary Examiner—Raymond J. Bayerl
Assistant Examiner—Namitha Pillai
(74) Attorney, Agent, or Firm—Bell, Boyd & Lloyd LLC

(57) ABSTRACT

An information processing apparatus includes a first display controller, an icon-specifying device and a second display controller. The first display controller controls a display of first icons on a first hierarchical layer, second icons on a second hierarchical layer at a level lower than the first hierarchical layer, so as to exhibit an array of the first icons as a column or a row on a screen and an array of the second icons as another column or another row on the screen according to the size of a display area on the screen. The second display controller changes the array hierarchical structure displayed on the screen so as to display third icons to replace the second icons in the array hierarchical structure on the screen, and display the second icons to replace the first icons when one of the second icons in the array hierarchical structure is specified.

9 Claims, 33 Drawing Sheets

FIG.17

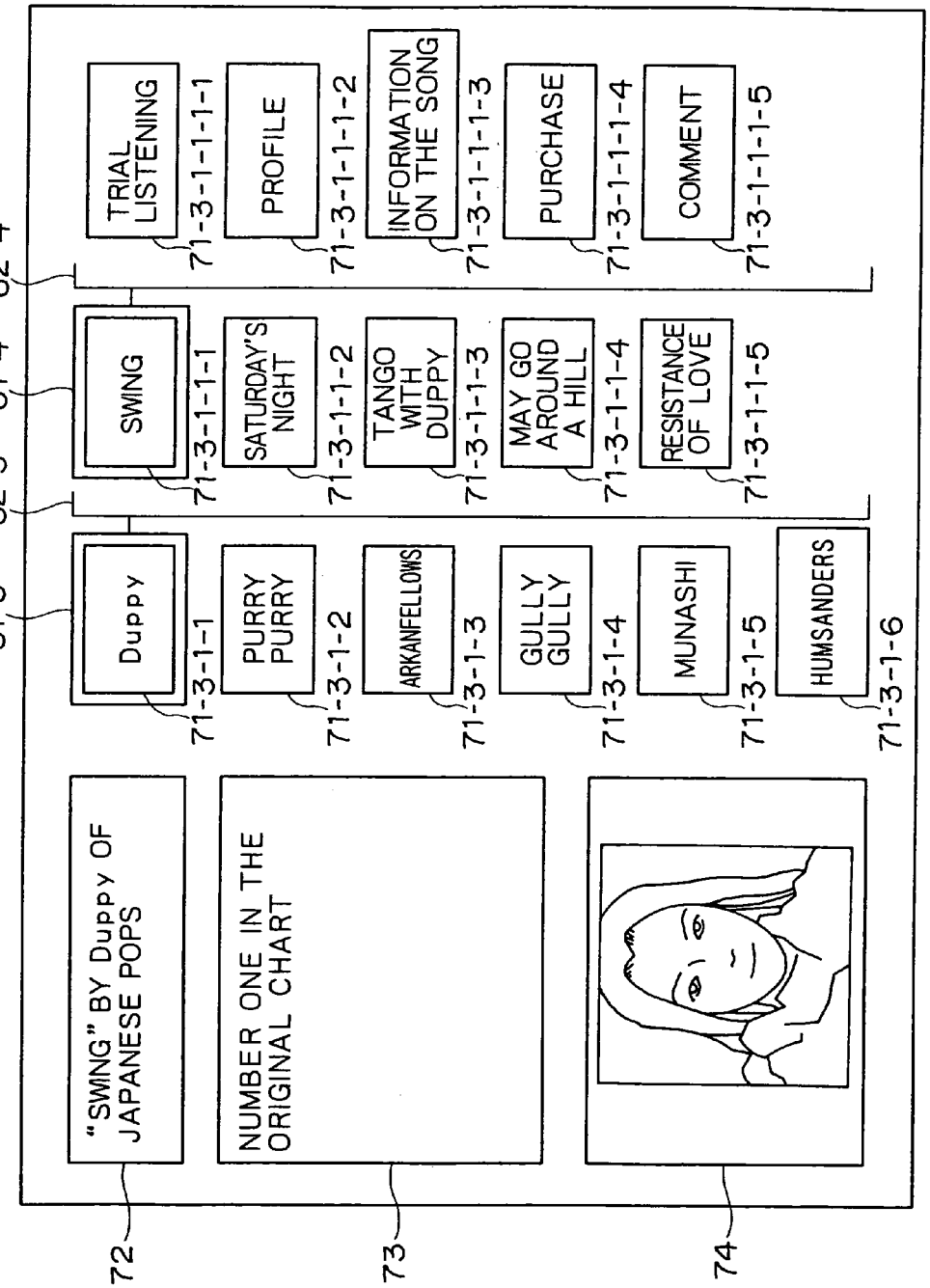

FIG.19

| Label | Text |
|---|---|
| 72 | "SATURDAY'S NIGHT" BY Duppy OF JAPANESE POPS |
| 73 | RECEIVED A DEPARTMENT AWARD FROM THE JAPAN GRAND CD AWARD COMMITTEE |
| 74 | (image) |

Artists (81-3 group):
- Duppy — 71-3-1-1
- PURRY PURRY — 71-3-1-2
- ARKANFELLOWS — 71-3-1-3
- GULLY GULLY — 71-3-1-4
- MUNASHI — 71-3-1-5
- HUMSANDERS — 71-3-1-6

Songs (81-4 group, 82-3):
- SWING — 71-3-1-1-1
- SATURDAY'S NIGHT — 71-3-1-1-2
- TANGO WITH DUPPY — 71-3-1-1-3
- MAY GO AROUND A HILL — 71-3-1-1-4
- RESISTANCE OF LOVE — 71-3-1-1-5

Actions (82-4 group):
- TRIAL LISTENING — 71-3-1-1-2-1
- PROFILE — 71-3-1-1-2-2
- INFORMATION ON THE SONG — 71-3-1-1-2-3
- PURCHASE — 71-3-1-1-2-4
- COMMENT — 71-3-1-1-2-5

FIG. 20

- TRIAL LISTENING  71-3-1-1-3-1
- PROFILE  71-3-1-1-3-2
- INFORMATION ON THE SONG  71-3-1-1-3-3
- PURCHASE  71-3-1-1-3-4
- COMMENT  71-3-1-1-3-5

82-4
81-4

- SWING  71-3-1-1-1
- SATURDAY'S NIGHT  71-3-1-1-2
- TANGO WITH DUPPY  71-3-1-1-3
- MAY GO AROUND A HILL  71-3-1-1-4
- RESISTANCE OF LOVE  71-3-1-1-5

82-3
81-3

- Duppy  71-3-1-1
- PURRY PURRY  71-3-1-2
- ARKANFELLOWS  71-3-1-3
- GULLY GULLY  71-3-1-4
- MUNASHI  71-3-1-5
- HUMSANDERS  71-3-1-6

72 — "TANGO WITH DUPPY" BY Duppy OF JAPANESE POPS

73 — "TANGO WITH DUPPY" PERFORMED BY A FAMOUS CELLIST...

METHOD AND APPARATUS FOR DISPLAYING CONTENT IN AN ARRAY HIERARCHICAL STRUCTURE

BACKGROUND OF THE INVENTION

The present invention relates to an information-processing apparatus, an information-processing method and a recording medium for storing a program implementing the information-processing method, more particularly to an information-processing apparatus, an information-processing method and a recording medium for storing a program implementing the information-processing method, which allow the user to search information for a desired content with ease even if the user is not familiar with operations.

In systems such as an EMD (Electronic Music Distribution) system or a VOD (Video On Demand) system, the user is allowed to search information for a desired one among contents arranged in the alphabetical order or in a chronological order of creation and receive the desired content.

In order to make the operation to search information for a desired content easy to carry out, the EMD or VOD system visually displays contents as icons. An icon is a predetermined picture displayed typically on a screen.

In an EMD or VOD system for searching information for a content by using a text, however, a complicated operation such as an operation to enter a text must be carried out. Otherwise, it is impossible to search the information for a content.

In addition, in an EMD or VOD system for searching displayed icons for an icon representing a desired content in particular, the number of icons displayable at one time is limited. Moreover, the user must remember what content is represented by each of the icons. That is to say, the user must be familiar with operations.

SUMMARY OF THE INVENTION

It is thus an object of the present invention addressing the problems described above to make an operation to search information for a desired content simple without the need for the user to be familiar with operations.

To achieve the above object, according to a first aspect of the present invention, there is provided an information-processing apparatus including:

first display control means for controlling a display of an icon hierarchy including a plurality of first icons on a first hierarchical layer, a plurality of second icons on a second hierarchical layer at a level lower than the first hierarchical layer, a plurality of third icons on a third hierarchical layer at a level lower than the second hierarchical layer and a plurality of fourth icons on a fourth hierarchical layer at a level higher than the first hierarchical layer so as to exhibit an array of the first icons as a column or a row on a screen and an array of the second icons as another column or another row on the screen wherein:

the number of the first icons displayed on the screen and the number of the second icons displayed on the screen are determined by the size of a display area on the screen; and the array of the first icons and the array of the second icons are displayed on the screen to form an array hierarchical structure;

icon-specifying means for specifying a desired icon from the first or second icons displayed in the array hierarchical structure; and second display control means for changing the array hierarchical structure displayed on the screen so as to:

display the third icons to replace the second icons in the array hierarchical structure on the screen and display the second icons to replace the first icons in the array hierarchical structure on the screen when the icon-specifying means specifies one of the second icons in the array hierarchical structure; and display the fourth icons to replace the third icons in the array hierarchical structure on the screen, display the third icons to replace the second icons in the array hierarchical structure on the screen and display the second icons to replace the first icons in the array hierarchical structure on the screen when the icon-specifying means specifies one of the third icons in the array hierarchical structure.

The first to fourth icons may each represent a content or the class of a content.

The information-processing apparatus may further have reception means for receiving a content, a content class or information relevant to a content or relevant to a hierarchical layer of contents.

The information-processing apparatus may further have third display control means for controlling the display so as to exhibit information relevant to an icon specified by the icon-specifying means or information relevant to a hierarchical layer to which the specified icon pertains.

The information-processing apparatus may further have fourth display control means for controlling the display of a picture showing a route to one of the second icons.

The first control means may control the display so as to scroll first and second icons when the displayed icons are updated.

The icon-specifying means may specify:

an icon on a hierarchical layer at a level lower than a hierarchical layer specified by a cursor in accordance with an operation of a predetermined key for a first direction;

an icon on a hierarchical layer at a level higher than a hierarchical layer specified by a cursor in accordance with an operation of a predetermined key for a second direction; and an icon on the same hierarchical layer specified by a cursor in accordance with an operation of a predetermined key for a third or fourth direction.

The information-processing apparatus may further have layer-count-acquiring means for acquiring the number of hierarchical layers to be displayed. The first control means is capable of controlling the display so as to exhibit icons pertaining to as many hierarchical layers as indicated by the number of hierarchical layers to be displayed, which is acquired by the layer-count-acquiring means.

According to a second aspect of the present invention, there is provided an information-processing method including:

a first display control step of controlling a display of an icon hierarchy including a plurality of first icons on a first hierarchical layer, a plurality of second icons on a second hierarchical layer at a level lower than the first hierarchical layer, a plurality of third icons on a third hierarchical layer at a level lower than the second hierarchical layer and a plurality of fourth icons on a fourth hierarchical layer at a level higher than the first hierarchical layer so as to exhibit an array of the first icons as a column or a row on a screen and an array of the second icons as another column or another row on the screen wherein:

the number of the first icons displayed on the screen and the number of the second icons displayed on the screen are determined by the size of a display area on the screen; and the array of the first icons and the array of the second icons are displayed on the screen to form an array hierarchical structure;

an icon-specifying step of specifying a desired icon from the first or second icons displayed in the array hierarchical structure; and a second display control step of changing the array hierarchical structure displayed on the screen so as to:

display the third icons to replace the second icons in the array hierarchical structure on the screen and display the second icons to replace the first icons in the array hierarchical structure on the screen when the icon-specifying means specifies one of the second icons in the array hierarchical structure; and display the fourth icons to replace the third icons in the array hierarchical structure on the screen, display the third icons to replace the second icons in the array hierarchical structure on the screen and display the second icons to replace the first icons in the array hierarchical structure on the screen when the icon-specifying means specifies one of the third icons in the array hierarchical structure.

According to a third aspect of the present invention, there is provided a program stored in a recording medium implementing an information-processing method, which includes:

a first display control step of controlling a display of an icon hierarchy including a plurality of first icons on a first hierarchical layer, a plurality of second icons on a second hierarchical layer at a level lower than the first hierarchical layer, a plurality of third icons on a third hierarchical layer at a level lower than the second hierarchical layer and a plurality of fourth icons on a fourth hierarchical layer at a level higher than the first hierarchical layer so as to exhibit an array of the first icons as a column or a row on a screen and an array of the second icons as another column or another row on the screen wherein:

the number of the first icons displayed on the screen and the number of the second icons displayed on the screen are determined by the size of a display area on the screen; and the array of the first icons and the array of the second icons are displayed on the screen to form an array hierarchical structure;

an icon-specifying step of specifying a desired icon from the first or second icons displayed in the array hierarchical structure; and a second display control step of changing the array hierarchical structure displayed on the screen so as to:

display the third icons to replace the second icons in the array hierarchical structure on the screen and display the second icons to replace the first icons in the array hierarchical structure on the screen when the icon-specifying means specifies one of the second icons in the array hierarchical structure; and display the fourth icons to replace the fist third icons in the array hierarchical structure on the screen, and display the fist third icons to replace the second icons in the array hierarchical structure on the screen and display the second icons to replace the first icons in the array hierarchical structure on the screen when the icon-specifying means specifies one of the third icons in the array hierarchical structure.

In accordance with the information-processing apparatus, the information-processing method, and the program stored in the recording medium, a display of an icon hierarchy including a plurality of first icons on a first hierarchical layer, a plurality of second icons on a second hierarchical layer at a level lower than the first hierarchical layer, a plurality of third icons on a third hierarchical layer at a level lower than the second hierarchical layer and a plurality of fourth icons on a fourth hierarchical layer at a level higher than the first hierarchical layer is controlled so as to exhibit an array of the first icons as a column or a row on a screen and an array of the second icons as another column or another row on the screen wherein:

the number of the first icons displayed on the screen and the number of the second icons displayed on the screen are determined by the size of a display area on the screen; and the array of the first icons and the array of the second icons are displayed on the screen to form an array hierarchical structure;

a desired icon is specified among the first or second icons displayed in the array hierarchical structure; and the array hierarchical structure displayed on the screen is changed so as to:

display the third icons to replace the second icons in the array hierarchical structure on the screen and display the second icons to replace the first icons in the array hierarchical structure on the screen when the icon-specifying means specifies one of the second icons in the array hierarchical structure; and display the fourth icons to replace the third icons in the array hierarchical structure on the screen, and display the third icons to replace the second icons in the array hierarchical structure on the screen and display the second icons to replace the first icons in the array hierarchical structure on the screen when the icon-specifying means specifies one of the third icons in the array hierarchical structure.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

Figure 17:
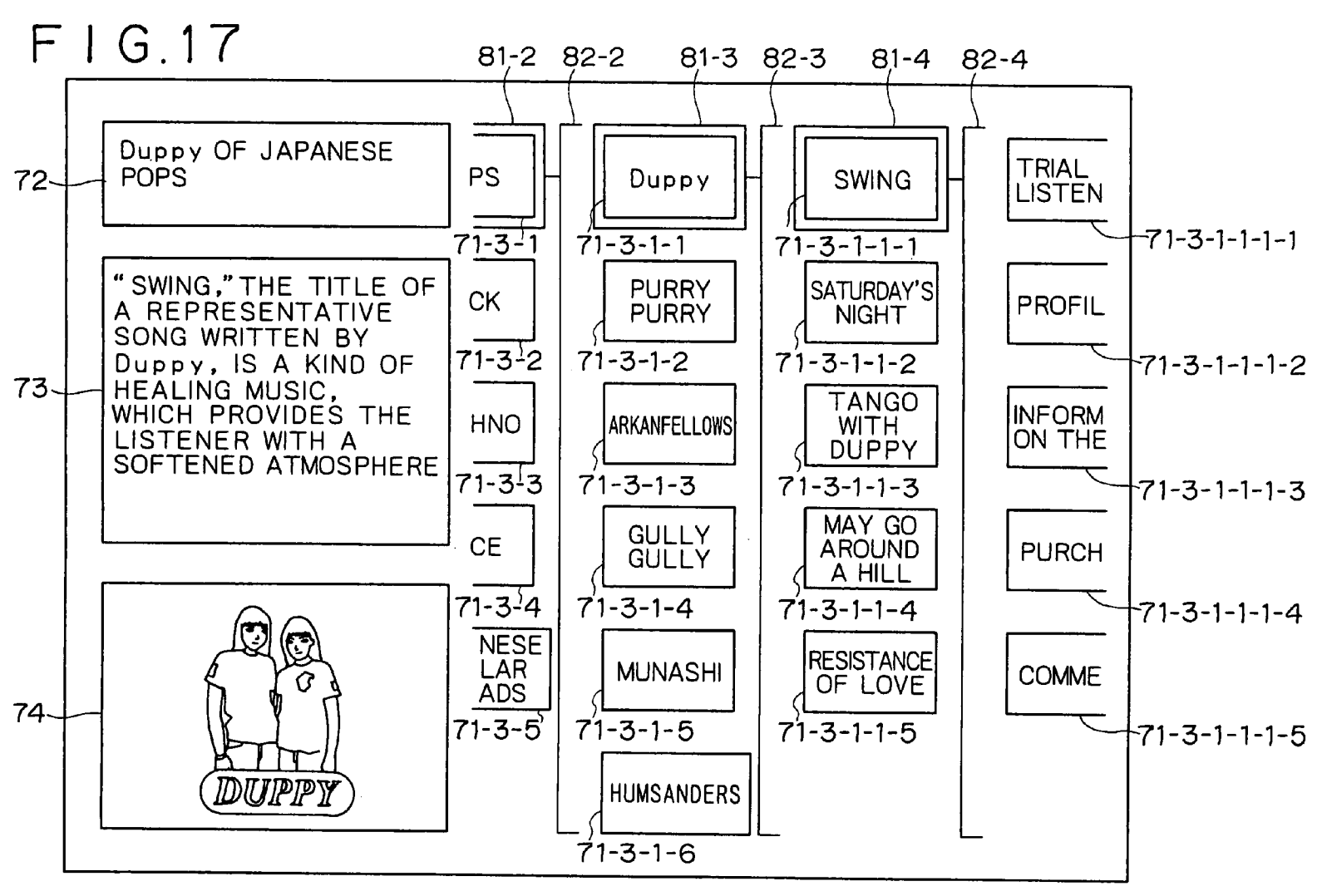

FIG. 17 is a diagram showing a typical screen displayed by the set top box on the monitor apparatus;

FIG. 18 is a diagram showing a typical screen displayed by the set top box on the monitor apparatus;

FIG. 19 is a diagram showing a typical screen displayed by the set top box on the monitor apparatus;

FIG. 20 is a diagram showing a typical screen displayed by the set top box on the monitor apparatus;

FIG. 24 is a diagram showing a typical screen displayed by the set top box on the monitor apparatus;

DETAILED DESCRIPTION OF THE PREFERRED EMBODIMENT

Figure 1:
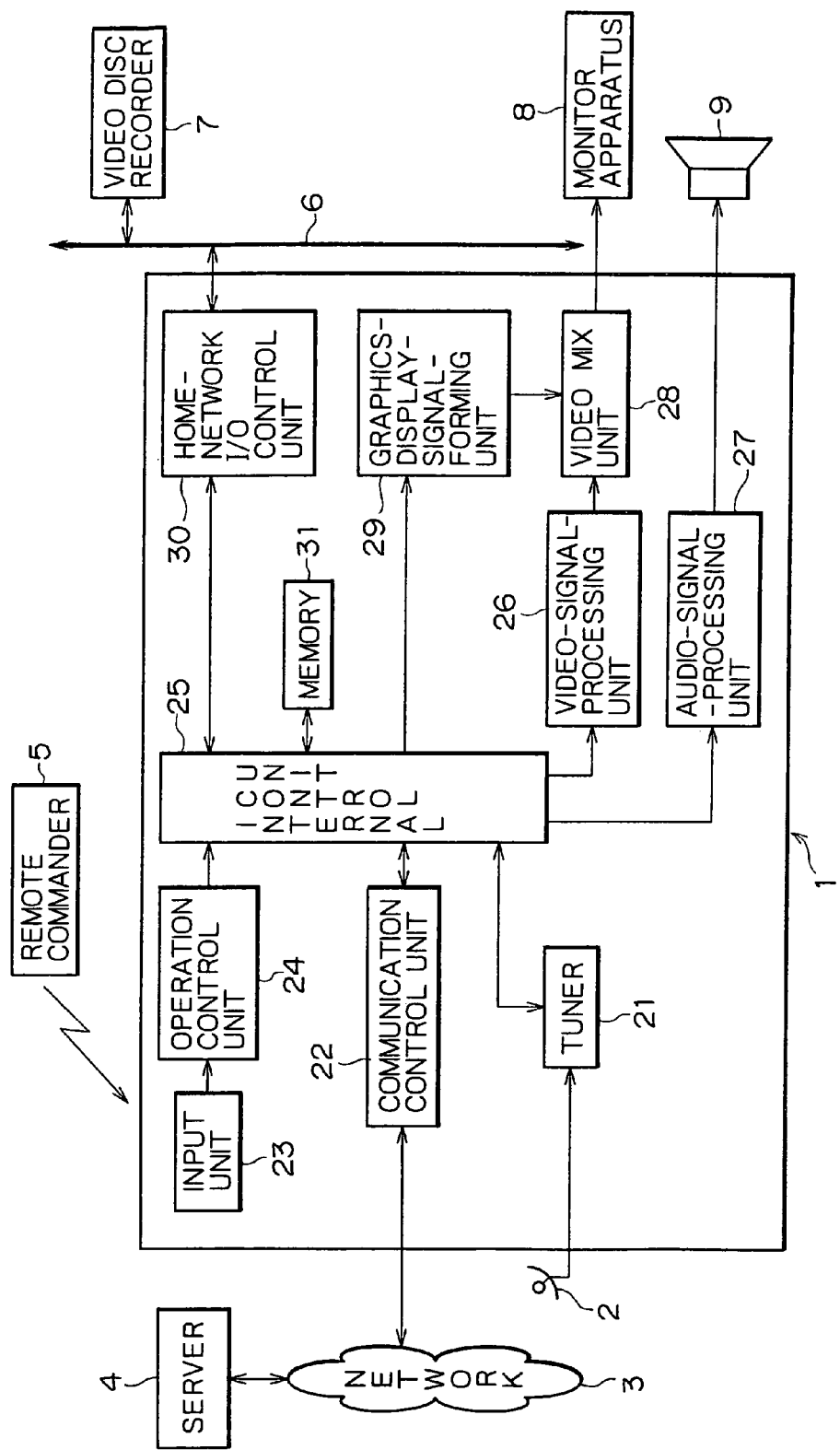
FIG. 1 is a block diagram showing the configuration of an embodiment implementing a set top box provided by the present invention.

FIG. 1 is a block diagram showing the configuration of an embodiment implementing a set top box provided by the present invention. An antenna 2 receives broadcast waves transmitted by a digital broadcasting satellite or a digital ground broadcasting station and supplies the broadcast waves to a tuner 21. On the basis of control executed by an internal control unit 25, the tuner 21 selects a wave from the broadcast waves and demodulates the selected wave to produce a transport stream, which is a content corresponding to a desired movie or desired music. The tuner 21 then supplies the transport stream to the internal control unit 25. As a result of the modulation, the tuner 21 also produces movie and music distribution service information of a predetermined system and supplies this information to the internal control unit 25. The movie and music distribution service information is associated with contents.

The movie and music distribution service information typically includes figures each representing a content, the genre of each content, data indicating classification of contents by country and music company and a string of characters, a text or a picture associated with each content. As will be described later, the figures are each displayed as a thumbnail icon 91.

In accordance with a command issued by the internal control unit 25, a communication control unit 22 transmits a request for transmission of pictures or music data to a server 4 by way of the network 3 such as the Internet. The requested pictures or music data are a content such as a movie or music. The content is typically a transport stream. The communication control unit 22 may also send the server 4 a request for transmission of movie and music distribution service information created in a predetermined format for contents supplied by the server 4 by way of the network 3. In response to the request made by the set top box 1, the server 4 transmits the desired content such as a movie or music or the desired movie and music distribution service information to the set top box 1 by way of the network 3.

The communication control unit 22 receives the desired content such as a movie or music or the desired movie and music distribution service information transmitted by the server 4 by way of the network 3 and supplies the content or the information to the internal control unit 25.

A remote commander 5 generates an infrared ray signal representing an operation carried out by the user. An operation control unit 24 receives the infrared ray signal generated by the remote commander 5 and outputs a command according to the received signal to the internal control unit 25. The command is control data for driving the set top box 1 to carry out an operation.

Figure 2:
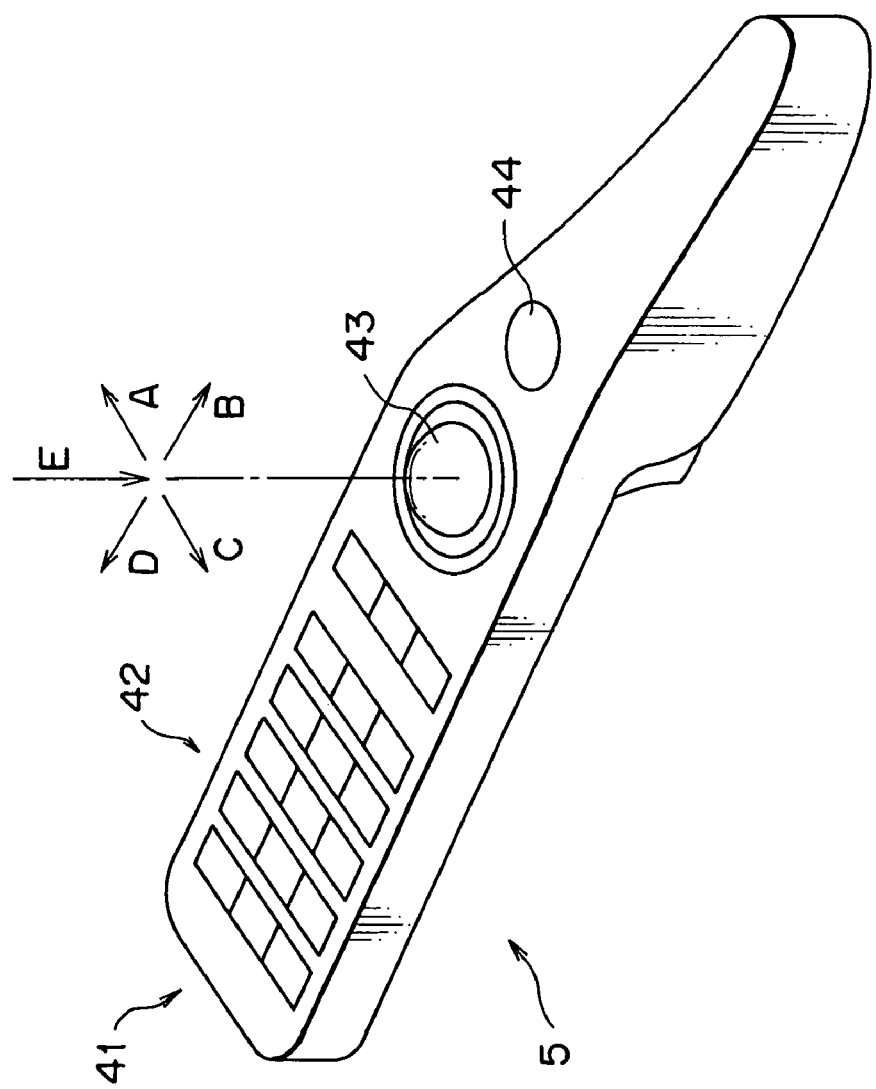
FIG. 2 is a diagram showing a perspective view of the external appearance of a remote commander.

FIG. 2 is a diagram showing a perspective view of the external appearance of the remote commander 5. As shown in the figure, the remote commander 5 is designed to have a shape almost resembling a short rod. On the surface of the far end of the remote commander 5, a transmission unit 41 is provided for transmitting an infrared ray signal. Buttons 42 including the ten keys are laid out on the upper surface starting from the far-end side. The transmission unit 41 transmits an infrared ray signal representing an operation carried out on the buttons 42.

The user holds a portion on the near end side of the remote commander 5 with one hand. The portion on the near end side of the remote commander 5 looks like a down stair with respect to the body of the remote commander 5 containing the buttons 42. The upper surface from the border between the portion on the near end side and the main body is a gradually curved surface toward the near end edge. The user is thus capable of holding the portion on the near end side of the remote commander 5 with the thumb placed on a button 43 having a relatively large diameter. On the border between the portion on the near end side close to the button 43, a cancel button 44 is provided.

When the button 43 is operated, the transmission unit 41 employed in the remote commander 5 outputs an infrared ray signal representing a select or confirm command. To be more specific, when the button 43 is operated in directions indicated by arrows A to D in the figure, a cursor specifying an icon is moved for selection of a desired icon over a display screen of a monitor apparatus 8. The cursor itself will be described more later. If the button 43 is pressed in a direction indicated by an arrow E, the selection of an icon specified by the cursor is confirmed. In this case, the screen of a content represented by the selected icon is displayed on the monitor apparatus 8.

If the button 44 is operated, on the other hand, the transmission unit 41 employed in the remote commander 5 outputs an infrared ray signal representing a command to display a screen focused on a parent hierarchical layer to be described later, replacing the currently displayed screen.

An input unit 23 typically includes "→", "←", "↓", "↑", confirm and cancel keys, which can be operated by the user to give an effect equivalent to the effect of the operation carried out on the remote commander 5. When the user operates the "→", "←", "↓" or "↑" key to move the cursor to the position of an icon and press the confirm key to confirm selection of the icon specified by the cursor or press the cancel key to cancel the operation, the input unit 23 supplies a signal representing the operation carried out by the user to the operation control unit 24. In turn, the operation control unit 24 supplies a command to the internal control unit 25 on the basis of the signal received from the input unit 23 or an infrared ray signal received from the remote commander 5. That is to say, the command represents an operation carried out on the remote commander 5 or the input unit 23.

The internal control unit 25 decodes the command received from the operation control unit 24 to select a routine in a control program stored in a program area of a memory 31. Then, the internal control unit 25 executes the selected routine to control the set top box 1 as a whole.

Assume that the internal control unit 25 receives a command making a request for reception of a program broadcasted by a desired station from the operation control unit 24. In this case, the internal control unit 25 executes a selected routine to supply a command to the tuner 21 in order to make a request for reception of a broadcasted program of a channel corresponding to the desired broadcasting station from the station by way of the antenna 2. In response to this request, the tuner 21 outputs a transport stream corresponding to the broadcasted program of the desired channel. The transport stream corresponding to the program of the desired channel is then transferred from the tuner 21 to the internal control unit 25. Typically, the internal control unit 25 outputs the transport stream representing the transport stream to the monitor apparatus 8 to be displayed thereby by way of a video-signal-processing unit 26 and a video mix unit 28. The internal control unit 25 also outputs the transport stream to a speaker 9 by way of an audio-signal-processing unit 27.

By the same token, the internal control unit 25 may receive a command making a request for reception of movie and music distribution service information broadcasted by a desired station from the operation control unit 24. In this case, the internal control unit 25 executes a selected routine to supply a command to the tuner 21 in order to make a request for reception of the movie and music distribution service information transmitted by the desired broadcasting station from the station by way of the antenna 2. In response to this request, the tuner 21 outputs the movie and music distribution service information received from the desired broadcasting station. The movie and music distribution service information received from the desired broadcasting station is then transferred from the tuner 21 to the internal control unit 25.

The internal control unit 25 stores the movie and music distribution service information received from the tuner 21 in the memory 31. As an alternative, the internal control unit 25 may request a home-network I/O control unit 30 to transfer the movie and music distribution service information received from the tuner 21 to a video disc recorder 7 by way of a home network 6. The video disc recorder 7 records the movie and music distribution service information onto a video disc.

A desired program or desired movie and music distribution service information may also be received from the server 4 instead of a broadcasting station. Assume that the internal control unit 25 receives a command making a request for reception of a content corresponding to a desired music program from the server 4 from the operation control unit 24. In this case, the internal control unit 25 executes a selected routine to supply a command to the communication control unit 22 in order to make a request for reception of the content from the server 4 by way of the network 3. In response to this request, the communication control unit 22 issues a request for the desired music content to the server 4 by way of the network 3. The communication control unit 22 then receives the requested content transmitted by the server 4 by way of the network 3. Then, the content is transferred from the communication control unit 22 to the internal control unit 25. Typically, the internal control unit 25 outputs the content to the monitor apparatus 8 to be displayed thereby by way of the video-signal-processing unit 26 and the video mix unit 28. The internal control unit 25 also outputs the content to the speaker 9 by way of the audio-signal-processing unit 27.

By the same token, the internal control unit 25 may receive a command making a request for reception of desired movie and music distribution service information from the server 4 from the operation control unit 24. In this case, the internal control unit 25 executes a selected routine to supply a command to the communication control unit 22 in order to make a request for reception of the movie and music distribution service information from the server 4 by way of the network 3. In response to this request, the communication control unit 22 issues a request for the desired movie and music distribution service information to the server 4 by way of the network 3. The communication control unit 22 then receives the requested movie and music distribution service information transmitted by the server 4 by way of the network 3. The movie and music distribution service information is then transferred from the communication control unit 22 to the internal control unit 25.

As described above, movie and music distribution service information received from a broadcasting station by way of the antenna 2 and the tuner 21 is stored in the memory 31. This movie and music distribution service information is typically used by the internal control unit 25 as a basis for making a request for reception of movie and music distribution service information from the server 4 by way of the network 3 and the communication control unit 22 in accordance with the procedure described above.

The internal control unit 25 stores the movie and music distribution service information received from the communication control unit 22 in the memory 31. As an alternative, the internal control unit 25 may request the home-network I/O control unit 30 to transfer the movie and music distribution service information received from the communication control unit 22 to the video disc recorder 7 by way of the home network 6. The video disc recorder 7 records the movie and music distribution service information onto a video disc.

The internal control unit 25 outputs a transport stream or a content received from the tuner 21 as described above to the monitor apparatus 8 and the speaker 9 as follows. The internal control unit 25 converts video data included in the transport stream or the content into data of an elementary-stream format and supplies the data obtained as result of the conversion to the video-signal-processing unit 26. By the same token, the internal control unit 25 converts audio data included in the transport stream or the content into data of an elementary-stream format and supplies the data obtained as result of the conversion to the audio-signal-processing unit 27.

Receiving movie and music distribution service information from the tuner 21, the internal control unit 25 generates video data based on the movie and music distribution service information and supplies the video data to a graphics-display-signal-forming unit 29. In addition, receiving a predetermined command from the operation control unit 24, the internal control unit 25 reads out movie and music distribution service information from the memory 31. The internal control unit 25 then generates video data based on the movie and music distribution service information read out from the memory 31 and supplies the video data to the graphics-display-signal-forming unit 29 to be eventually displayed on the monitor apparatus 8.

Receiving a video and audio content from the communication control unit 22, the internal control unit 25 supplies video data included in the content to the video-signal-processing unit 26 to be eventually displayed on the monitor apparatus 8 and audio data included in the content to the audio-signal-processing unit 27 to be output as a voice/a sound by the speaker 9.

Receiving movie and music distribution service information from the communication control unit 22, the internal control unit 25 generates video data based on the movie and music distribution service information and supplies the video data to the graphics-display-signal-forming unit 29 to be displayed on the monitor apparatus 8.

The internal control unit 25 may record a transport stream received from the tuner 21 and a content with a transport-stream format received from the communication control unit 22 into the video disc recorder 7 by way of the home network 6. In this case, the internal control unit 25 generates a program stream based on the transport stream received from the tuner 21 or the communication control unit 22 and supplies the program stream to the home-network I/O control unit 30.

When receiving a program stream from the home-network I/O control unit 30, on the other hand, the internal control unit 25 supplies video data included in the program stream to the video-signal-processing unit 26 to be eventually displayed on the monitor apparatus 8 and audio data included in the program stream to the audio-signal-processing unit 27 to be output as a voice/a sound by the speaker 9.

When reversely receiving movie and music distribution service information from the home-network I/O control unit 30, the internal control unit 25 generates video data based on the movie and music distribution service information and supplies the video data to the graphics-display-signal-forming unit 29 to be displayed on the monitor apparatus 8.

Figure 3:
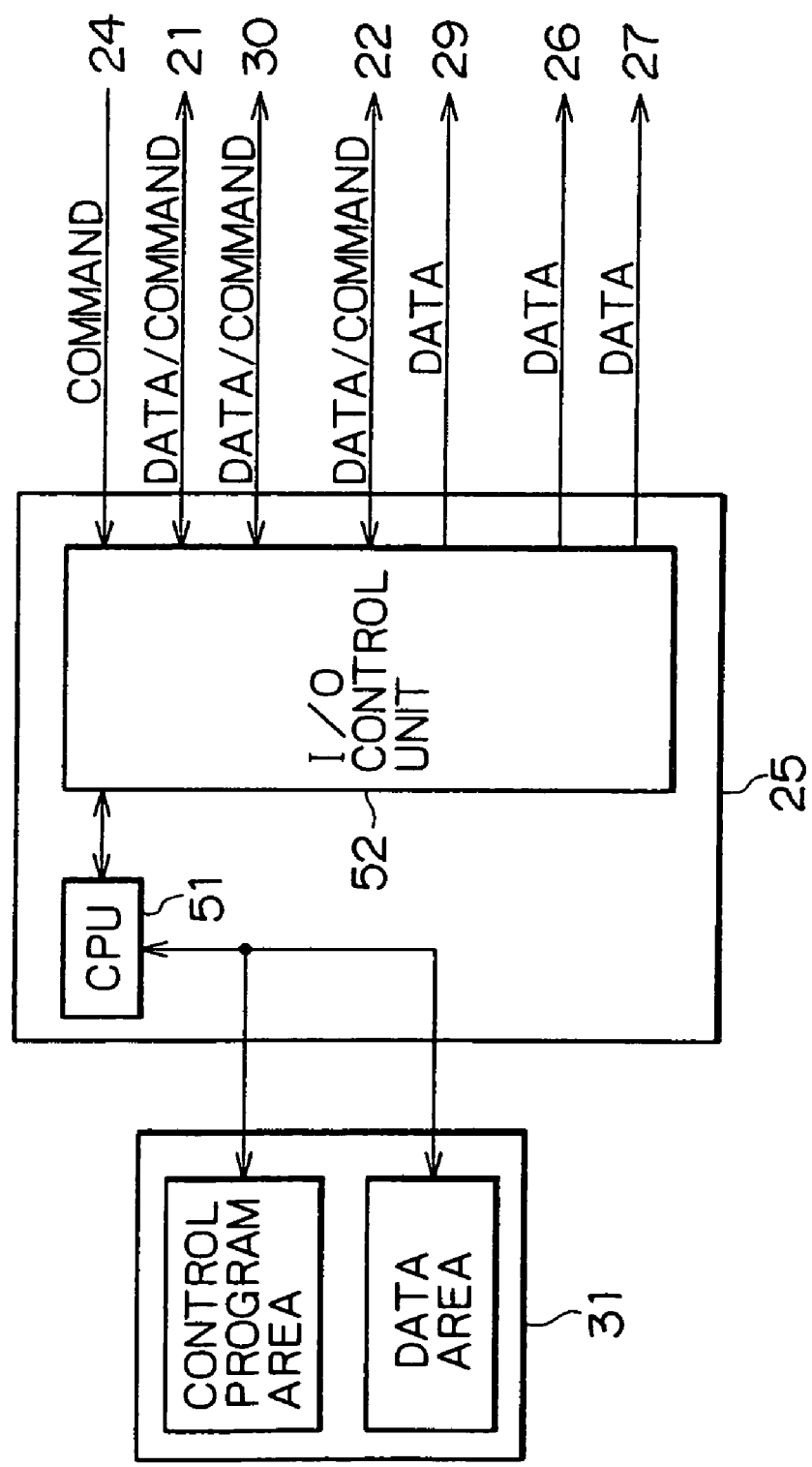
FIG. 3 is an explanatory diagram showing the structure of an internal control unit.

FIG. 3 is an explanatory diagram showing the structure of the internal control unit 25. As shown in the figure, the internal control unit 25 comprises a CPU (Central Processing Unit) 51 and an I/O (Input/Output) control unit 52. The internal control unit 25 decodes a command received from the operation control unit 24, the home-network I/O control unit 30 or the communication control unit 22 through the I/O control unit 52 to select a routine in the control program stored in a control program area of the memory 31. Then, the internal control unit 25 executes the selected routine for example to receive data from the tuner 21 or to supply a command or data to the tuner 21. The data received from or transmitted to the tuner 21 is typically a content or data such as movie and music distribution service data.

The CPU 51 stores and reads out data required in execution of control based on the control program into and from a data area of the memory 31. An example of such data is information on the state of the communication control unit 22 and the tuner 21.

Controlled by the CPU 51, the I/O control unit 52 supplies a command received from the operation control unit 24, the home-network I/O control unit 30 or the communication control unit 22 to the CPU 51. Also controlled by the CPU 51, the I/O control unit 52 reversely supplies a command received from the CPU 51 to the tuner 21, the home-network I/O control unit 30 or the communication control unit 22.

Also controlled by the CPU 51, the I/O control unit 52 stores data such as a content, a transport stream or movie and music distribution service information received from the tuner 21, the home-network I/O control unit 30 or the communication control unit 22 into the memory 31 by way of the CPU 51, to be output later to the home-network I/O control unit 30, the graphics-display-signal-forming unit 29, the video-signal-processing unit 26 or the audio-signal-processing unit 27. As an alternative, controlled by the CPU 51, the I/O control unit 52 outputs data such as a content, a transport stream or movie and music distribution service information received from the tuner 21, the home-network I/O control unit 30 or the communication control unit 22 directly to the home-network I/O control unit 30, the graphics-display-signal-forming unit 29, the video-signal-processing unit 26 or the audio-signal-processing unit 27.

The video-signal-processing unit 26 decodes video data received from the internal control unit 25 to generate a video signal supplied to the video mix unit 28. The graphics-display-signal-forming unit 29 generates a video signal corresponding to movie and music distribution service information received from the internal control unit 25 from data based on the movie and music distribution service information, and outputs the video signal to the video mix unit 28.

The video mix unit 28 mixes the video signal received from the video-signal-processing unit 26 and the video signal received from the graphics-display-signal-forming unit 29 to produce a mix video signal supplied to the monitor apparatus 8.

The audio-signal-processing unit 27 decodes audio data received from the internal control unit 25 to generate an audio signal supplied to the speaker 9.

Controlled by the internal control unit 25, the home-network I/O control unit 30 transfers a program stream received from the internal control unit 25 or movie and music distribution service information corresponding to the program stream to the video disc recorder 7 by way of the home network 6, which conforms typically to HAVi (Home Audio/Video interoperability) specifications. Also controlled by the internal control unit 25, the home-network I/O control unit 30 reversely supplies a program stream or movie and music distribution service information corresponding to the program stream received from the video disc recorder 7 by way of the home network 6 to the internal control unit 25.

The home-network I/O control unit 30 also transfers data such as a content or movie and music distribution service information broadcasted from a predetermined time to the video disc recorder 7 by way of the home network 6.

In addition to the video disc recorder 7, the home network 6 is also connected to various kinds of home equipment such as a video cassette recorder, a video cassette recorder with an image-pickup function, a refrigerator and a bath tub, which are not shown in the figure.

The memory 31 is used for storing the control program to be executed by the internal control unit 25 and data required in the execution of the program.

The control program stored in the control-program area in the memory 31 is rewritable. For example, the internal control unit 25 is capable of rewriting the control program stored in the control-program area of the memory 31 with a control program received by the communication control unit 22 from the server 4. The internal control unit 25 is also capable of rewriting the control program stored in the control-program area of the memory 31 with a control program received by the tuner 21 from a predetermined broadcasting station through a channel. In addition, the internal control unit 25 is capable of rewriting the control program stored in the control-program area of the memory 31 with a control program received by the home-network I/O control unit 30 through the home network 6.

The video disc recorder 7 stores a program stream or movie and music distribution service information received from the set top box 1 by way of the home network 6 into a disc, which is mounted on the video disc recorder 7 but not shown in the figure. Reversely, the video disc recorder 7 reads out a program stream or movie and music distribution service information stored in a disc mounted on the video disc recorder 7 and supplies the program stream or the movie and music distribution service information to the set top box 1 by way of the home network 6.

The monitor apparatus 8 displays video information based on a video signal received from the video mix unit 28 employed in the set top box 1. On the other hand, the speaker 9 generates a sound or a voice based on an audio signal received from the set top box 1.

Next, an EMD system for receiving a music content from the server 4 is used to exemplify a screen, which is created from movie and music distribution service information, displayed on the monitor apparatus 8 by the graphics-display-signal-forming unit 29 and the video mix unit 28 employed in the set top box 1 and utilized by the user for selecting a content or a program of a broadcasting station.

Figure 4:
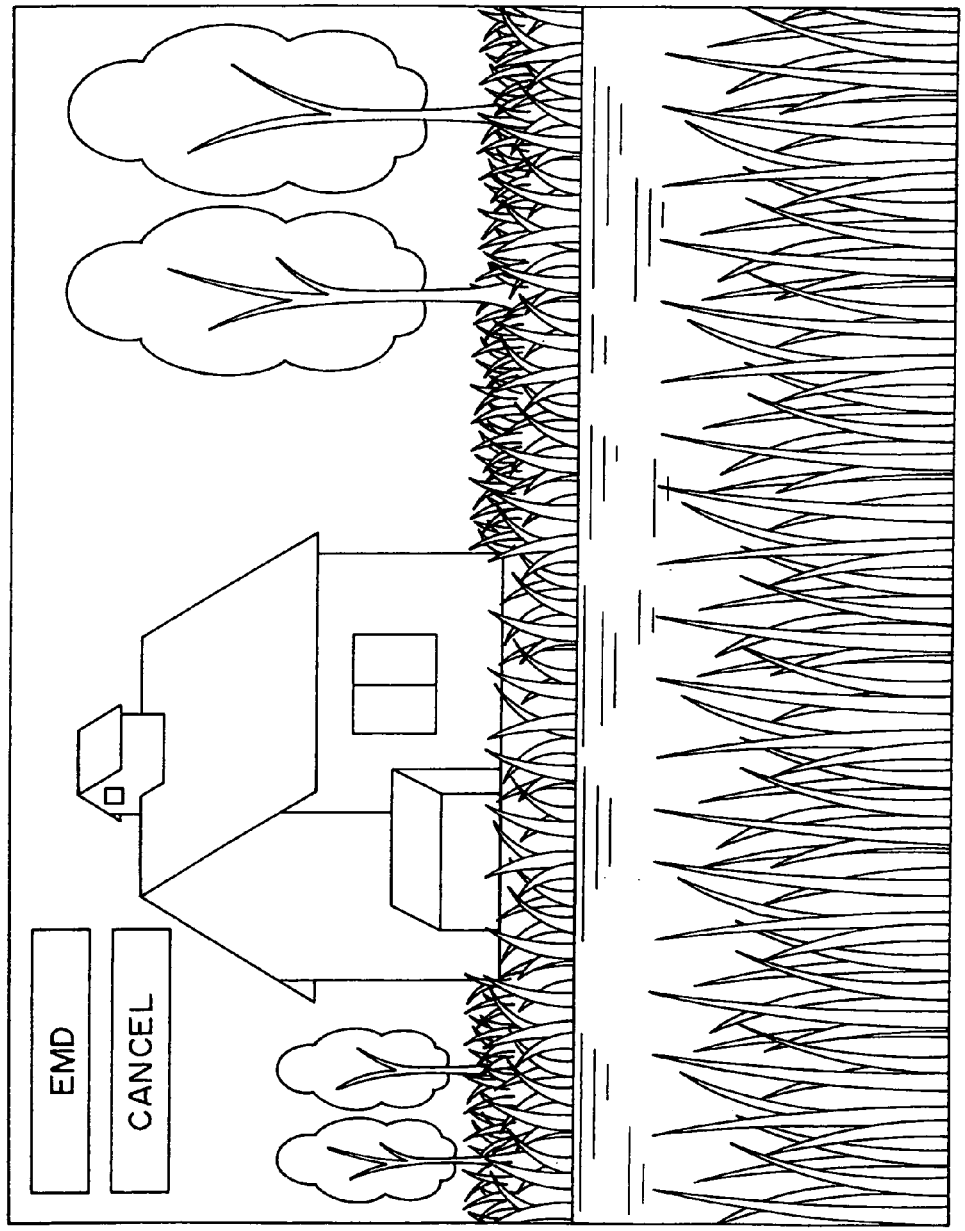
FIG. 4 is an explanatory diagram showing an activation screen, which is initially displayed when an EMD system is activated.

FIG. 4 is an explanatory diagram showing an activation screen, which is initially displayed on the monitor apparatus 8 when the EMD system is activated by an operation carried out by the user on the input unit 23 or the remote commander 5. As shown in the figure, a button named EMD and used for displaying a menu of the EMD system and a button named CANCEL are provided at predetermined positions of the activation screen appearing on the monitor apparatus 8.

With a cursor moved to the EMD button for displaying a menu of the EMD system, pressing a confirm button of the input unit 23 not shown in the figure or pressing the button 43 of the remote commander 5 will cause the set top box 1 to display a screen for selecting a content on the monitor apparatus 8.

The button named CANCEL is operated to terminate an operation to supply a content from the EMD system. With the cursor moved to the CANCEL button, pressing the confirm button of the input unit 23 or pressing the button 43 of the remote commander 5 will cause the set top box 1 to display another screen on the monitor apparatus 8 since the operation to supply a content from the EMD system is terminated.

Figure 5:
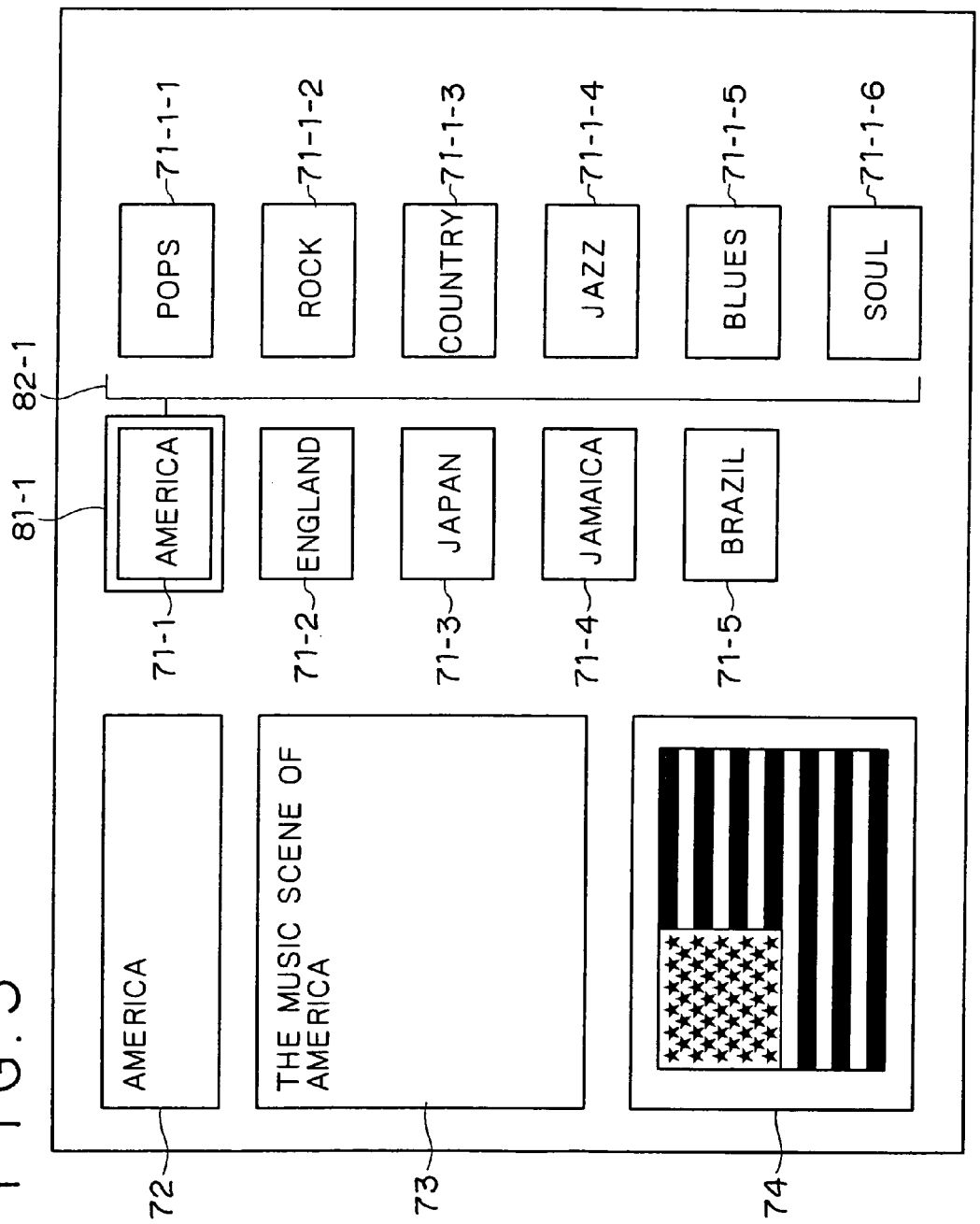
FIG. 5 is a diagram showing a typical screen displayed by the set top box on a monitor apparatus.

FIG. 5 is a diagram showing a typical initial screen displayed by the set top box 1 on the monitor apparatus 8 and used for selecting a music content. An icon 71-1 named America, an icon 71-2 named England, an icon 71-3 named Japan, an icon 71-4 named Jamaica and an icon 71-5 named Brazil are arranged to form an array on a column at a predetermined position on the screen shown in FIG. 5.

The icon 71-1 is specified by using a cursor 81-1 to display a string of characters, a text and a picture associated with contents or pieces of music data classified into an America category on the screen of the monitor apparatus 8, or to download contents or pieces of music data classified into the America category from the server 4 to the set top box 1. By the same token, the icon 71-2 is specified by using the cursor 81-1 to display a string of characters, a text and a picture associated with contents or pieces of music data classified into an England category on the screen of the monitor apparatus 8, or to download contents or pieces of music data classified into the England category from the server 4 to the set top box 1. Likewise, the icon 71-3 is specified by using the cursor 81-1 to display a string of characters, a text and a picture associated with contents or pieces of music data classified into a Japan category on the screen of the monitor apparatus 8, or to download contents or pieces of music data classified into the Japan category from the server 4 to the set top box 1.

Similarly, the icon 71-4 is specified by using the cursor 81-1 to display a string of characters, a text and a picture associated with contents or pieces of music data classified into a Jamaica category on the screen of the monitor apparatus 8, or to download contents or pieces of music data classified into the Jamaica category from the server 4 to the set top box 1. In the same way, the icon 71-5 is specified by using the cursor 81-1 to display a string of characters, a text and a picture associated with contents or pieces of music data classified into a Brazil category on the screen of the monitor apparatus 8, or to download contents or pieces of music data classified into the Brazil category from the server 4 to the set top box 1.

As described above, by specifying one of the icons 71-1 to 71-5 by using the cursor 81-1, the user is capable of selecting contents pertaining to a category of a country of interest.

On the screen shown in FIG. 5, an icon 71-1-1 named Pops, an icon 71-1-2 named Rock, an icon 71-1-3 named Country, an icon 71-1-4 named Jazz, an icon 71-1-5 named Blues and an icon 71-1-6 named Soul are arranged to form an array on a column at a predetermined position on the right side of the column of the icons 71-1 to 71-5 on a screen displayed on the monitor apparatus 8.

The icon 71-1-1 is specified to display a string of characters, a text and a picture associated with contents or pieces of music data classified into a Pops sub-category in the America category on the screen of the monitor apparatus 8, or to download contents or pieces of music data classified into the Pops sub-category in the America category from the server 4 to the set top box 1. By the same token, the icon 71-1-2 is specified to display a string of characters, a text and a picture associated with contents or pieces of music data classified into a Rock sub-category in the America category on the screen of the monitor apparatus 8, or to download con-tents or pieces of music data classified into the Rock sub-category in the America category from the server 4 to the set top box 1. In the same way, the icon 71-1-3 is specified to display a string of characters, a text and a picture associated with contents or pieces of music data classified into a Country sub-category in the America category on the screen of the monitor apparatus 8, or to download contents or pieces of music data classified into the Country sub-category in the America category from the server 4 to the set top box 1.

Similarly, the icon 71-1-4 is specified to display a string of characters, a text and a picture associated with contents or pieces of music data classified into a Jazz sub-category in the America category on the screen of the monitor apparatus 8, or to download contents or pieces of music data classified into the Jazz sub-category in the America category from the server 4 to the set top box 1. By the same token, the icon 71-1-5 is specified to display a string of characters, a text and a picture associated with contents or pieces of music data classified into a Blues sub-category in the America category on the screen of the monitor apparatus 8, or to download contents or pieces of music data classified into the Blues sub-category in the America category from the server 4 to the set top box 1. Likewise, the icon 71-1-6 is specified to display a string of characters, a text and a picture associated with contents or pieces of music data classified into a Soul sub-category in the America category on the screen of the monitor apparatus 8, or to download contents or pieces of music data classified into the Soul sub-category in the America category from the server 4 to the set top box 1.

As described above, by specifying one of the icons 71-1-1 to 71-1-6 by using a cursor 81-2, the user is capable of selecting contents or pieces of music data pertaining to a desired sub-category of a category of a country of interest.

The arrays on the columns of the screen displayed on the monitor apparatus 8 are each referred to a hierarchical layer. On the screen of the monitor apparatus 8 shown in FIG. 5, one of the arrays are an array of categories corresponding to the icons 71-1 to 71-5, that is, a result of classification of music contents by country. The other array is an array of sub-categories corresponding to the icons 71-1-1 to 71-1-6. In this example, the sub-categories are a result of classification of music contents pertaining to a category of a country by genre. A hierarchical layer may also comprise, for example, a result of classification of music contents by artist.

In the hierarchy of icons displayed on the typical screen of the monitor apparatus 8 shown in FIG. 5, the array of sub-categories corresponding to the icons 71-1-1 to 71-1-6, that is, a result of classification of music contents pertaining to a category of a country by genre, may be considered to be a reference hierarchical layer. In this case, the array of categories corresponding to the icons 71-1 to 71-5, that is, a result of classification of music contents by country displayed as a column on the left side of the reference hierarchical layer, is referred to as a parent hierarchical layer.

If the array of categories corresponding to the icons 71-1 to 71-5, that is, a result of classification of music contents by country is considered to be a reference hierarchical layer, on the other hand, the array of sub-categories corresponding to the icons 71-1-1 to 71-1-6 on the right side of the icons 71-1 to 71-5 on a screen displayed on the monitor apparatus 8, that is, a result of classification of music contents pertaining to a category of a country by genre, is referred to as a child hierarchical layer.

With a parent hierarchical layer taken as a reference hierarchical layer, a child hierarchical layer is referred to as a hierarchical layer at a deep level. With a child hierarchical layer taken as a reference hierarchical layer, on the other hand, a parent hierarchical layer is referred to as a hierarchical layer at a shallow level.

A hierarchical layer at a level immediately shallower than a parent hierarchical layer is referred to as a grand-parent hierarchical layer and a hierarchical layer at a level immediately deeper than a child hierarchical layer is referred to as a grand-child hierarchical layer.

Icons, which pertain to a child hierarchical layer and are obtained as a result of classification of an icon pertaining to a parent hierarchical layer, are each referred to as a child icon of the icon pertaining to the parent hierarchical layer. On the other hand, the icon pertaining to the parent hierarchical layer is referred to as the parent icon of the icons, which pertain to the child hierarchical layer and are obtained as a result of classification of the icon pertaining to the parent hierarchical layer. For example, the icons 71-1-1 to 71-1-6, which are obtained as a result of classification of the icon 71-1, are each a child icon of the icon 71-1. On the other hand, the icon 71-1 is the parent icon of the icons 71-1-1 to 71-1-6.

By operating the "↑" or "↓" key of the input unit 23 or the button 43 of the remote commander 5 in a direction indicated by the arrow B or D shown in FIG. 2, the cursor 81-1 can be moved to the position of a desired one of the icons 71-1 to 71-5 to specify the desired icon. In the case of the screen of FIG. 5, which appears as an initial screen when the EMD system is activated, the cursor 81-1 specifies the icon 71-1 corresponding to the America category. In this example, the display of the lines enclosing the specified icon 71-1 is emphasized.

The icon 71-1 is the parent icon of the icons 71-1-1 to 71-1-6 as indicated by a parent-to-child relation 82-1 shown in FIG. 5.

A field 72 appears at a predetermined position on the screen displayed on the monitor apparatus 8. In this example, the field 72 appears on the left upper side of the screen. As shown in FIG. 5, the field 72 displays a string of characters such as "America" corresponding to a category represented by the icon 71-1 specified by the cursor 81-1.

A field 73 appears at a predetermined position on the screen displayed on the monitor apparatus 8. In this example, the field 73 appears at a position on the middle left side below the field 72. As shown in FIG. 5, the field 73 displays a text such as "The music scene of America . . . " describing the category represented by the icon 71-1 specified by the cursor 81-1.

A field 74 appears at a predetermined position on the screen displayed on the monitor apparatus 8. In this example, the field 74 appears at a position on the lower left side below the field 73. As shown in FIG. 5, the field 74 displays a still or moving picture relevant to the category represented by the icon 71-1 specified by the cursor 81-1.

Figure 6:
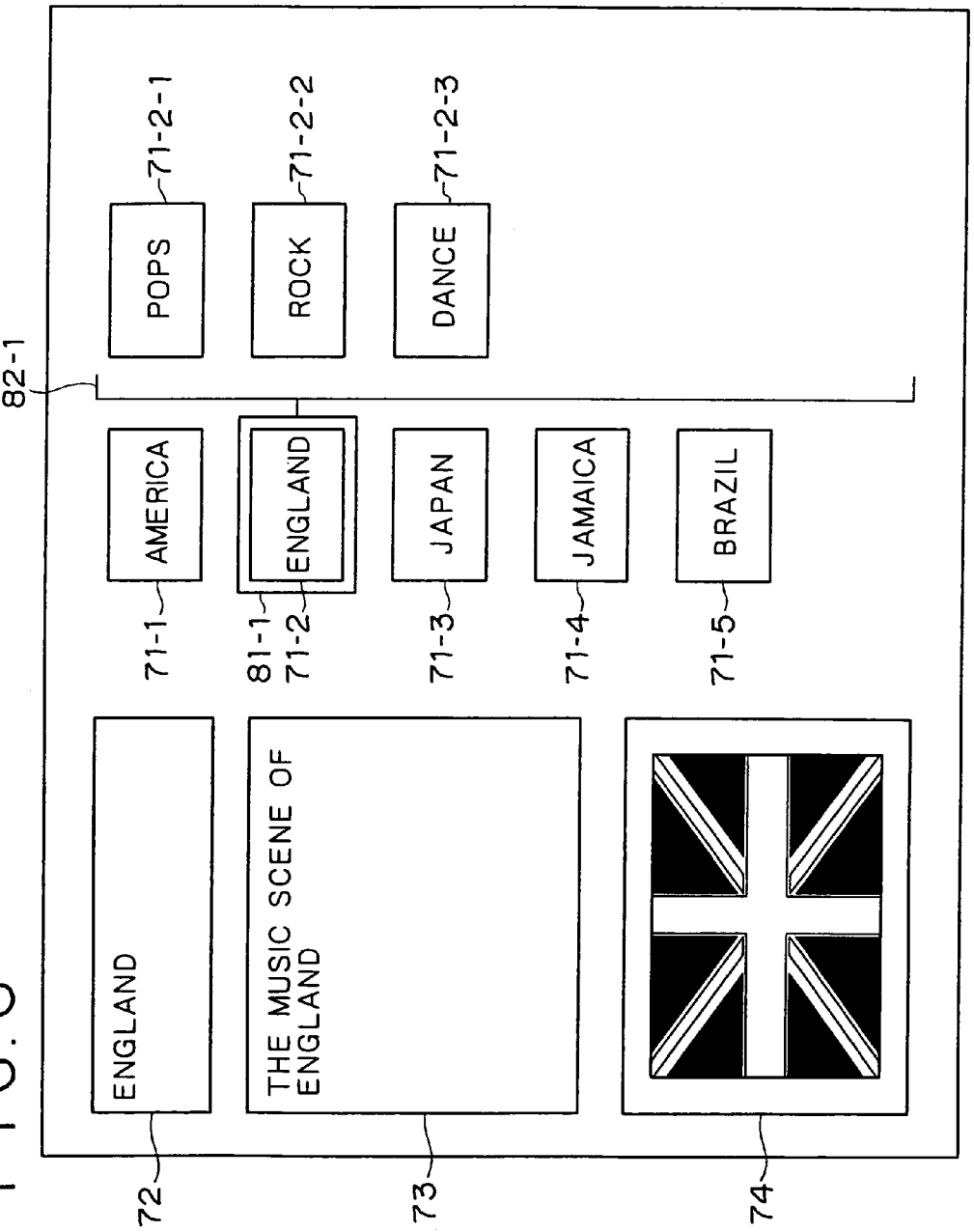
FIG. 6 is a diagram showing a typical screen displayed by the set top box on the monitor apparatus.

FIG. 6 is a diagram showing a screen displayed by the set top box 1 on the monitor apparatus 8 as a result of an operation, which is carried out by the user on the "↓" key of the input unit 23 or the button 43 of the remote commander 5 in a direction indicated by the arrow B shown in FIG. 2 while the set top box 1 is displaying the screen shown in FIG. 5 on the monitor apparatus 8.

On the screen shown in FIG. 6, the cursor 81-1 specifies the icon 71-2 representing the England category. The icon 71-2 has a child icon 71-2-1 representing a sub-category named Pops, a child icon 71-2-2 representing a sub-category named Rock and a child icon 71-2-3 representing a sub-category named Dance. The child icons 71-2-1, 71-2-2 and 71-2-3 form an array displayed on the monitor apparatus 8 as a column hierarchical layer on the right side of the column of the hierarchical layer comprising the icons 71-1 to 71-5 on a screen displayed on the monitor apparatus 8.

The icon 71-2-1 is specified to display a string of characters, a text and a picture associated with contents or pieces of music data classified into a Pops sub-category in the England category on the screen of the monitor apparatus 8, or to download contents or pieces of music data classified into the Pops sub-category in the England category from the server 4 to the set top box 1. By the same token, the icon 71-2-2 is specified to display a string of characters, a text and a picture associated with contents or pieces of music data classified into a Rock sub-category in the England category on the screen of the monitor apparatus 8, or to download contents or pieces of music data classified into the Rock sub-category in the England category from the server 4 to the set top box 1. In the same way, the icon 71-2-3 is specified to display a string of characters, a text and a picture associated with contents or pieces of music data classified into a Dance sub-category in the England category on the screen of the monitor apparatus 8, or to download contents or pieces of music data classified into the Dance sub-category in the England category from the server 4 to the set top box 1.

The icon 71-2 is the parent icon of the icons 71-2-1 to 71-2-3 as indicated by a parent-to-child relation 82-1 shown in FIG. 6.

A field 72 appears at a predetermined position on the screen displayed on the monitor apparatus 8. In this example, the field 72 appears on the left upper side of the screen. As shown in FIG. 6, the field 72 displays a string of characters such as "England" corresponding to a category represented by the icon 71-2 specified by the cursor 81-1.

A field 73 appears at a predetermined position on the screen displayed on the monitor apparatus 8. In this example, the field 73 appears at a position on the middle left side below the field 72. As shown in FIG. 6, the field 73 displays a text such as "The music scene of England . . . " describing the category represented by the icon 71-2 specified by the cursor 81-1.

A field 74 appears at a predetermined position on the screen displayed on the monitor apparatus 8. In this example, the field 74 appears at a position on the lower left side below the field 73. As shown in FIG. 6, the field 74 displays a still or moving picture relevant to the category represented by the icon-71-2 specified by the cursor 81-1.

Figure 7:
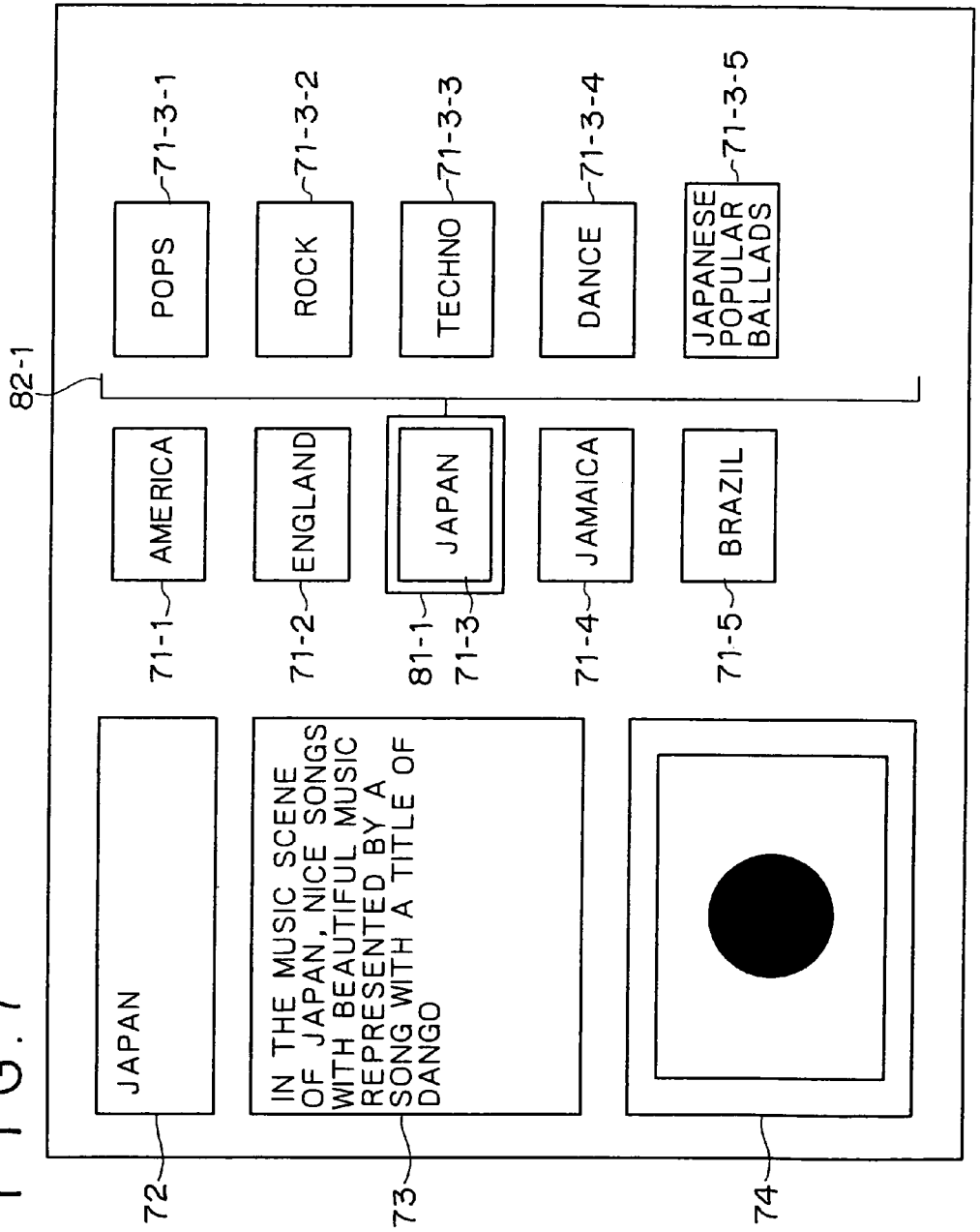
FIG. 7 is a diagram showing a typical screen displayed by the set top box on the monitor apparatus.

FIG. 7 is a diagram showing a screen displayed by the set top box 1 on the monitor apparatus 8 as a result of an operation, which is carried out by the user on the "↓" key of the input unit 23 or the button 43 of the remote commander 5 in a direction indicated by the arrow B shown in FIG. 2 while the set top box 1 is displaying the screen shown in FIG. 6 on the monitor apparatus 8.

On the screen shown in FIG. 7, the cursor 81-1 specifies the icon 71-3 representing the Japan category. The icon 71-3 has a child icon 71-3-1 representing a sub-category named Pops, a child icon 71-3-2 representing a sub-category named Rock, a child icon 71-3-3 representing a sub-category named Techno, a child icon 71-3-4 representing a sub-category named Dance and a child icon 71-3-5 representing a sub-category named "Japanese popular ballads". The child icons 71-3-1 to 71-3-5 form an array displayed on the monitor apparatus 8 as a column hierarchical layer on the right side of the column of the hierarchical layer comprising the icons 71-1 to 71-5 on a screen displayed on the monitor apparatus 8.

The icon 71-3-1 is specified to display a string of characters, a text and a picture associated with contents or pieces of music data classified into a Pops sub-category in the Japan category on the screen of the monitor apparatus 8, or to download contents or pieces of music data classified into the Pops sub-category in the Japan category from the server 4 to the set top box 1. By the same token, the icon 71-3-2 is specified to display a string of characters, a text and a picture associated with contents or pieces of music data classified into a Rock sub-category in the Japan category on the screen of the monitor apparatus 8, or to download contents or pieces of music data classified into the Rock sub-category in the Japan category from the server 4 to the set top box 1. Likewise, the icon 71-3-3 is specified to display a string of characters, a text and a picture associated with contents or pieces of music data classified into a Techno sub-category in the Japan category on the screen of the monitor apparatus 8, or to download contents or pieces of music data classified into the Techno sub-category in the Japan category from the server 4 to the set top box 1.

Similarly, the icon 71-3-4 is specified to display a string of characters, a text and a picture associated with contents or pieces of music data classified into a Dance sub-category in the Japan category on the screen of the monitor apparatus 8, or to download contents or pieces of music data classified into the Dance sub-category in the Japan category from the server 4 to the set top box 1. In the same way, the icon 71-3-5 is specified to display a string of characters, a text and a picture associated with contents or pieces of music data classified into a "Japanese popular ballads" sub-category in the Japan category on the screen of the monitor apparatus 8, or to download contents or pieces of music data classified into the "Japanese popular ballads" sub-category in the Japan category from the server 4 to the set top box 1.

The icon 71-3 is the parent icon of the icons 71-3-1 to 71-3-5 as indicated by a parent-to-child relation 82-1 shown in FIG. 7.

A field 72 appears at a predetermined position on the screen displayed on the monitor apparatus 8. In this example, the field 72 appears on the left upper side of the screen. As shown in FIG. 7, the field 72 displays a string of characters such as "Japan" corresponding to a category represented by the icon 71-3 specified by the cursor 81-1.

A field 73 appears at a predetermined position on the screen displayed on the monitor apparatus 8. In this example, the field 73 appears at a position on the middle left side below the field 72. As shown in FIG. 7, the field 73 displays a text such as "In the music scene of Japan, nice songs with beautiful music represented by a song with a title of Dango . . . " describing the category represented by the icon 71-3 specified by the cursor 81-1.

A field 74 appears at a predetermined position on the screen displayed on the monitor apparatus 8. In this example, the field 74 appears at a position on the lower left side below the field 73. As shown in FIG. 7, the field 74 displays a still or moving picture relevant to the category represented by the icon 71-3 specified by the cursor 81-1.

Figure 8:
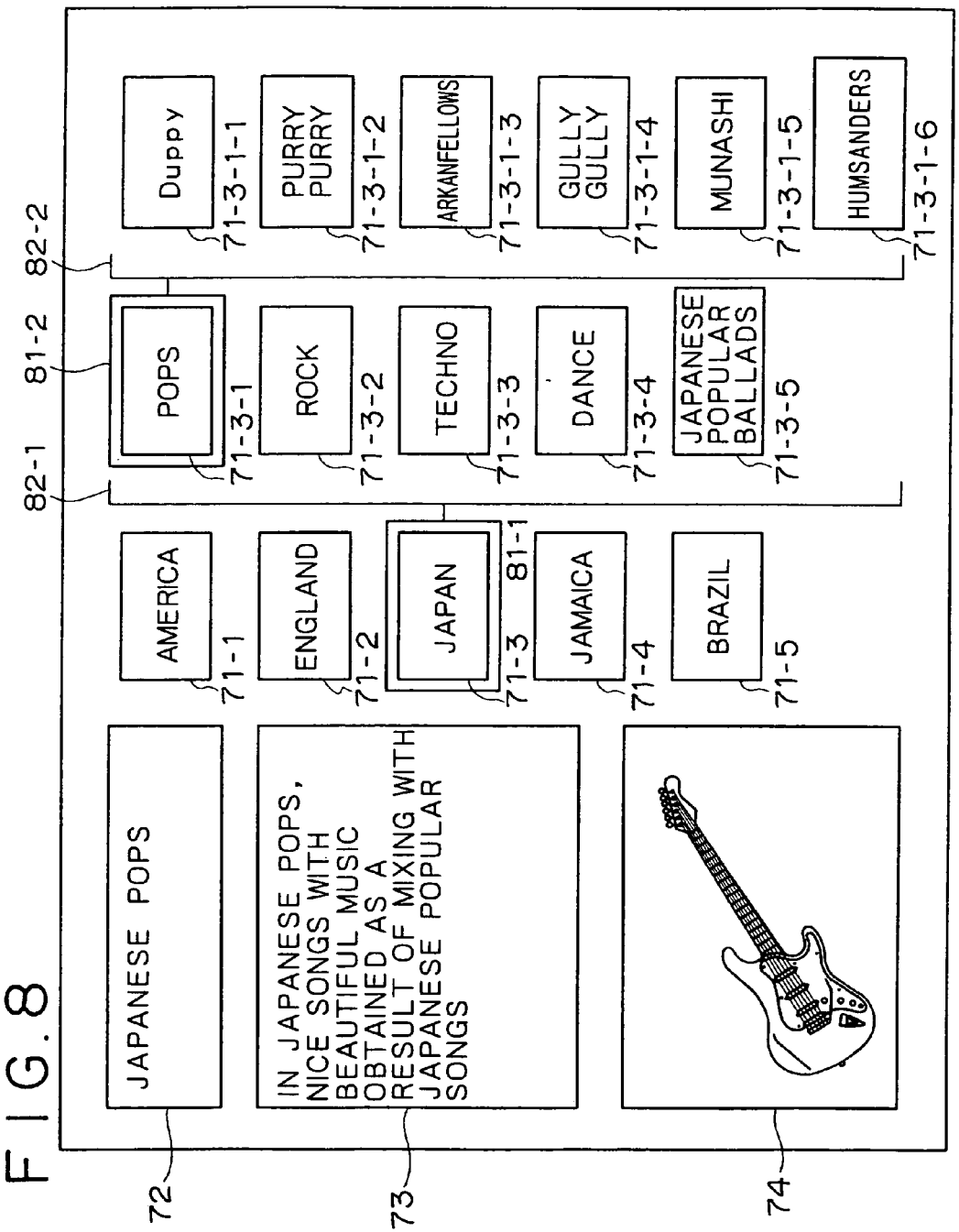
FIG. 8 is a diagram showing a typical screen displayed by the set top box on the monitor apparatus.

FIG. 8 is a diagram showing a screen displayed by the set top box 1 on the monitor apparatus 8 as a result of an operation, which is carried out by the user on the "→" key of the input unit 23 or the button 43 of the remote commander 5 in a direction indicated by the arrow A shown in FIG. 2 while the set top box 1 is displaying the screen shown in FIG. 7 on the monitor apparatus 8.

The operation carried out by the user on the "→" key of the input unit 23 or the button 43 of the remote commander 5 in a direction indicated by the arrow A described above moves the cursor 81-1 to a position occupied by the cursor 81-2 shown in FIG. 8. On the screen shown in FIG. 8, the cursor 81-2 displayed on the monitor apparatus 8 specifies the icon 71-3-1, a child of the icon 71-3.

The operation carried out by the user on the "→" key of the input unit 23 or the button 43 of the remote commander 5 in a direction indicated by the arrow A described above shifts the focus of attention to a hierarchical layer including the icon 71-3-1 specified by the cursor 81-2. Now, on the screen shown in FIG. 8, the icons 71-1 to 71-5 can each be regarded as an icon representing a super-category and the icons 71-3-1 to 71-3-5 can each be regarded as an icon representing a category.

The icon 71-3-1 has a child icon 71-3-1-1 representing a sub-category of an artist (or artists) named Duppy, a child icon 71-3-1-2 representing a sub-category of an artist (or artists) named Purry Purry, a child icon 71-3-1-3 representing a sub-category of an artist (or artists) named Arkanfellows, a child icon 71-3-1-4 representing a sub-category of an artist (or artists) named Gully Gully, a child icon 71-3-1-5 representing a sub-category of an artist (or artists) named Munashi and a child icon 71-3-1-6 representing a sub-category of an artist (or artists) named Humsanders. The child icons 71-3-1-1 to 71-3-1-6 form an array displayed on the monitor apparatus 8 as a column hierarchical layer on the right side of the column of the hierarchical layer comprising the icons 71-3-1 to 71-3-5 on a screen displayed on the monitor apparatus 8.

The icon 71-3-1-1 is specified to display a string of characters, a text and a picture associated with contents or pieces of music data classified into the Duppy artist-name sub-category of the Pops category of the Japan super-category on the screen of the monitor apparatus 8, or to download contents or pieces of music data classified into the Duppy artist-name sub-category of the Pops category of the Japan super-category from the server 4 to the set top box 1. By the same token, the icon 71-3-1-2 is specified to display a string of characters, a text and a picture associated with contents or pieces of music data classified into the Purry Purry artist-name sub-category of the Pops category of the Japan super-category on the screen of the monitor apparatus 8, or to download contents or pieces of music data classified into the Purry Purry artist-name sub-category of the Pops category of the Japan super-category from the server 4 to the set top box 1. Similarly, the icon 71-3-1-3 is specified to display a string of characters, a text and a picture associated with contents or pieces of music data classified into the Arkanfellows artist-name sub-category of the Pops category of the Japan super-category on the screen of the monitor apparatus 8, or to download contents or pieces of music data classified into the Arkanfellows artist-name sub-category of the Pops category of the Japan super-category from the server 4 to the set top box 1.

Likewise, the icon 71-3-1-4 is specified to display a string of characters, a text and a picture associated with contents or pieces of music data classified into the Gully Gully artist-name sub-category of the Pops category of the Japan super-category on the screen of the monitor apparatus 8, or to download contents or pieces of music data classified into the Gully Gully artist-name sub-category of the Pops category of the Japan super-category from the server 4 to the set top box 1. In the same way, the icon 71-3-1-5 is specified to display a string of characters, a text and a picture associated with contents or pieces of music data classified into the Munashi artist-name sub-category of the Pops category of the Japan super-category on the screen of the monitor apparatus 8, or to download contents or pieces of music data classified into the Munashi artist-name sub-category of the Pops category of the Japan super-category from the server 4 to the set top box 1. By the same token, the icon 71-3-1-6 is specified to display a string of characters, a text and a picture associated with contents or pieces of music data classified into the Humsanders artist-name sub-category of the Pops category of the Japan super-category on the screen of the monitor apparatus 8, or to download contents or pieces of music data classified into the Humsanders artist-name sub-category of the Pops category of the Japan super-category from the server 4 to the set top box 1.

The icon 71-3-1 is the parent icon of the icons 71-3-1-1 to 71-3-1-6 as indicated by a parent-to-child relation 82-2 shown in FIG. 8.

A field 72 appears at a predetermined position on the screen displayed on the monitor apparatus 8. In this example, the field 72 appears on the left upper side of the screen. As shown in FIG. 8, the field 72 displays a string of characters such as "Japan" corresponding to a super category represented by the icon 71-3 specified by the cursor 81-1 and a string of characters such as "Pops" corresponding to a category represented by the icon 71-3-1 specified by the cursor 81-2. As described earlier, the icon 71-3-1 pertains to a hierarchical layer on which attention is focused.

A field 73 appears at a predetermined position on the screen displayed on the monitor apparatus 8. In this example, the field 73 appears at a position on the middle left side below the field 72. As shown in FIG. 8, the field 73 displays a text such as "In Japanese pops, nice songs with beautiful music obtained as a result of mixing with Japanese popular songs . . . " describing the category represented by the icon 71-3-1 specified by the cursor 81-2. As described earlier, the icon 71-3-1 pertains to a hierarchical layer on which attention is focused.

A field 74 appears at a predetermined position on the screen displayed on the monitor apparatus 8. In this example, the field 74 appears at a position on the lower left side below the field 73. As shown in FIG. 8, the field 74 displays a still or moving picture such as a guitar relevant to the category represented by the icon 71-3-1 specified by the cursor 81-2. As described earlier, the icon 71-3-1 pertains to a hierarchical layer on which attention is focused.

In this way, when an icon 71-3-n is specified by using the cursor 81-2 where n=1 to 5, the set top box 1 displays the icons 71-1 to 71-5 pertaining to the parent hierarchical layer of the specified icon 71-3-n, and displays the icons 71-3-n-1 to the 71-3-n-6 pertaining to a child hierarchical layer of the specified icon 71-3-n on the monitor apparatus 8. Thus, the user is capable of specifying one of the icons 71-3-1 to 73-1-5 representing a desired content easily and correctly.

The following description explains how the screen of FIG. 8 displayed by the set top box 1 on the monitor apparatus 8 changes when the user operates the "→" key of the input unit 23 or the button 43 of the remote commander 5 in a direction indicated by the arrow A shown in FIG. 2 by referring to FIGS. 9 to 12.

When the user operates the "→" key of the input unit 23 or the button 43 of the remote commander 5 in a direction indicated by the arrow A, the set top box 1 gradually changes the screen displayed on the monitor apparatus 8 at a speed that allows the user to recognize the gradual changes as shown sequentially in FIGS. 9 to 12.

Figure 9:
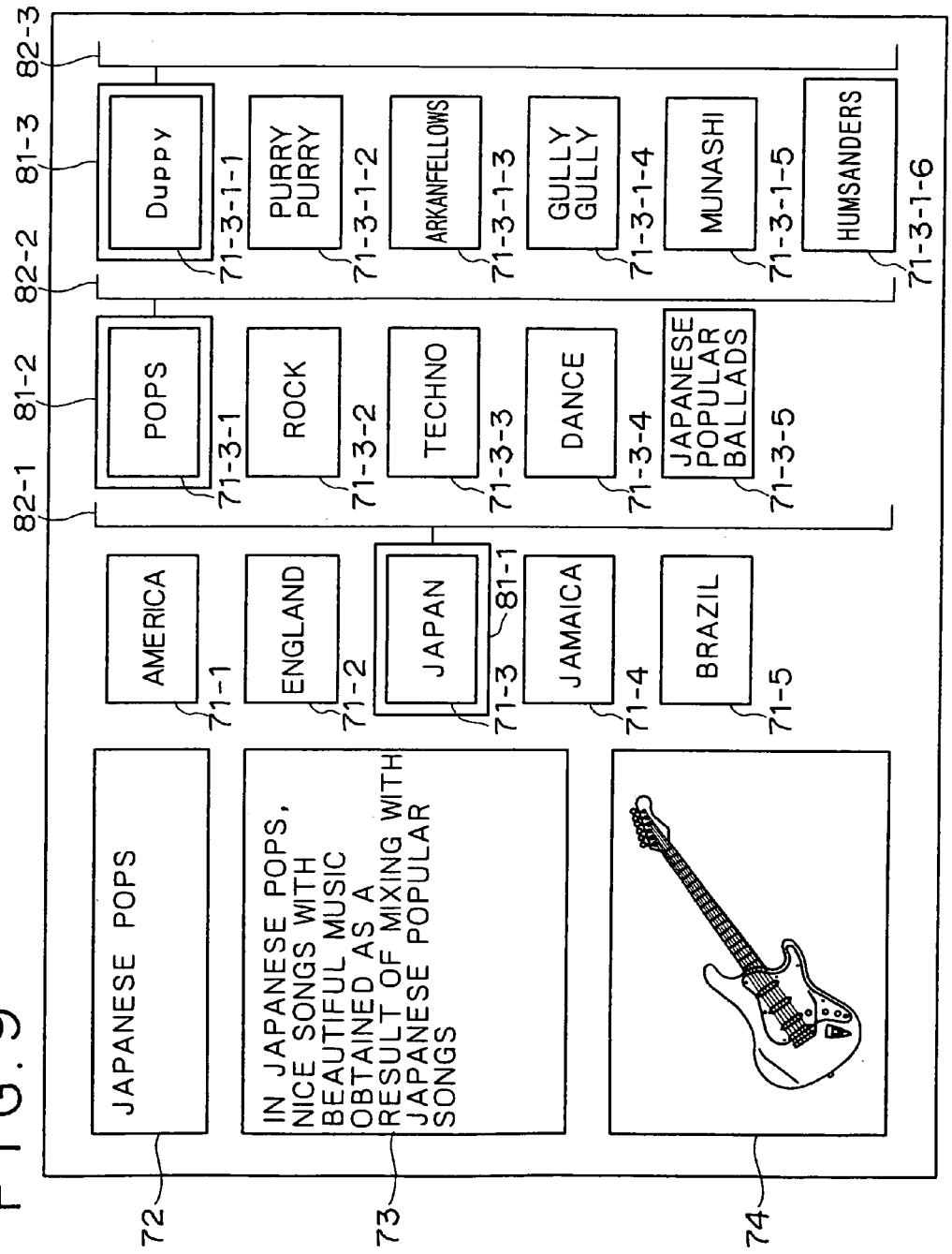
FIG. 9 is a diagram showing a typical screen displayed by the set top box on the monitor apparatus.

On the screen of FIG. 9 displayed on the monitor apparatus 8, the cursor 81-3 specifies an icon 71-3-1-1. The icon 71-3-1-1 is a child of the icon 71-3-1 specified by the cursor 81-2 on the screen shown in FIG. 8.

Figure 10:
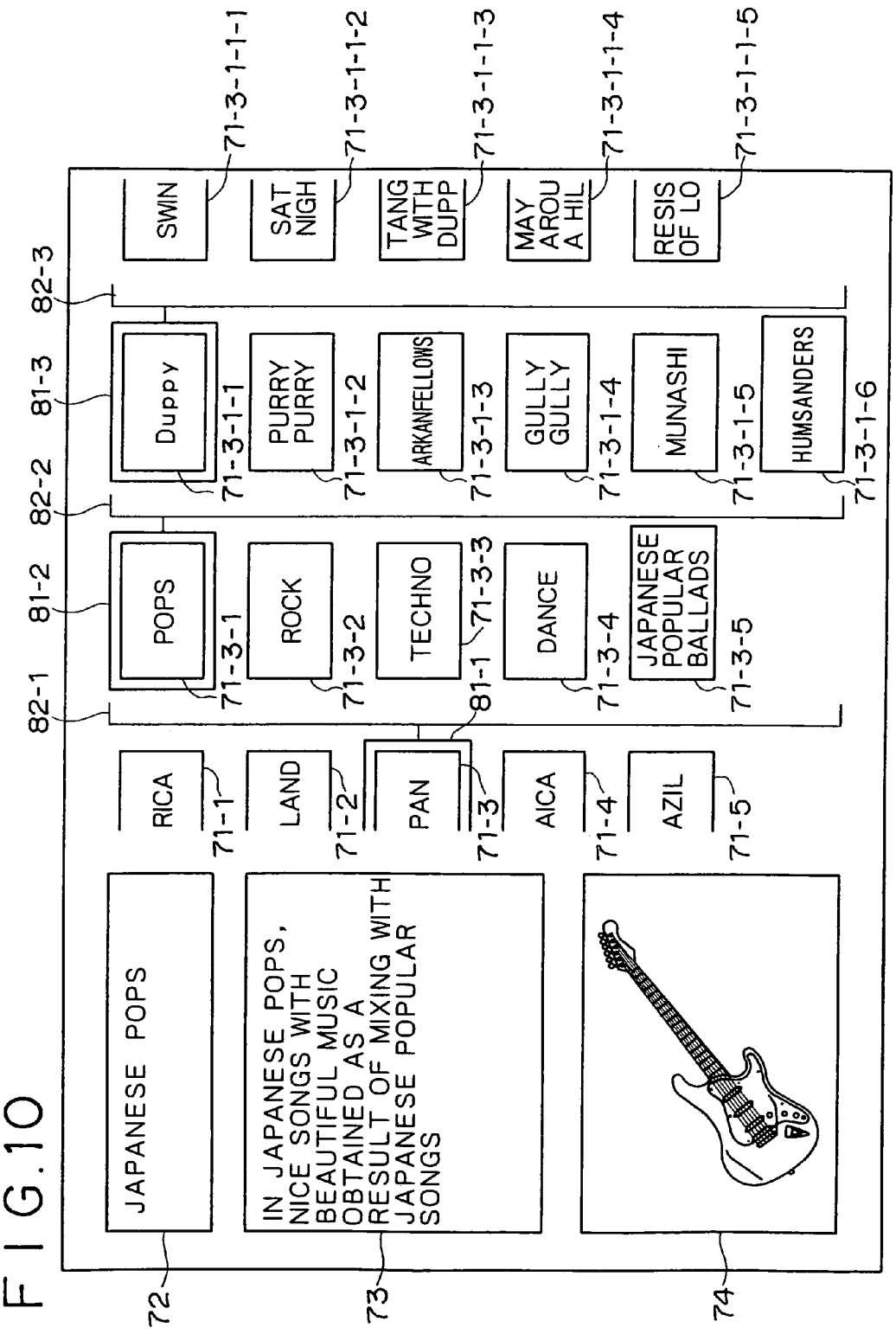
FIG. 10 is a diagram showing a typical screen displayed by the set top box on the monitor apparatus.
Figure 11:
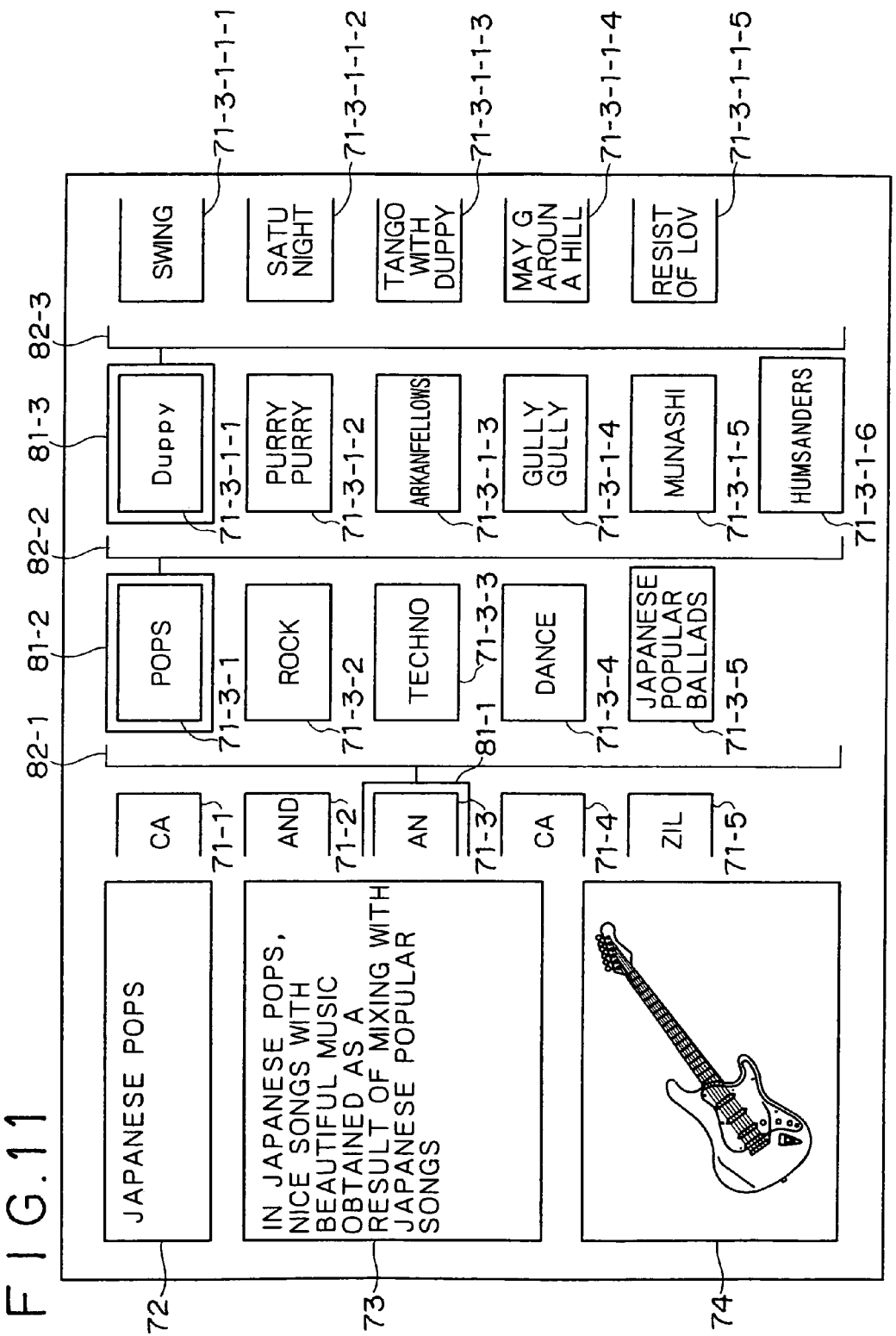
FIG. 11 is a diagram showing a typical screen displayed by the set top box on the monitor apparatus.
Figure 12:
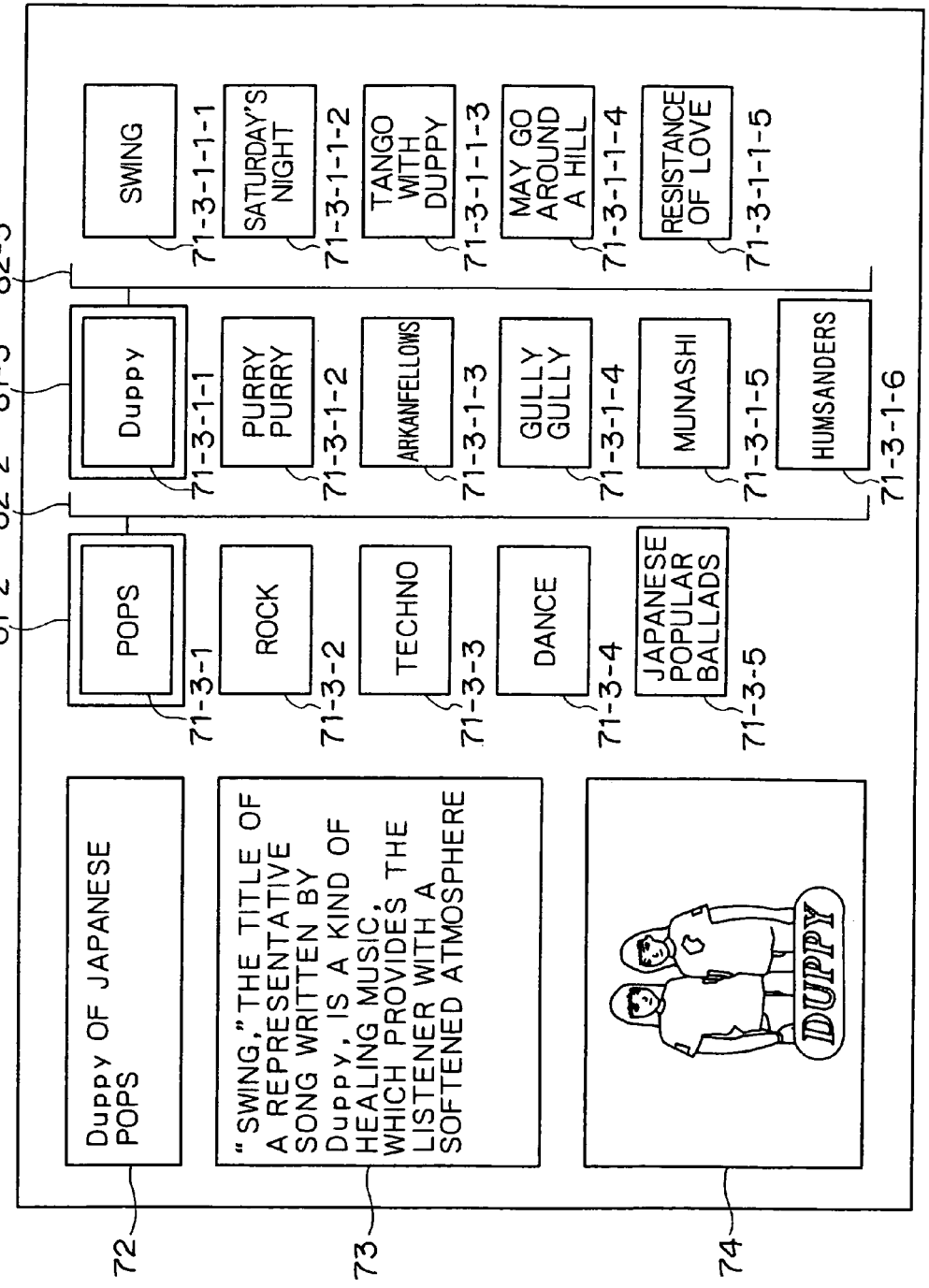
FIG. 12 is a diagram showing a typical screen displayed by the set top box on the monitor apparatus.

As shown in FIGS. 10 through 12, the icon 71-3-1-1 has a child icon 71-3-1-1-1 representing a content or a piece of music with a title of "Swing", a child icon 71-3-1-1-2 representing a content or a piece of music with a title of "Saturday's Night", a child icon 71-3-1-1-3 representing a content or a piece of music with a title of "Tango with Duppy", a child icon 71-3-1-1-4 representing a content or a piece of music with a title of "May Go around a Hill" and a child icon 71-3-1-1-5 representing a content or a piece of music with a title of "Resistance of Love". On the screen displayed on the monitor apparatus 8, the icons 71-3-1-1-1 to 71-3-1-1-5 form a column hierarchical layer, which appears gradually on the right side of the column of the hierarchical layer comprising the icons 71-3-1-1 to 71-3-1-6, shifting the frame of the screen window frame from the left to the right little by little.

The screen window frame is shifted from the left to the right, or from the right to the left, at a low speed that allows the user to recognize the changes in what is displayed through the window. Such a scroll movement is referred to as an animation scroll.

As a result of the animation scroll, the set top box 1 displays the icons 71-3-1-1-1 to 71-3-1-1-5 as shown in FIG. 12. The user is thus capable of recognizing a parent-child relation 82-3 between the icon 71-3-1-1 and the icons 71-3-1-1-1 to 71-3-1-1-5 with ease.

The icon 71-3-1-1-1 is specified to display a string of characters, a text and a picture associated with a content or a piece of music data with a title of "Swing" sung by the artists named Duppy and treated as a sub-category of the Pops category of the Japan super-category on the screen of the monitor apparatus 8, or to download a content or a piece of music data with a title of "Swing" sung by the artists named Duppy and treated as a sub-category of the Pops category of the Japan super-category from the server 4 to the set top box 1. By the same token, the icon 71-3-1-1-2 is specified to display a string of characters, a text and a picture associated with a content or a piece of music data with a title of "Saturday's Night" sung by the artists named Duppy and treated as a sub-category of the Pops category of the Japan super-category on the screen of the monitor apparatus 8, or to download a content or a piece of music data with a title of "Saturday's Night" sung by the artists named Duppy and treated as a sub-category of the Pops category of the Japan super-category from the server 4 to the set top box 1. In the same way, the icon 71-3-1-1-3 is specified to display a string of characters, a text and a picture associated with a content or a piece of music data with a title of "Tango with Duppy" sung by the artists named Duppy and treated as a sub-category of the Pops category of the Japan super-category on the screen of the monitor apparatus 8, or to download a content or a piece of music data with a title of "Tango with Duppy" sung by the artists named Duppy and treated as a sub-category of the Pops category of the Japan super-category from the server 4 to the set top box 1.

Likewise, the icon 71-3-1-1-4 is specified to display a string of characters, a text and a picture associated with a content or a piece of music data with a title of "May Go around a Hill" sung by the artists named Duppy and treated as a sub-category of the Pops category of the Japan super-category on the screen of the monitor apparatus 8, or to download a content or a piece of music data with a title of "May Go around a Hill" sung by the artists named Duppy and treated as a sub-category of the Pops category of the Japan super-category from the server 4 to the set top box 1. Similarly, the icon 71-3-1-1-5 is specified to display a string of characters, a text and a picture associated with a content or a piece of music data with a title of "Resistance of Love" sung by the artists named Duppy and treated as a sub-category of the Pops category of the Japan super-category on the screen of the monitor apparatus 8, or to download a content or a piece of music data with a title of "Resistance of Love" sung by the artists named Duppy and treated as a sub-category of the Pops category of the Japan super-category from the server 4 to the set top box 1.

The icon 71-3-1-1 is the parent icon of the icons 71-3-1-1-1 to 71-3-1-1-5 as indicated by a parent-to-child relation 82-3 shown in FIGS. 9 to 12.

On the screen shown in FIG. 12, the focus of attention has been moved to a hierarchical layer including the icon 71-3-1-1 specified by the cursor 81-3.

As shown in FIG. 12, with all the icons 71-3-1-1-1 to 71-3-1-1-5 displayed on the screen, the field 72 displays a string of characters such as Japan corresponding to the super-category icon 71-3 specified by the cursor 81-1, displays a string of characters such as Pops corresponding to the category icon 71-3-1 specified by the cursor 81-2 and displays a string of characters such as Duppy corresponding to the sub-category icon 71-3-1-1 specified by the cursor 81-3.

As shown in FIG. 12, with all the icons 71-3-1-1-1 to 71-3-1-1-5 displayed on the screen, the field 73 displays a phrase such as ""Swing", the title of a representative song written by Duppy, is a kind of healing music, which provides the listener with a softened atmosphere . . . " corresponding to the artist sub-category icon 71-3-1-1 specified by the cursor 81-3 on a hierarchical layer serving as the focus of attention.

As shown in FIG. 12, with all the icons 71-3-1-1-1 to 71-3-1-1-5 displayed on the screen, the field 74 displays a still or moving picture of Duppy, the name of the artists used as the sub-category icon 71-3-1-1 specified by the cursor 81-3 on a hierarchical layer serving as the focus of attention.

Figure 13:
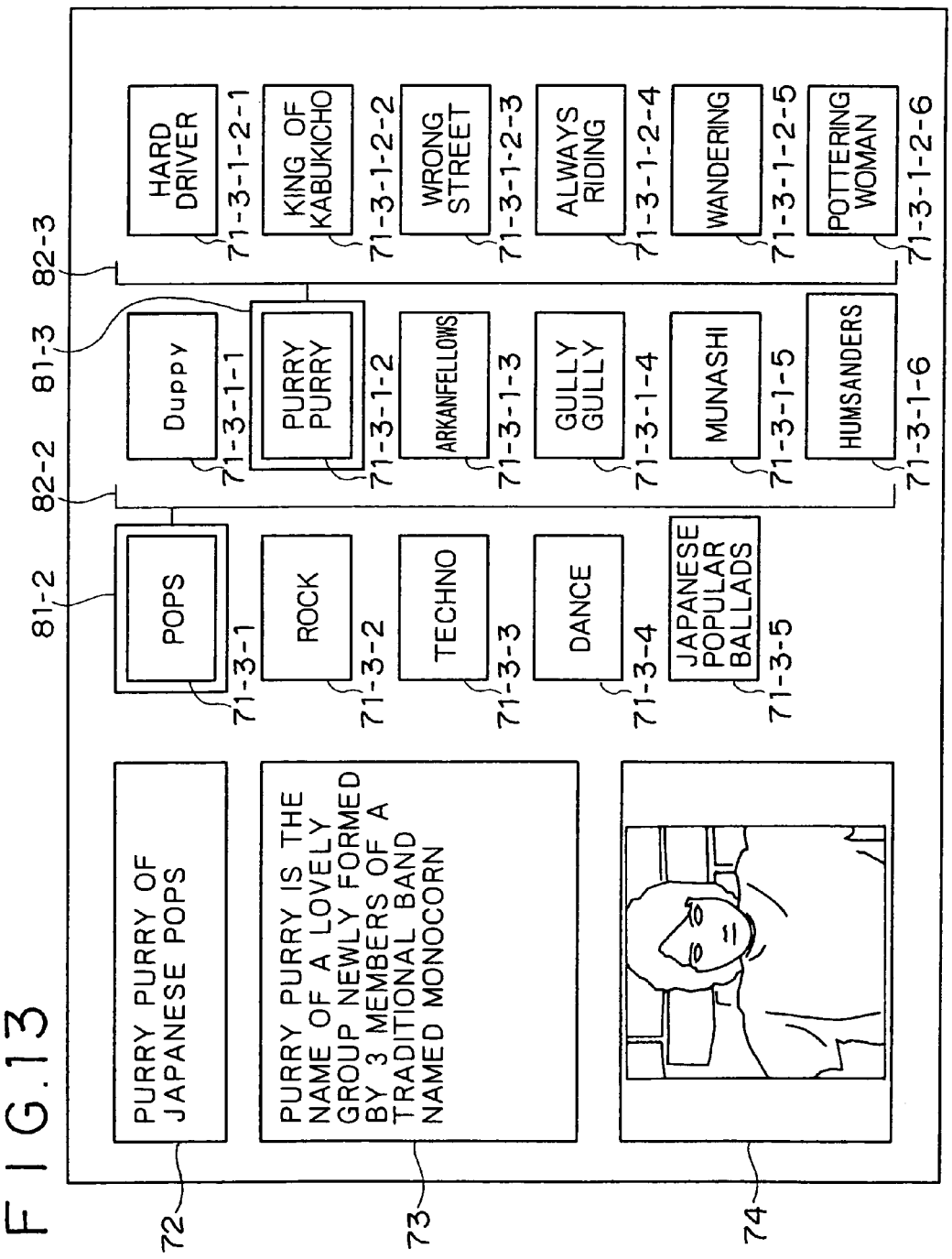
FIG. 13 is a diagram showing a typical screen displayed by the set top box on the monitor apparatus.

FIG. 13 is a diagram showing a screen displayed by the set top box 1 on the monitor apparatus 8 as a result of an operation, which is carried out by the user on the "↓" key of the input unit 23 or the button 43 of the remote commander 5 in a direction indicated by the arrow B shown in FIG. 2 while the set top box 1 is displaying the screen shown in FIG. 12 on the monitor apparatus 8 to move the cursor 81-3 downward.

As a result of an operation carried out by the user on the "↓" key of the input unit 23 or the button 43 of the remote commander 5 in a direction indicated by the arrow B, presently, the cursor 81-3 is specifying the icon 71-3-1-2.

The icon 71-3-1-2 has a child icon 71-3-1-2-1 representing a content or a piece of music data with a title of "Hard Driver", a child icon 71-3-1-2-2 representing a content or a piece of music data with a title of "King of Kabukicho", a child icon 71-3-1-2-3 representing a content or a piece of music data with a title of "Wrong Street", a child icon 71-3-1-2-4 representing a content or a piece of music data with a title of "Always Riding", a child icon 71-3-1-2-5 representing a content or a piece of music data with a title of "Wandering" and a child icon 71-3-1-2-6 representing a content or a piece of music data with a title of "Pottering Woman". On the screen displayed on the monitor apparatus 8, the icons 71-3-1-2-1 to 71-3-1-2-6 form a column hierarchical layer, which appears on the right side of the column of the hierarchical layer comprising the icons 71-3-1-1 to 71-3-1-6.

The icon 71-3-1-2-1 is specified to display a string of characters, a text and a picture associated with a content or a piece of music data with a title of "Hard Driver" sung by the artist named Purry Purry and treated as a sub-category of the Pops category of the Japan super-category on the screen of the monitor apparatus 8, or to download a content or a piece of music data with a title of "Hard Driver" sung by the artist named Purry Purry and treated as a sub-category of the Pops category of the Japan super-category from the server 4 to the set top box 1. By the same token, the icon 71-3-1-2-2 is specified to display a string of characters, a text and a picture associated with a content or a piece of music data with a title of "King of Kabukicho" sung by the artist named Purry Purry and treated as a sub-category of the Pops category of the Japan super-category on the screen of the monitor apparatus 8, or to download a content or a piece of music data with a title of "King of Kabukicho" sung by the artist named Purry Purry and treated as a sub-category of the Pops category of the Japan super-category from the server 4 to the set top box 1. Similarly, the icon 71-3-1-2-3 is specified to display a string of characters, a text and a picture associated with a content or a piece of music data with a title of "Wrong Street" sung by the artist named Purry Purry and treated as a sub-category of the Pops category of the Japan super-category on the screen of the monitor apparatus 8, or to download a content or a piece of music data with a title of "Wrong Street" sung by the artist named Purry Purry and treated as a sub-category of the Pops category of the Japan super-category from the server 4 to the set top box 1.

In the same way, the icon 71-3-1-2-4 is specified to display a string of characters, a text and a picture associated with a content or a piece of music data with a title of "Always Riding" sung by the artist named Purry Purry and treated as a sub-category of the Pops category of the Japan super-category on the screen of the monitor apparatus 8, or to download a content or a piece of music data with a title of "Always Riding" sung by the artist named Purry Purry and treated as a sub-category of the Pops category of the Japan super-category from the server 4 to the set top box 1. Likewise, the icon 71-3-1-2-5 is specified to display a string of characters, a text and a picture associated with a content or a piece of music data with a title of "Wandering" sung by the artist named Purry Purry and treated as a sub-category of the Pops category of the Japan super-category on the screen of the monitor apparatus 8, or to download a content or a piece of music data with a title of "Wandering" sung by the artist named Purry Purry and treated as a sub-category of the Pops category of the Japan super-category from the server 4 to the set top box 1. By the same token, the icon 71-3-1-2-6 is specified to display a string of characters, a text and a picture associated with a content or a piece of music data with a title of "Pottering Woman" sung by the artist named Purry Purry and treated as a sub-category of the Pops category of the Japan super-category on the screen of the monitor apparatus 8, or to download a content or a piece of music data with a title of "Pottering Woman" sung by the artist named Purry Purry and treated as a sub-category of the Pops category of the Japan super-category from the server 4 to the set top box 1.

The icon 71-3-1-2 is the parent icon of the icons 71-3-1-2-1 to 71-3-1-2-6 as indicated by a parent-to-child relation 82-3 shown in FIG. 13.

As shown in FIG. 13, with all the icons 71-3-1-2-1 to 71-3-1-2-6 displayed on the screen, the field 72 displays a string of characters such as Japan corresponding to the super-category icon 71-3 specified by the cursor 81-1, displays a string of characters such as Pops corresponding to the category icon 71-3-1 specified by the cursor 81-2 and displays a string of characters such as Purry Purry corresponding to the sub-category icon 71-3-1-2 specified by the cursor 81-3.

As shown in FIG. 13, with all the icons 71-3-1-2-1 to 71-3-1-2-6 displayed on the screen, the field 73 displays a phrase such as "Purry Purry is the name of a lovely group newly formed by 3 members of a traditional band named Monocorn . . . " corresponding to the artist sub-category icon 71-3-1-2 specified by the cursor 81-3 on a hierarchical layer serving as the focus of attention.

As shown in FIG. 13, with all the icons 71-3-1-1-1 to 71-3-1-1-6 displayed on the screen, the field 74 displays a still or moving picture of Purry Purry, the name of the artist used as the sub-category icon 71-3-1-2 specified by the cursor 81-3 on a hierarchical layer serving as the focus of attention.

Figure 14:
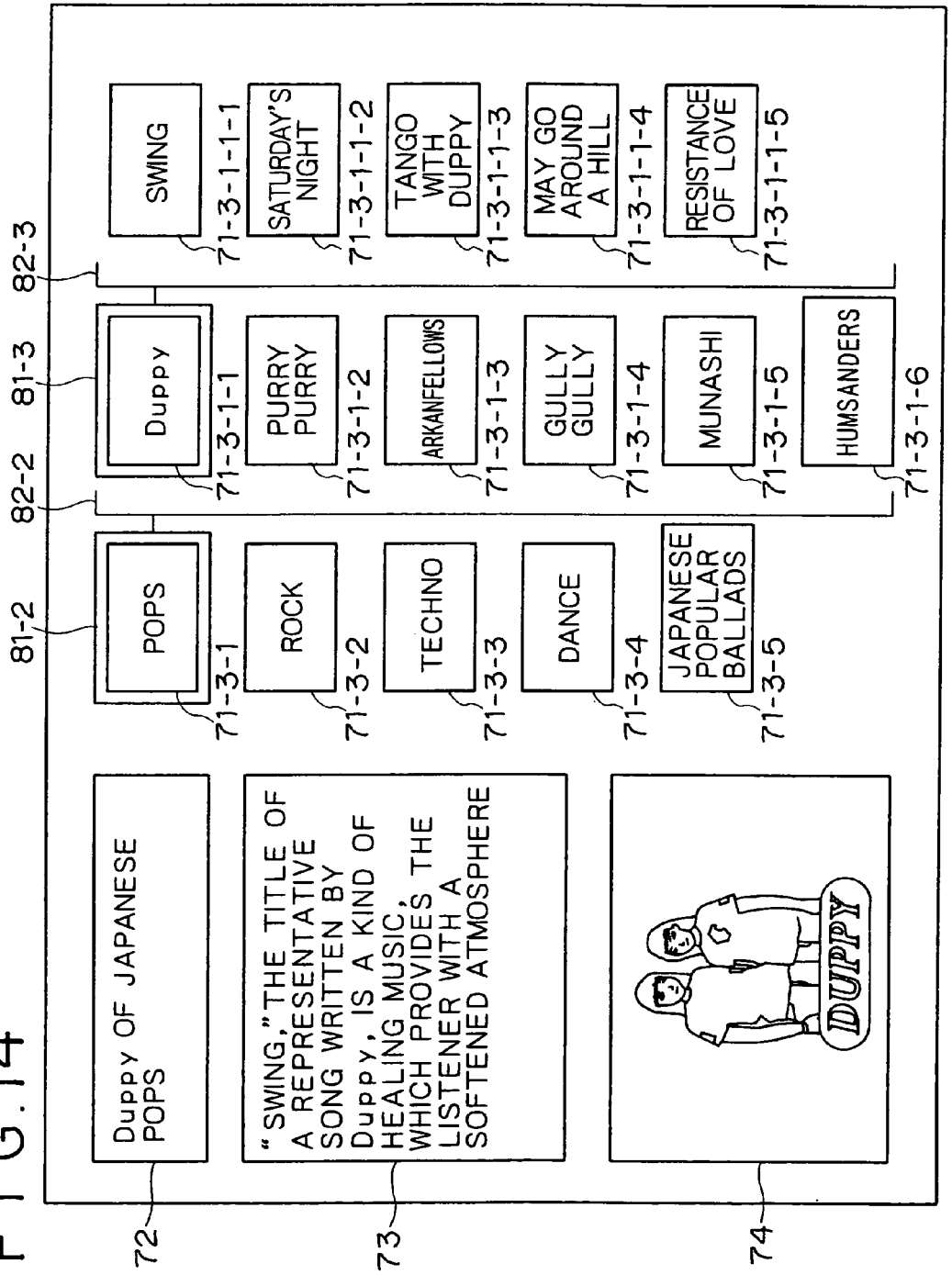
FIG. 14 is a diagram showing a typical screen displayed by the set top box on the monitor apparatus.

FIG. 14 is a diagram showing a screen displayed by the set top box 1 on the monitor apparatus 8 as a result of an operation, which is carried out by the user on the "↑" key of the input unit 23 or the button 43 of the remote commander 5 in a direction indicated by the arrow D shown in FIG. 2 while the set top box 1 is displaying the screen shown in FIG. 13 on the monitor apparatus 8 to move the cursor 81-3 upward.

As a result of an operation carried out by the user on the "↑" key of the input unit 23 or the button 43 of the remote commander 5 in a direction indicated by the arrow D, presently, the cursor 81-3 is again specifying the icon 71-3-1-1 as shown in the screen of FIG. 12 displayed on the monitor apparatus 8.

The following description explains how the screen of FIG. 14 displayed by the set top box 1 on the monitor apparatus 8 changes when the user operates the "→" key of the input unit 23 or the button 43 of the remote commander 5 in a direction indicated by the arrow A shown in FIG. 2 by referring to FIGS. 15 to 18.

When the user operates the "→" key of the input unit 23 or the button 43 of the remote commander 5 in a direction indicated by the arrow A, the set top box 1 gradually changes the screen displayed on the monitor apparatus 8 at a speed that allows the user to recognize the gradual changes as shown sequentially in FIGS. 15 to 18.

Figure 15:
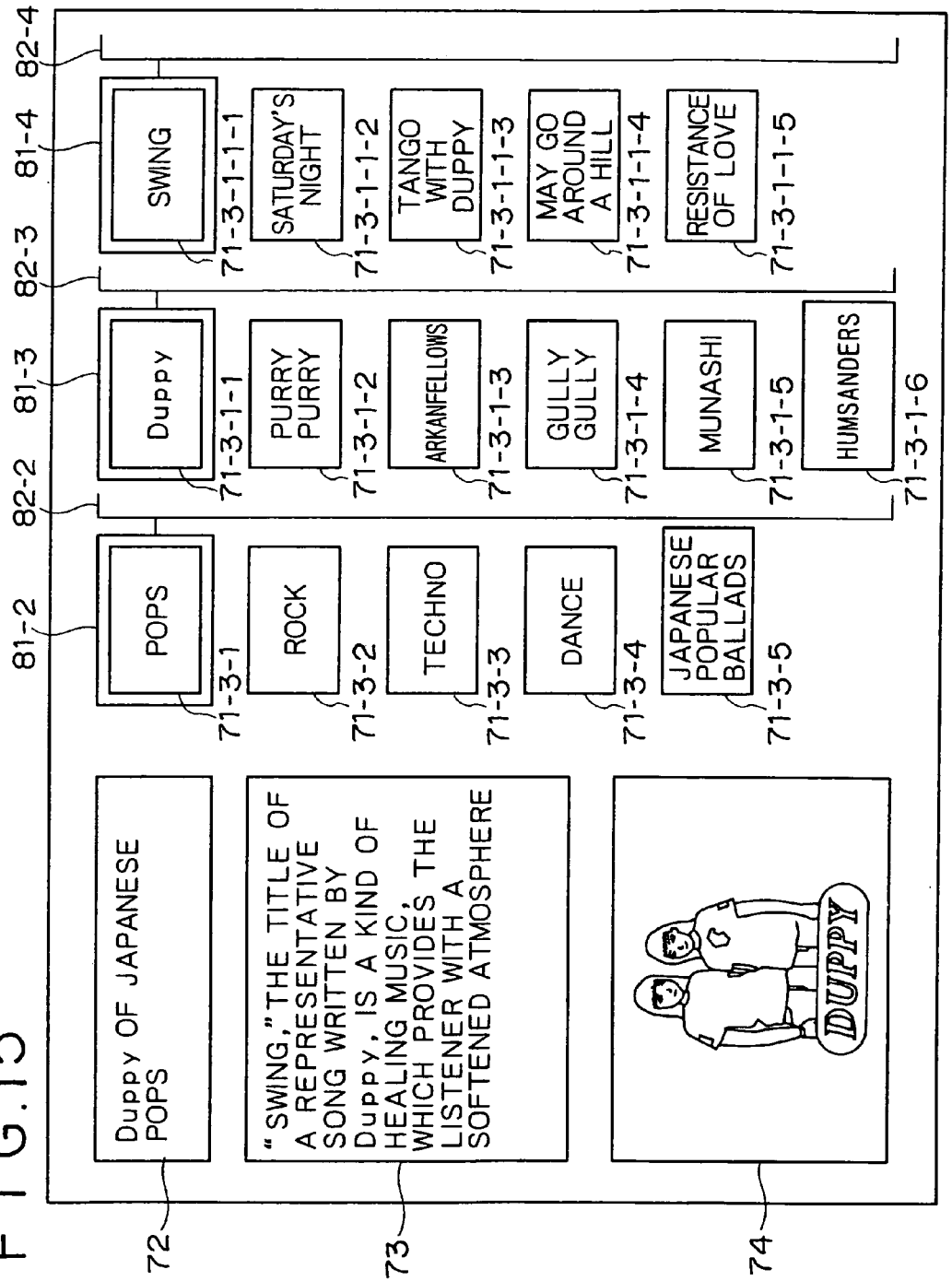
FIG. 15 is a diagram showing a typical screen displayed by the set top box on the monitor apparatus.
Figure 16:
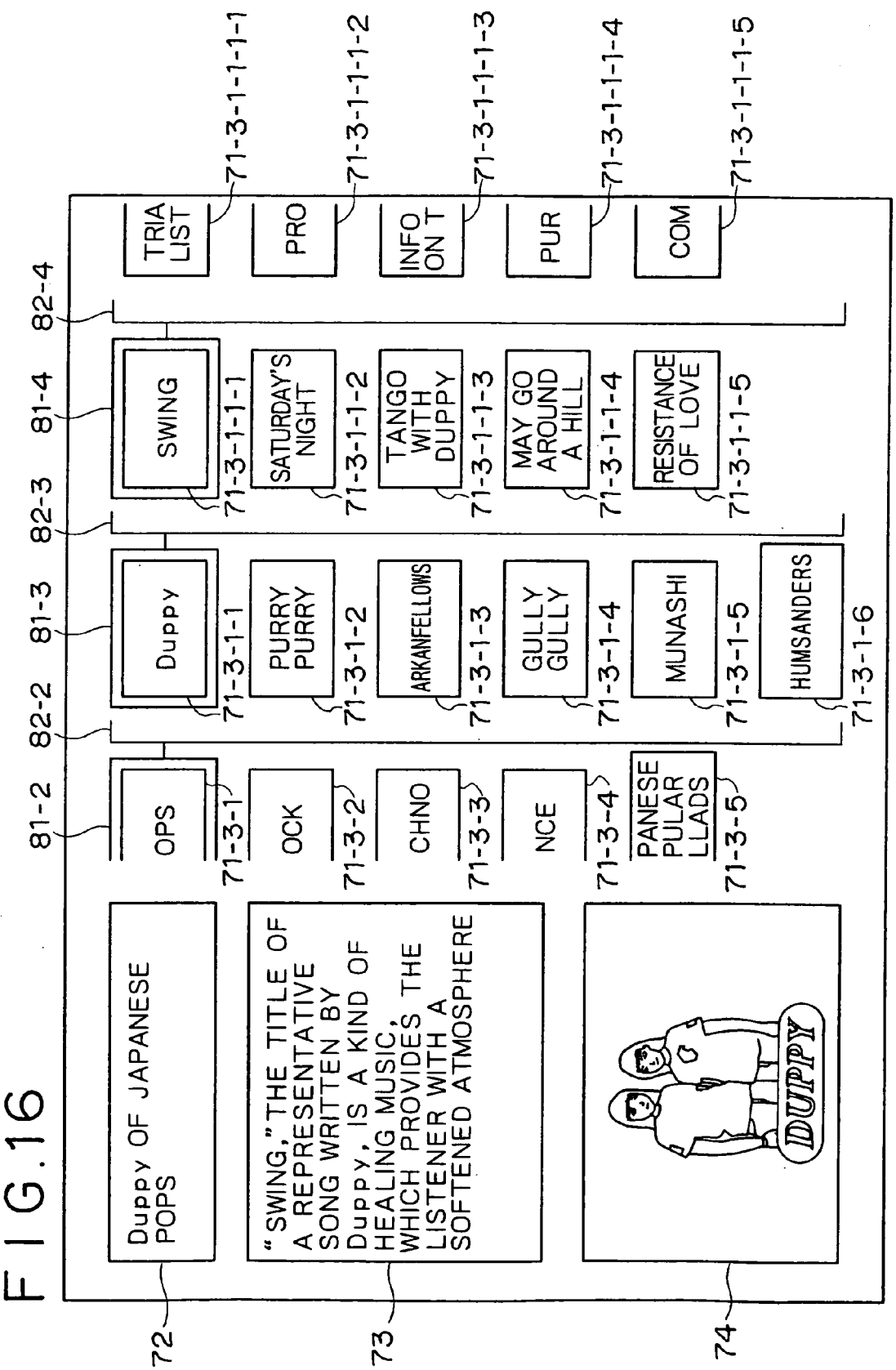
FIG. 16 is a diagram showing a typical screen displayed by the set top box on the monitor apparatus.

On the screen of FIG. 15 displayed on the monitor apparatus 8, the cursor 81-4 specifies an icon 71-3-1-1-1. The icon 71-3-1-1-1 is a child of the icon 73-1-1-1 specified by the cursor 81-3 on the screen shown in FIG. 14.

As shown in FIG. 18, the icon 71-3-1-1-1 has a child icon 71-3-1-1-1-1 named "Trial listening", a child icon 71-3-1-1-1-2 named "Profile", a child icon 71-3-1-1-1-3 named "Information on the Song", a child icon 71-3-1-1-1-4 named "Purchase" and a child icon 71-3-1-1-1-5 named "Comment". On the screen displayed on the monitor apparatus 8, the icons 71-3-1-1-1-1 to 71-3-1-1-1-5 form a column hierarchical layer, which appears gradually on the right side of the column of the hierarchical layer comprising the icons 71-3-1-1-1 to 71-3-1-1-5, shifting the frame of the screen window frame from the left to the right little by little.

The icon 71-3-1-1-1-1 is specified to listen to a content or a piece of music data with a title of "Swing" sung by the artists named Duppy and treated as a sub-category of the Pops category of the Japan super-category on a trial basis. By the same token, the icon 71-3-1-1-1-2 is specified to display a detailed profile of a content or a piece of music data with a title of "Swing" sung by the artists named Duppy and treated as a sub-category of the Pops category of the Japan super-category on the screen of the monitor apparatus 8. In the same way, the icon 71-3-1-1-1-3 is specified to display detailed information on a content or a piece of music data with a title of "Swing" sung by the artists named Duppy and treated as a sub-category of the Pops category of the Japan super-category on the screen of the monitor apparatus 8.

Likewise, the icon 71-3-1-1-1-4 is specified to purchase a content or a piece of music data with a title of "Swing" sung by the artists named Duppy and treated as a sub-category of the Pops category of the Japan super-category on the screen of the monitor apparatus 8 by downloading the content or the piece of music data from the server 4 to the set top box 1.

Similarly, the icon 71-3-1-1-1-5 is specified by the user to transmit a comment on a content or a piece of music data with a title of "Swing" sung by the artists named Duppy and treated as a sub-category of the Pops category of the Japan super-category on the screen of the monitor apparatus 8 to a content provider by way of the network 3.

The icon 71-3-1-1-1 is the parent icon of the icons 71-3-1-1-1-1 to 71-3-1-1-1-5 as indicated by a parent-to-child relation 82-4 shown in FIGS. 15 to 18.

On the screen shown in FIG. 18, the focus of attention has been moved to a hierarchical layer including the icon 71-3-1-1-1 specified by the cursor 81-4.

As shown in FIG. 18, with all the icons 71-3-1-1-1-1 to 71-3-1-1-1-5 displayed on the screen, the field 72 displays a string of characters such as Japan corresponding to the super-category icon 71-3 specified by the cursor 81-1, displays a string of characters such as Pops corresponding to the category icon 71-3-1 specified by the cursor 81-2, displays a string of characters such as Duppy corresponding to the sub-category icon 71-3-1-1 specified by the cursor 81-3 and displays a string of characters such as "Swing" assigned as the title of a content or a piece of music data represented by the icon 71-3-1-1-1 specified by the cursor 81-4.

Since the set top box 1 displays character strings for the super-category icon 71-3, the category icon 71-3-1 and the sub-category icon 71-3-1-1 as described above on the monitor apparatus 5, the user is capable or recognizing the classifications of a specified content at the sub-category, category and super-category levels with ease.

As shown in FIG. 18, with all the icons 71-3-1-1-1 to 71-3-1-1-1-5 displayed on the screen, the field 73 displays a phrase such as "Number one in the original chart . . . " corresponding to the icon 71-3-1-1-1 specified by the cursor 81-4 on a hierarchical layer serving as the focus of attention.

As shown in FIG. 18, with all the icons 71-3-1-1-1-1 to 71-3-1-1-1-5 displayed on the screen, the field 74 displays a still or moving picture associated with "Swing", the title of a content or a piece of music data represented by the icon 71-3-1-1-1 specified by the cursor 81-4 on a hierarchical layer serving as the focus of attention.

FIG. 19 is a diagram showing a screen displayed by the set top box 1 on the monitor apparatus 8 as a result of an operation, which is carried out by the user on the "↓" key of the input unit 23 or the button 43 of the remote commander 5 in a direction indicated by the arrow B shown in FIG. 2 while the set top box 1 is displaying the screen shown in FIG. 18 on the monitor apparatus 8 to move the cursor 81-4 downward.

As a result of an operation carried out by the user on the "↓" key of the input unit 23 or the button 43 of the remote commander 5 in a direction indicated by the arrow B, presently, the cursor 81-4 is specifying the icon 71-3-1-1-2.

As shown in FIG. 19, the icon 71-3-1-1-2 has a child icon 71-3-1-1-2-1 named "Trial listening", a child icon 71-3-1-1-2-2 named "Profile", a child icon 71-3-1-1-2-3 named "Information on the Song", a child icon 71-3-1-1-2-4 named "Purchase" and a child icon 71-3-1-1-2-5 named "Comment". On the screen displayed on the monitor apparatus 8, the icons 71-3-1-1-2-1 to 71-3-1-1-2-5 form a column hierarchical layer, which appears on the right side of the column of the hierarchical layer comprising the icons 71-3-1-1-1 to 71-3-1-1-5.

The icon 71-3-1-1-2-1 is specified to listen to a content or a piece of music data with a title of "Saturday's Night" sung by the artists named Duppy and treated as a sub-category of the Pops category of the Japan super-category on a trial basis. By the same token, the icon 71-3-1-1-2-2 is specified to display a detailed profile of a content or a piece of music data with a title of "Saturday's Night" sung by the artists named Duppy and treated as a sub-category of the Pops category of the Japan super-category on the screen of the monitor apparatus 8. In the same way, the icon 71-3-1-1-2-3 is specified to display detailed information on a content or a piece of music data with a title of "Saturday's Night" sung by the artists named Duppy and treated as a sub-category of the Pops category of the Japan super-category on the screen of the monitor apparatus 8.

Likewise, the icon 71-3-1-1-2-4 is specified to purchase a content or a piece of music data with a title of "Saturday's Night" sung by the artists named Duppy and treated as a sub-category of the Pops category of the Japan super-category on the screen of the monitor apparatus 8 by downloading the content or the piece of music data from the server 4 to the set top box 1. Similarly, the icon 71-3-1-1-2-5 is specified by the user to transmit a comment on a content or a piece of music data with a title of "Saturday's Night" sung by the artists named Duppy and treated as a sub-category of the Pops category of the Japan super-category on the screen of the monitor apparatus 8 to a content provider by way of the network 3.

The icon 71-3-1-1-2 is the parent icon of the icons 71-3-1-1-2-1 to 71-3-1-1-2-5 as indicated by a parent-to-child relation 82-4 shown in FIG. 19.

As shown in FIG. 19, with all the icons 71-3-1-1-2-1 to 71-3-1-1-2-5 displayed on the screen, the field 72 displays a string of characters such as Japan corresponding to the super-category icon 71-3 specified by the cursor 81-1, displays a string of characters such as Pops corresponding to the category icon 71-3-1 specified by the cursor 81-2, displays a string of characters such as Duppy corresponding to the sub-category icon 71-3-1-1 specified by the cursor 81-3 and displays a string of characters such as "Saturday's Night" assigned as the title of a content or a piece of music data represented by the icon 71-3-1-1-2 specified by the cursor 81-4.

As shown in FIG. 19, with all the icons 71-3-1-1-2-1 to 71—3-1-1-2-5 displayed on the screen, the field 73 displays a phrase such as "Received a department award from the Japan Grand CD Award Committee . . . " corresponding to the icon 71-3-1-1-2 specified by the cursor 81-4 on a hierarchical layer serving as the focus of attention.

As shown in FIG. 19, with all the icons 71-3-1-1-2-1 to 71-3-1-1-2-5 displayed on the screen, the field 74 displays a still or moving picture associated with "Saturday's Night", the title of a content or a piece of music data represented by the icon 71-3-1-1-2 specified by the cursor 81-4 on a hierarchical layer serving as the focus of attention.

FIG. 20 is a diagram showing a screen displayed by the set top box 1 on the monitor apparatus 8 as a result of an operation, which is carried out by the user on the "↓" key of the input unit 23 or the button 43 of the remote commander 5 in a direction indicated by the arrow B shown in FIG. 2 while the set top box 1 is displaying the screen shown in FIG. 19 on the monitor apparatus 8 to move the cursor 81-4 downward.

As a result of an operation carried out by the user on the "↓" key of the input unit 23 or the button 43 of the remote commander 5 in a direction indicated by the arrow B, presently, the cursor 81-4 is specifying the icon 71-3-1-1-3.

As shown in FIG. 20, the icon 71-3-1-1-3 has a child icon 71-3-1-1-3-1 named "Trial listening", a child icon 71-3-1-1-3-2 named "Profile", a child icon 71-3-1-1-3-3 named "Information on the Song", a child icon 71-3-1-1-3-4 named "Purchase" and a child icon 71-3-1-1-3-5 named "Comment". On the screen displayed on the monitor apparatus 8, the icons 71-3-1-1-3-1 to 71-3-1-1-3-5 form a column hierarchical layer, which appears on the right side of the column of the hierarchical layer comprising the icons 71-3-1-1-1 to 71-3-1-1-5.

The icon 71-3-1-1-3-1 is specified to listen to a content or a piece of music data with a title of "Tango with Duppy" sung by the artists named Duppy and treated as a sub-category of the Pops category of the Japan super-category on a trial basis. By the same token, the icon 71-3-1-1-3-2 is specified to display a detailed profile of a content or a piece of music data with a title of "Tango with Duppy" sung by the artists named Duppy and treated as a sub-category of the Pops category of the Japan super-category on the screen of the monitor apparatus 8. In the same way, the icon 71-3-1-1-3-3 is specified to display detailed information on a content or a piece of music data with a title of "Tango with Duppy" sung by the artists named Duppy and treated as a sub-category of the Pops category of the Japan super-category on the screen of the monitor apparatus 8.

Likewise, the icon 71-3-1-1-3-4 is specified to purchase a content or a piece of music data with a title of "Tango with Duppy" sung by the artists named Duppy and treated as a sub-category of the Pops category of the Japan super-category on the screen of the monitor apparatus 8 by downloading the content or the piece of music data with a title of "Tango with Duppy" sung by the artists named Duppy and treated as a sub-category of the Pops category of the Japan super-category from the server 4 to the set top box 1. Similarly, the icon 71-3-1-1-3-5 is specified by the user to transmit a comment on a content or a piece of music data with a title of "Tango with Duppy" sung by the artists named Duppy and treated as a sub-category of the Pops category of the Japan super-category on the screen of the monitor apparatus 8 to a content provider by way of the network 3.

The icon 71-3-1-1-3 is the parent icon of the icons 71-3-1-1-3-1 to 71-3-1-1-3-5 as indicated by a parent-to-child relation 82-4 shown in FIG. 20.

As shown in FIG. 20, with all the icons 71-3-1-1-3-1 to 71-3-1-1-3-5 displayed on the screen, the field 72 displays a string of characters such as Japan corresponding to the super-category icon 71-3 specified by the cursor 81-1, displays a string of characters such as Pops corresponding to the category icon 71-3-1 specified by the cursor 81-2, displays a string of characters such as Duppy corresponding to the sub-category icon 71-3-1-1 specified by the cursor 81-3 and displays a string of characters such as "Tango with Duppy" assigned as the title of a content or a piece of music data represented by the icon 71-3-1-1-3 specified by the cursor 81-4.

As shown in FIG. 20, with all the icons 71-3-1-1-3-1 to 71-3-1-1-3-5 displayed on the screen, the field 73 displays a phrase such as ""Tango with Duppy" performed by a famous cellist . . . " corresponding to the icon 71-3-1-1-3 specified by the cursor 81-4 on a hierarchical layer serving as the focus of attention.

As shown in FIG. 20, with all the icons 71-3-1-1-3-1 to 71-3-1-1-3-5 displayed on the screen, the field 74 displays a still or moving picture associated with "Tango with Duppy", the title of a content or a piece of music data represented by the icon 71-3-1-1-3 specified by the cursor 81-4 on a hierarchical layer serving as the focus of attention.

Figure 21:
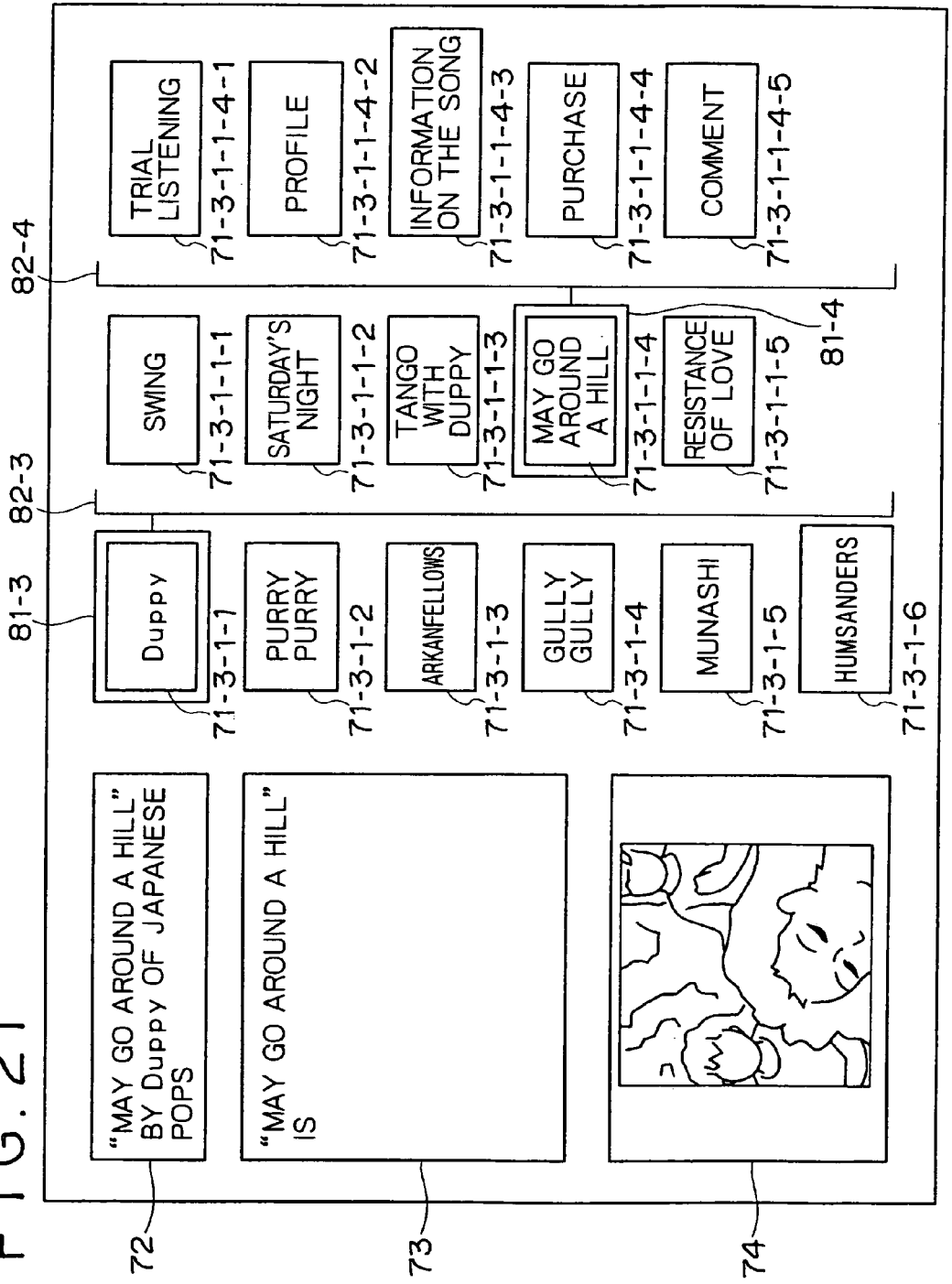
FIG. 21 is a diagram showing a typical screen displayed by the set top box on the monitor apparatus.

FIG. 21 is a diagram showing a screen displayed by the set top box 1 on the monitor apparatus 8 as a result of an operation, which is carried out by the user on the "↓" key of the input unit 23 or the button 43 of the remote commander 5 in a direction indicated by the arrow B shown in FIG. 2 while the set top box 1 is displaying the screen shown in FIG. 20 on the monitor apparatus 8 to move the cursor 81-4 downward.

As a result of an operation carried out by the user on the "↓" key of the input unit 23 or the button 43 of the remote commander 5 in a direction indicated by the arrow B, presently, the cursor 81-4 is specifying the icon 71-3-1-1-4.

As shown in FIG. 21, the icon 71-3-1-1-4 has a child icon 71-3-1-1-4-1 named "Trial listening", a child icon 71-3-1-1-4-2 named "Profile", a child icon 71-3-1-1-4-3 named "Information on the Song", a child icon 71-3-1-1-4-4 named "Purchase" and a child icon 71-3-1-1-4-5 named "Comment". On the screen displayed on the monitor apparatus 8, the icons 71-3-1-1-4-1 to 71-3-1-1-4-5 form a column hierarchical layer, which appears on the right side of the column of the hierarchical layer comprising the icons 71-3-1-1-1 to 71-3-1-1-5.

The icon 71-3-1-1-4-1 is specified to listen to a content or a piece of music data with a title of "May Go around a Hill" sung by the artists named Duppy and treated as a sub-category of the Pops category of the Japan super-category on a trial basis. By the same token, the icon 71-3-1-1-4-2 is specified to display a detailed profile of a content or a piece of music data with a title of "May Go around a Hill" sung by the artists named Duppy and treated as a sub-category of the Pops category of the Japan super-category on the screen of the monitor apparatus 8. In the same way, the icon 71-3-1-1-4-3 is specified to display detailed information on a content or a piece of music data with a title of "May Go around a Hill" sung by the artists named Duppy and treated as a sub-category of the Pops category of the Japan super-category on the screen of the monitor apparatus 8.

Likewise, the icon 71-3-1-1-4-4 is specified to purchase a content or a piece of music data with a title of "May Go around a Hill" sung by the artists named Duppy and treated as a sub-category of the Pops category of the Japan super-category on the screen of the monitor apparatus 8 by downloading the content or the piece of music data with a title of "May Go around a Hill" sung by the artists named Duppy and treated as a sub-category of the Pops category of the Japan super-category from the server 4 to the set top box 1. Similarly, the icon 71-3-1-1-4-5 is specified by the user to transmit a comment on a content or a piece of music data with a title of "May Go around a Hill" sung by the artists named Duppy and treated as a sub-category of the Pops category of the Japan super-category on the screen of the monitor apparatus 8 to a content provider by way of the network 3.

The icon 71-3-1-1-4 is the parent icon of the icons 71-3-1-1-4-1 to 71-3-1-1-4-5 as indicated by a parent-to-child relation 82-4 shown in FIG. 21.

As shown in FIG. 21, with all the icons 71-3-1-1-4-1 to 71-3-1-1-4-5 displayed on the screen, the field 72 displays a string of characters such as Japan corresponding to the super-category icon 71-3 specified by the cursor 81-1, displays a string of characters such as Pops corresponding to the category icon 71-3-1 specified by the cursor 81-2, displays a string of characters such as Duppy corresponding to the sub-category icon 71-3-1-1 specified by the cursor 81-3 and displays a string of characters such as "May Go around a Hill" assigned as the title of a content or a piece of music data represented by the icon 71-3-1-1-4 specified by the cursor 81-4.

As shown in FIG. 21, with all the icons 71-3-1-1-4-1 to 71-3-1-1-4-5 displayed on the screen, the field 73 displays a phrase such as ""May Go around a Hill" is . . . " corresponding to the icon 71-3-1-1-4 specified by the cursor 81-4 on a hierarchical layer serving as the focus of attention.

As shown in FIG. 21, with all the icons 71-3-1-1-4-1 to 71-3-1-1-4-5 displayed on the screen, the field 74 displays a still or moving picture associated with "May Go around a Hill", the title of a content or a piece of music data represented by the icon 71-3-1-1-4 specified by the cursor 81-4 on a hierarchical layer serving as the focus of attention.

Figure 22:
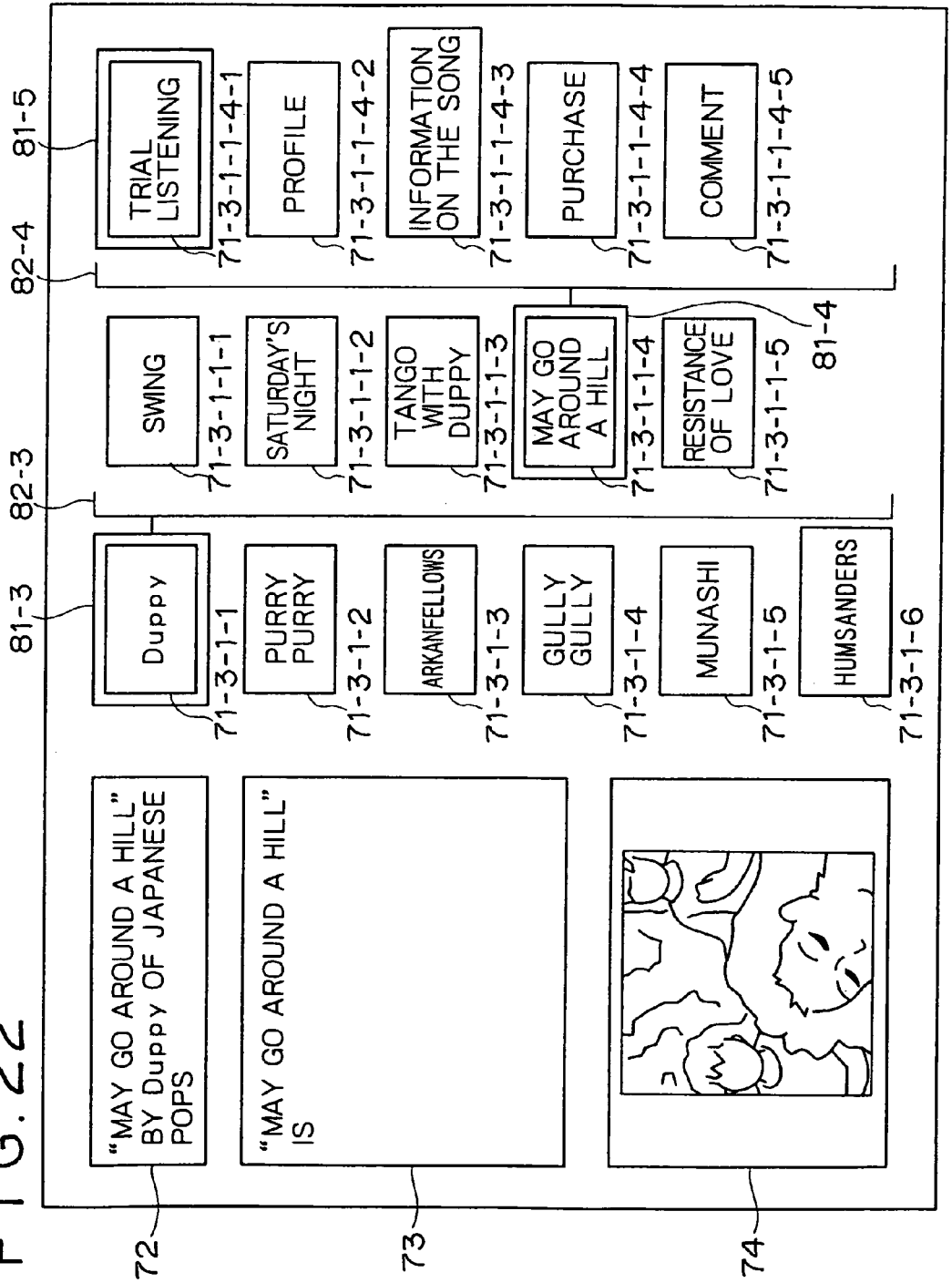
FIG. 22 is a diagram showing a typical screen displayed by the set top box on the monitor apparatus.

FIG. 22 is a diagram showing a screen displayed by the set top box 1 on the monitor apparatus 8 as a result of an operation, which is carried out by the user on the "→" key of the input unit 23 or the button 43 of the remote commander 5 in a direction indicated by the arrow A shown in FIG. 2 while the set top box 1 is displaying the screen shown in FIG. 21 on the monitor apparatus 8 to move the cursor 81-4 to the column on the right side.

On the screen of FIG. 22 displayed on the monitor apparatus 8, the cursor 81-5 specifies an icon 71-3-1-1-4-1. The icon 71-3-1-1-4-1 is a child of the icon 71-1-1-4, specified by the cursor 81-4 on the screen shown in FIG. 21.

As a result of an operation carried out by the user on the "Θ" key of the input unit 23 or the button 43 of the remote commander 5 in a direction indicated by the arrow A described above, the focus of attention in the example shown in FIG. 22 is shifted to a hierarchical layer including the icon 71-3-1-1-4-1, which is a child of the icon 71-3-1-1-4, specified by the cursor 81-5.

If the user operates the Confirm key after the "→" key of the input unit 23 or the button 43 of the remote commander 5 in a direction indicated by the arrow E after the direction indicated by the arrow A shown in FIG. 2 while the set top box 1 is displaying the screen shown in FIG. 22 on the monitor apparatus 8, the set top box 1 will display a trial-listening window 91.

Figure 23:
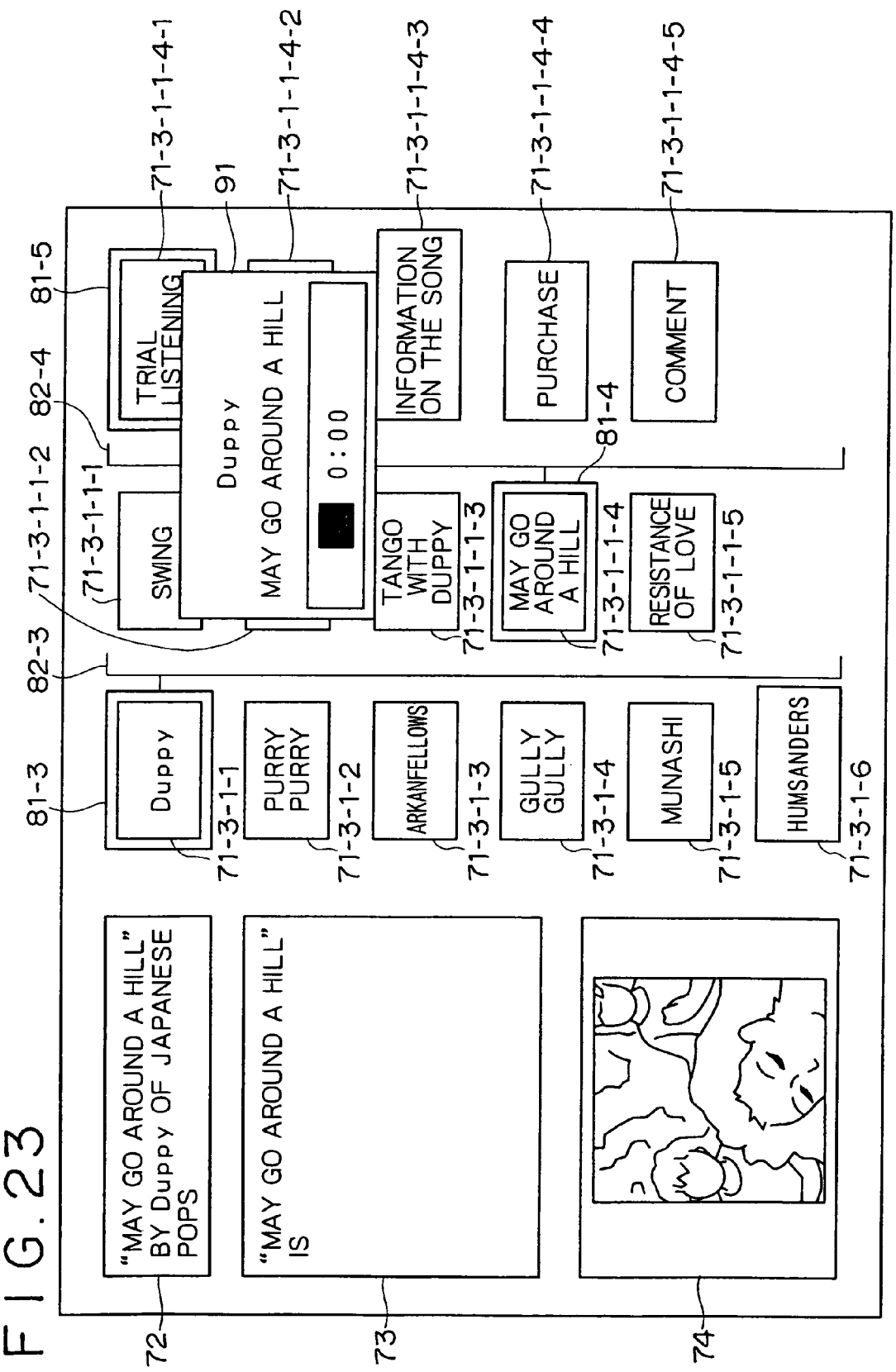
FIG. 23 is a diagram showing a typical screen displayed by the set top box on the monitor apparatus.
Figure 24:
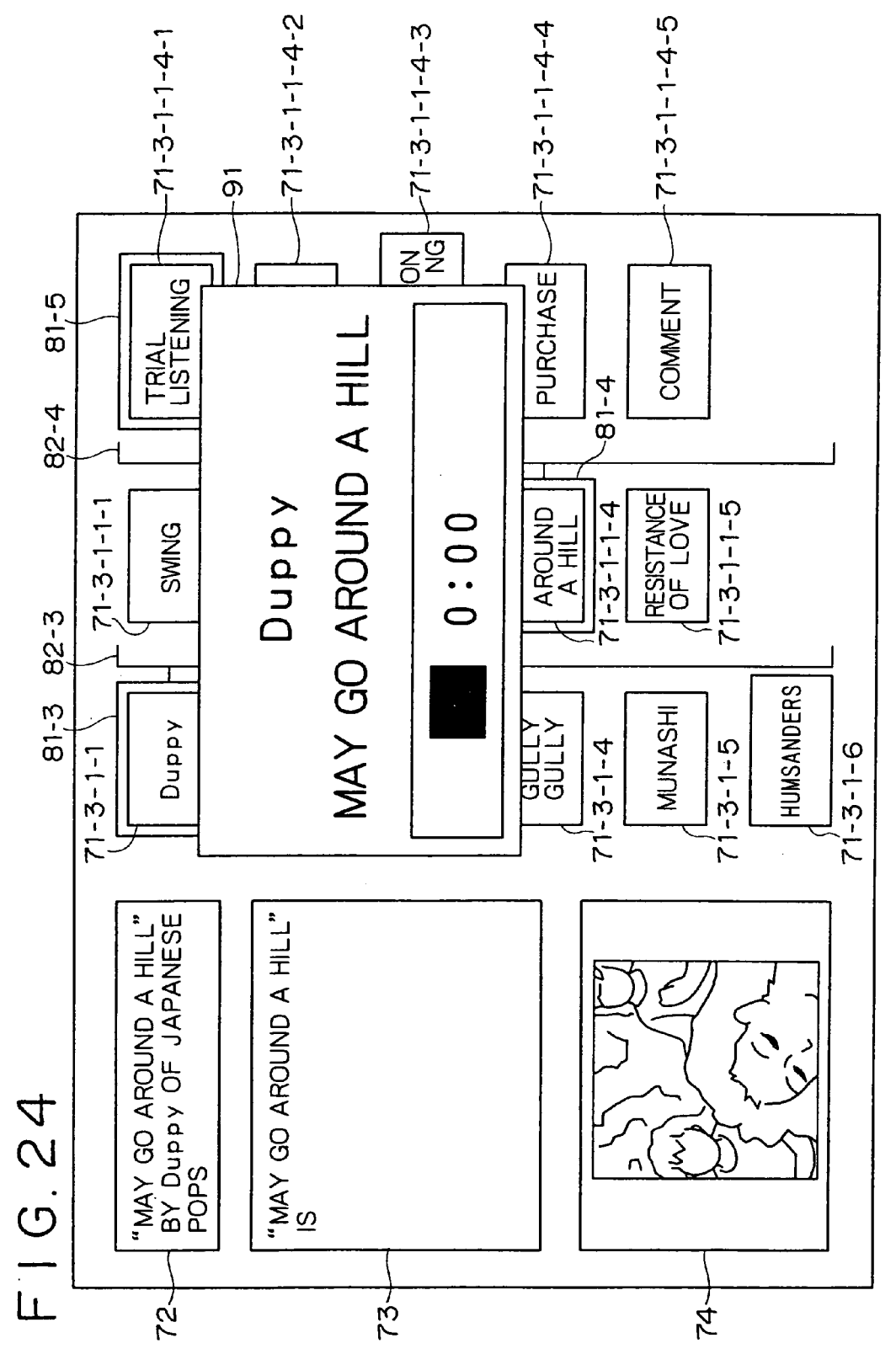

The set top box 1 displays the trial-listening window 91 on the monitor apparatus 8 by gradually zooming up the window 91 to a large size as shown in FIGS. 23 and 24 from the icon 71-3-1-1-4-1 at a speed that allows the user to recognize the gradual change in window size.

In the following description, the icons 71-1 to 71-3-1-1-4-5 are denoted by a generic reference numeral 71 unless there is a need to distinguish a particular icon from the others. By the same token, the cursors 81-1 to 81-5 are denoted by a generic reference numeral 81 unless there is a need to distinguish a particular cursor from the others.

Figure 25:
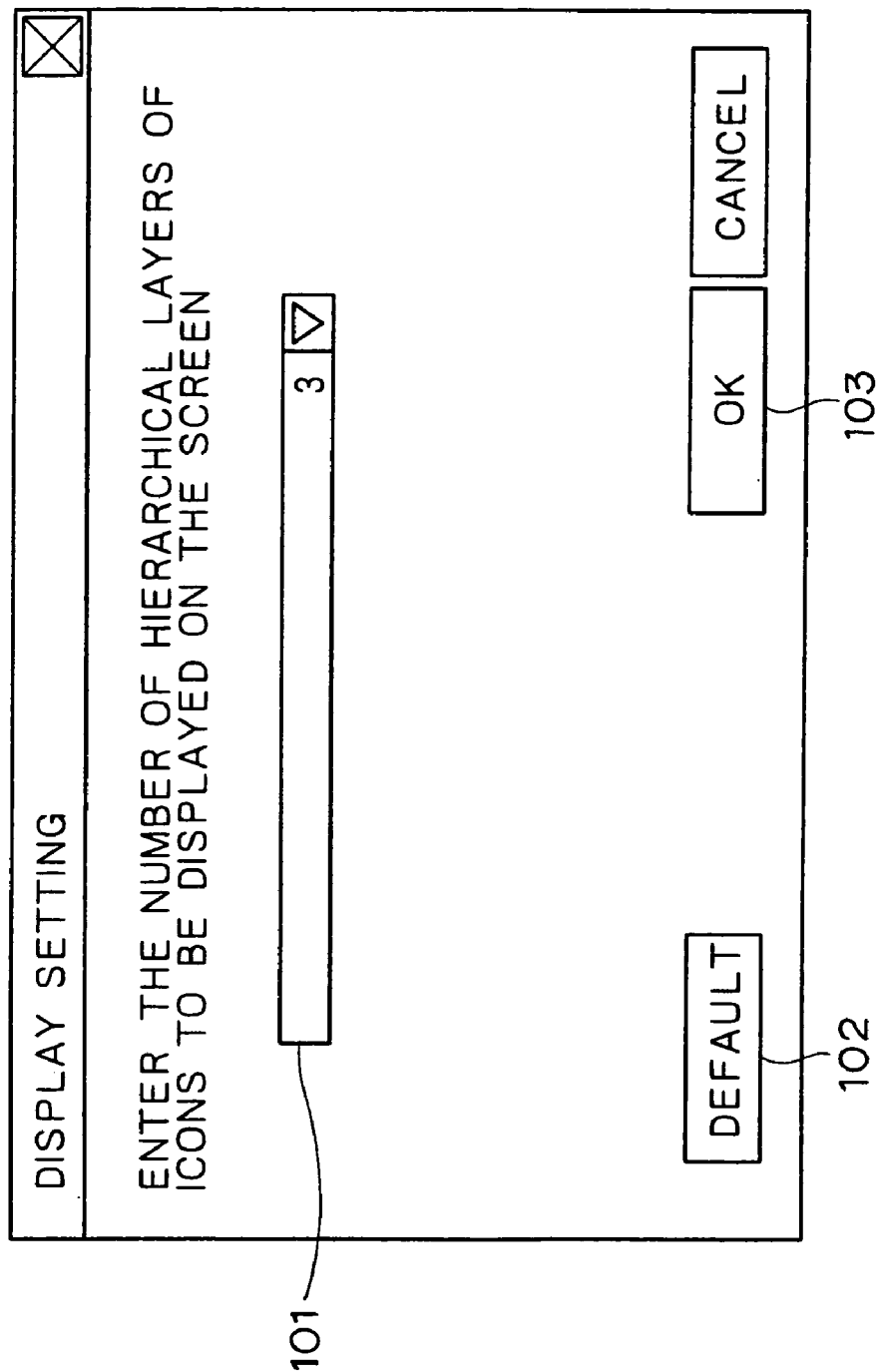
FIG. 25 is a diagram showing a typical screen for setting the number of icon hierarchical layers to be displayed by the set top box on the monitor apparatus.

FIG. 25 is a diagram showing a typical screen for setting the number of icon hierarchical layers to be displayed by the set top box 1 on the monitor apparatus 8. The number of icon hierarchical layers to be displayed by the set top box 1 on the monitor apparatus 8 is entered by the user to a field 101 by operating the remote commander 5. An integer equal to or greater than 2 can be entered via the remote commander 5.

If a button 102 named Default is clicked, the set top box 1 sets a predetermined number of typically 3 in the field 101.

If a button 103 named OK is clicked after an integer equal to or greater than 2 has been set in the field 101, the integer is stored in a data area of the memory 31. Thereafter, the set top box 1 displays as many hierarchical layers of icons 71 on the monitor apparatus 8 as indicated by the integer.

Assuming that the OK button 103 is clicked after an integer of 2 has been set in the field 101, the set top box 1 displays 2 hierarchical layers of icons 71 on the monitor apparatus 8. If the OK button 103 is clicked after an integer of 5 has been set in the field 101, on the other hand, the set top box 1 displays 5 hierarchical layers of icons 71 on the monitor apparatus 8.

As described above, the set top box 1 displays as many hierarchical layers of icons 71 on the monitor apparatus 8 as indicated by an integer set by the user.

It should be noted that the set top box 1 may also determine the number of layers of icons 71 from the width and the height of a display area on the monitor apparatus 8 and the predetermined width and the predetermined height of each icon. In this case, the set top box 1 is capable of displaying icons 71 on the monitor apparatus 8 with each icon 71 having size large enough to be seen by the user with ease.

The set top box 1 may also determine the size of each character or the font size displayed in each icon 71 for the width and the height of the icon 71. Typically, the character size or the font size for each width and height of the icon 71 is stored in advance. The set top box 1 then selects a proper one of the stored sizes of characters or the font sizes for the width and the height of the icon 71.

After the set top box 1 selects a proper one of the stored sizes of characters for the width and the height of the icon 71, the set top box 1 then displays icons 71 on the monitor apparatus 8 with every icon 71 including characters each having a size large enough to be seen by the user with ease.

Figure 26:
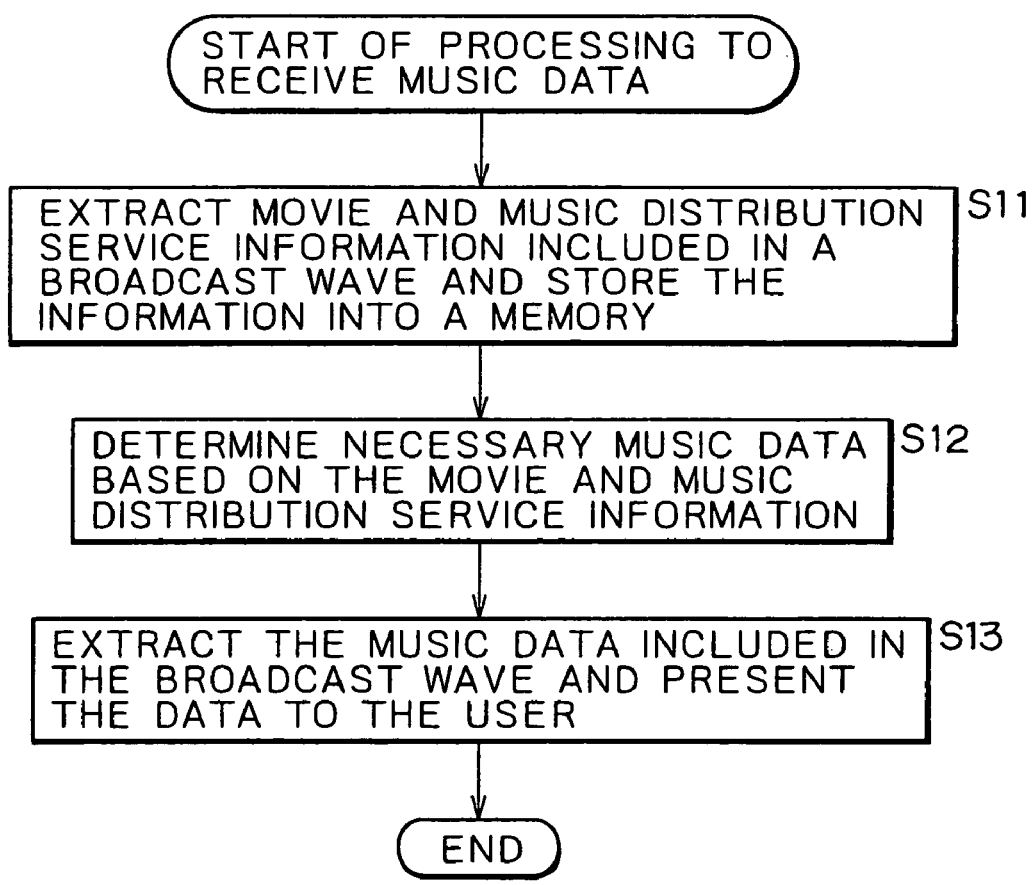
FIG. 26 shows a flowchart used for explaining processing to receive music data.

The following description explains processing carried out by the CPU 51 employed in the internal control unit 25 by execution of the control program stored in the control-program area in the memory 31 to receive movie and music distribution service information and music data conveyed in a broadcast wave by referring to a flowchart shown in FIG. 26. As shown in the figure, the flowchart begins with a step S11 at which the CPU 51 executes the control program to extract movie and music distribution service information from a broadcast wave of a desired channel received by the tuner 21 and then stores the information in a data area of the memory 31.

The flow of the control program then goes on to a next step S12 at which necessary music data is determined on the basis of the movie and music distribution service information stored in the memory 31. The flow of the control program then goes on to a next step S13 at which the music data is extracted from a broadcast wave received by the tuner 21 and presented to the user. Typically, the audio-signal-processing unit 27 decodes the music data and outputs music obtained as a result of the decoding to the speaker 9 in accordance with the control program. Then, the processing is ended.

As described above, the set top box 1 determines desired music data based on movie and music distribution service information received as a broadcast wave, extracts the music data from the wave and presents the data to the user.

Figure 27:
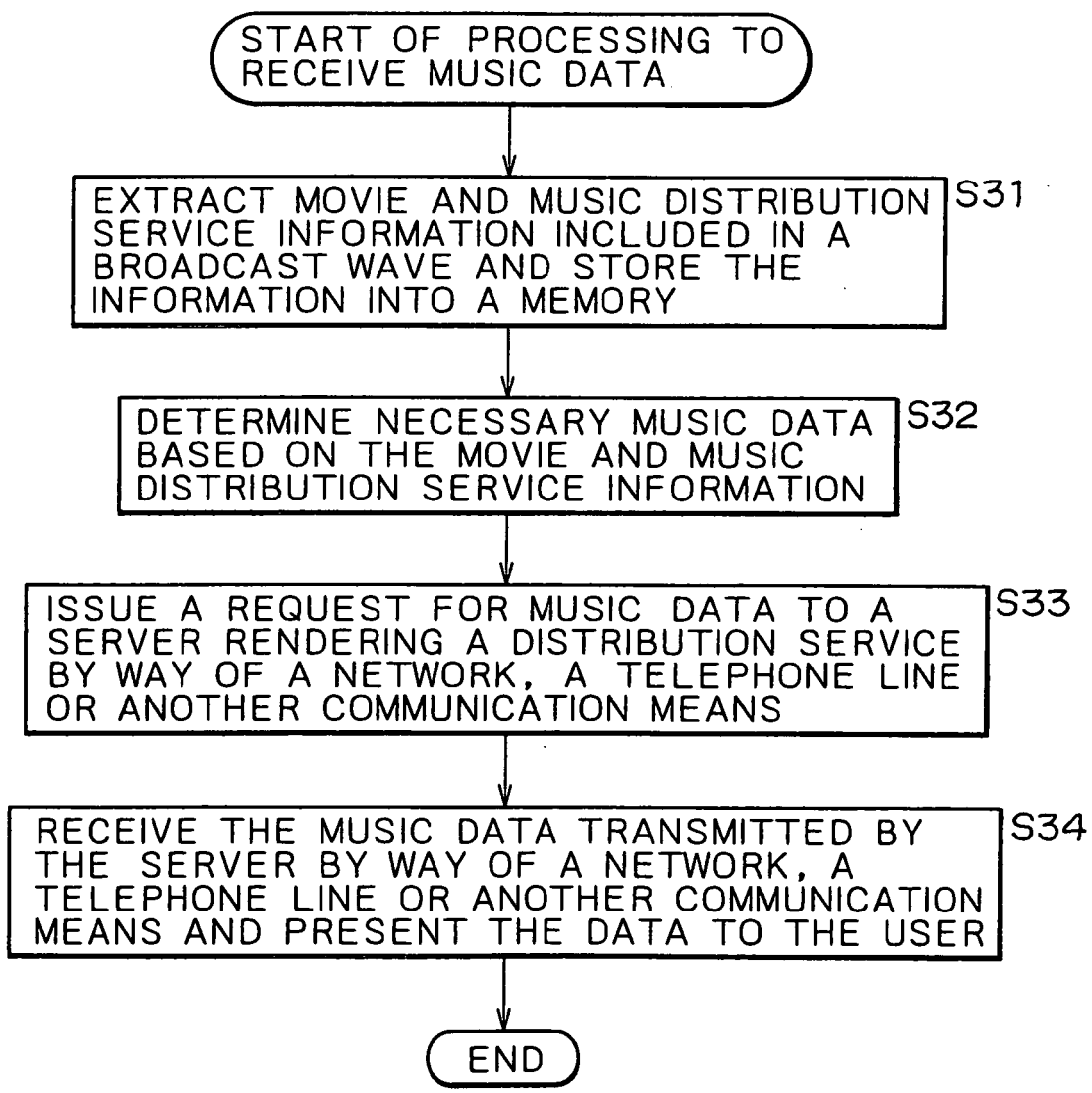
FIG. 27 shows a flowchart used for explaining other processing to receive music data.

The following description explains processing carried out by the CPU 51 employed in the internal control unit 25 by execution of the control program stored in the control-program area in the memory 31 to receive movie and music distribution service information conveyed in a broadcast wave and music data transmitted through a network by referring to a flowchart shown in FIG. 27. As shown in the figure, the flowchart begins with a step S31 at which the CPU 51 executes the control program to extract movie and music distribution service information from a broadcast wave of a desired channel received by the tuner 21 and then stores the information in a data area of the memory 31.

The flow of the control program then goes on to a next step S32 at which necessary music data is determined on the basis of the movie and music distribution service information stored in the memory 31. The flow of the control program then goes on to a next step S33 at which the communication control unit 22 is driven to issue a request for transmission of the music data to the server 4 by way of the network 3. As an alternative, in accordance with the control program, the communication control unit 22 may issue a request for transmission of the music data to the server 4 through a telephone line not shown in the figure.

The flow of the control program then goes on to a next step S34 at which the communication control unit 22 is driven to receive the music data transmitted by the server 4 by way of the network 3 and present the data to the user. As an alternative, the communication control unit 22 is driven to receive the music data transmitted by the server 4 by way of the telephone line in accordance with the control program. Typically, the audio-signal-processing unit 27 decodes the music data and outputs music obtained as a result of the decoding to the speaker 9. As an alternative, the home-network I/O control unit 30 is driven to transfer the music data to the video disc recorder 7 by way of the home network 6 and have the data recorded therein in accordance with the control program. Then, the processing is ended.

As described above, the set top box 1 is capable of determining desired music data based on movie and music distribution service information received as a broadcast wave, receiving the music data transmitted by the server 4 by way of the network 3 or the telephone line and presenting the data to the user.

Figure 28:
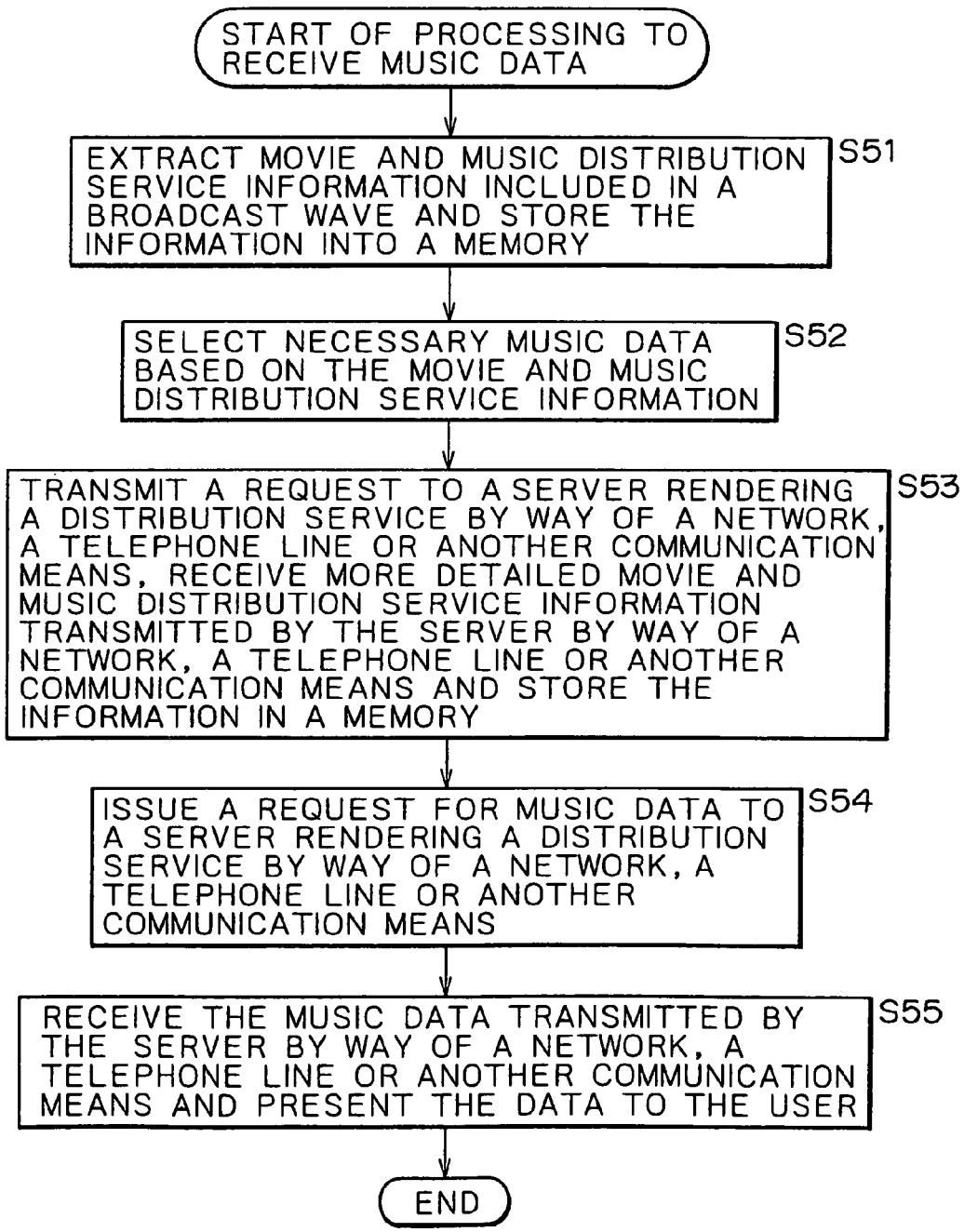
FIG. 28 shows a flowchart used for explaining further processing to receive music data.

The following description explains processing carried out by the CPU 51 employed in the internal control unit 25 by execution of the control program stored in the control-program area in the memory 31 to receive movie and music distribution service information conveyed in a broadcast wave or transmitted by the server 4 by way of the network 3 and music data transmitted through the network by referring to a flowchart shown in FIG. 28. As shown in the figure, the flowchart begins with a step S51 at which the CPU 51 executes the control program to extract movie and music distribution service information from a broadcast wave of a desired channel received by the tuner 21 and then stores the information in a data area of the memory 31.

The flow of the control program then goes on to a next step S52 at which necessary music data is determined on the basis of the movie and music distribution service information stored in the memory 31. The flow of the control program then goes on to a next step S53 at which the communication control unit 22 is driven by a signal generated by the operation control unit 24 to issue a request for transmission of data such as the more detailed movie and music distribution service information to the server 4 by way of the network 3 when the user needs more detailed movie and music distribution service information, wants to listen to a piece of music on a trial basis, wants to see a music clip or wants to do something else. As an alternative, the communication control unit 22 is driven by a signal generated by the operation control unit 24 to issue a request for transmission of data such as the more detailed movie and music distribution service information to the server 4 through a telephone line not shown in the figure in accordance with the control program.

The flow of the control program then goes on to a next step S54 at which the communication control unit 22 is driven to issue a request for transmission of the music data to the server 4 by way of the network 3 when the user finds a desired piece of music. As an alternative, in accordance with the control program, the communication control unit 22 may issue a request for transmission of the music data to the server 4 through the telephone line not shown.

The flow of the control program then goes on to a next step S55 at which the communication control unit 22 is driven to receive the music data transmitted by the server 4 by way of the network 3 and present the data to the user. As an alternative, the communication control unit 22 is driven to receive the music data transmitted by the server 4 by way of the telephone line not shown in accordance with the control program. Typically, the audio-signal-processing unit 27 decodes the music data and outputs music obtained as a result of the decoding to the speaker 9. As an alternative, the home-network I/O control unit 30 is driven to transfer the music data to the video disc recorder 7 by way of the home network 6 and have the data recorded therein in accordance with the control program. Then, the processing is ended.

As described above, the set top box 1 is capable of receiving movie and music distribution service information conveyed in a broadcast wave or transmitted by the server 4 by way of the network 3, determining desired music data based on the received movie and music distribution service information, receiving the music data transmitted by the server 4 by way of the network 3 or the telephone line and presenting the data to the user.

Figure 29:
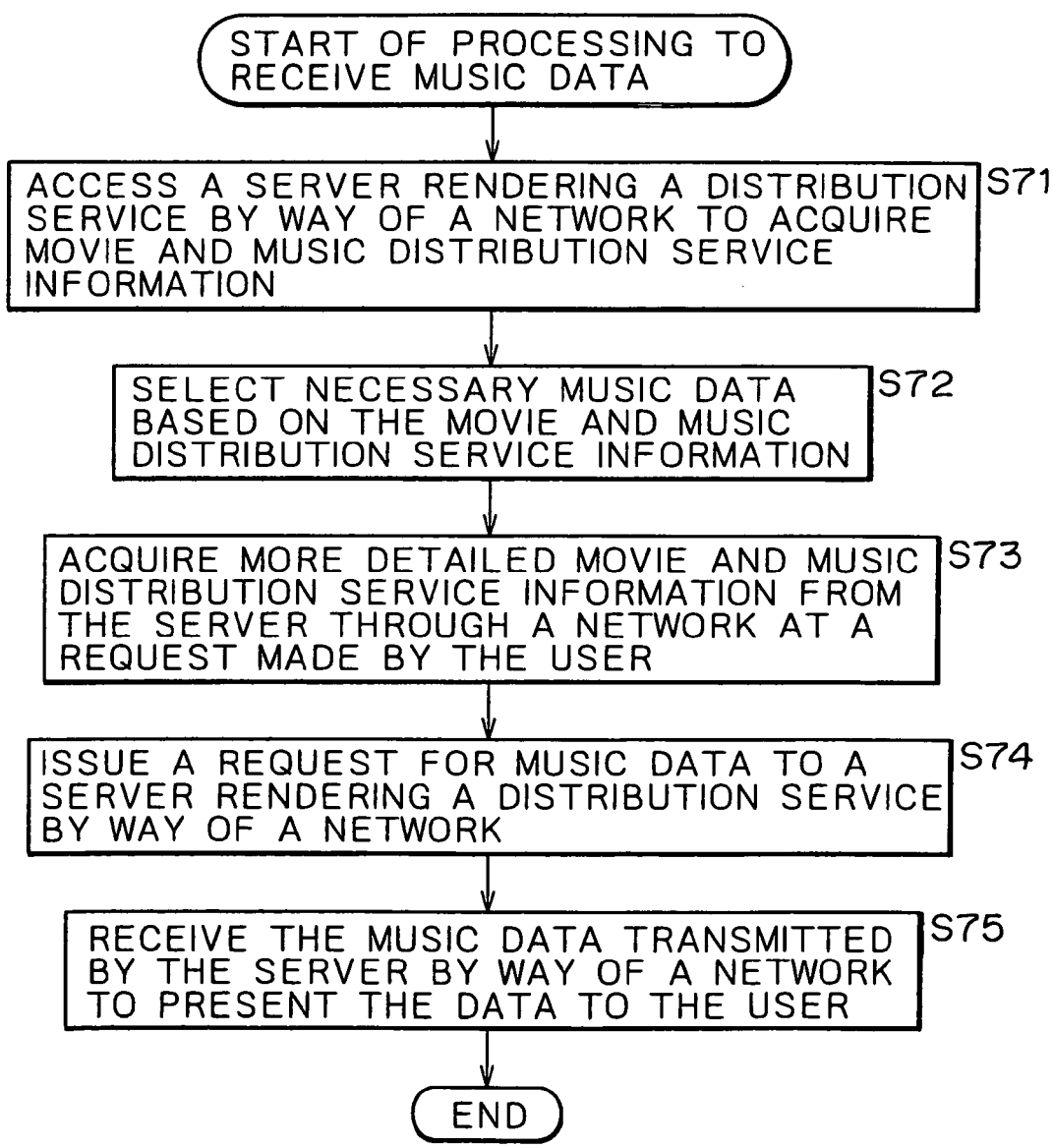
FIG. 29 shows a flowchart used for explaining still further processing to receive music data.

The following description explains processing carried out by the CPU 51 employed in the internal control unit 25 by execution of the control program stored in the control-program area in the memory 31 to receive movie and music distribution service information and music data transmitted by the server 4 by way of the network 3 by referring to a flowchart shown in FIG. 29. As shown in the figure, the flowchart begins with a step S71 at which, in accordance with the control program, the communication control unit 22 is driven to make an access to the server 4 through the network 3 in order to acquire movie and music distribution service information and then store the information in a data area of the memory 31.

The flow of the control program then goes on to a next step S72 at which necessary music data is determined on the basis of the movie and music distribution service information stored in the memory 31. The flow of the control program then goes on to a next step S73 at which the communication control unit 22 is driven by a signal generated by the operation control unit 24 to issue a request for transmission of data such as the more detailed movie and music distribution service information to the server 4 by way of the network 3 when the user needs more detailed movie and music distribution service information, wants to listen to a piece of music on a trial basis, wants to see a music clip or wants to do something else.

The flow of the control program then goes on to a next step S74 at which the communication control unit 22 is driven to issue a request for transmission of the music data to the server 4 by way of the network 3 in accordance with an operation carried out typically on the input unit 23 when the user finds a desired piece of music and wants music data of the desired music.

The flow of the control program then goes on to a next step S75 at which the communication control unit 22 is driven to receive the music data transmitted by the server 4 by way of the network 3 and present the data to the user. Then, the processing is ended.

As described above, the set top box 1 is capable of receiving movie and music distribution service information transmitted by the server 4 by way of the network 3, determining desired music data based on the received movie and music distribution service information, receiving the music data transmitted by the server 4 by way of the network 3 and presenting the data to the user.

Figure 30:
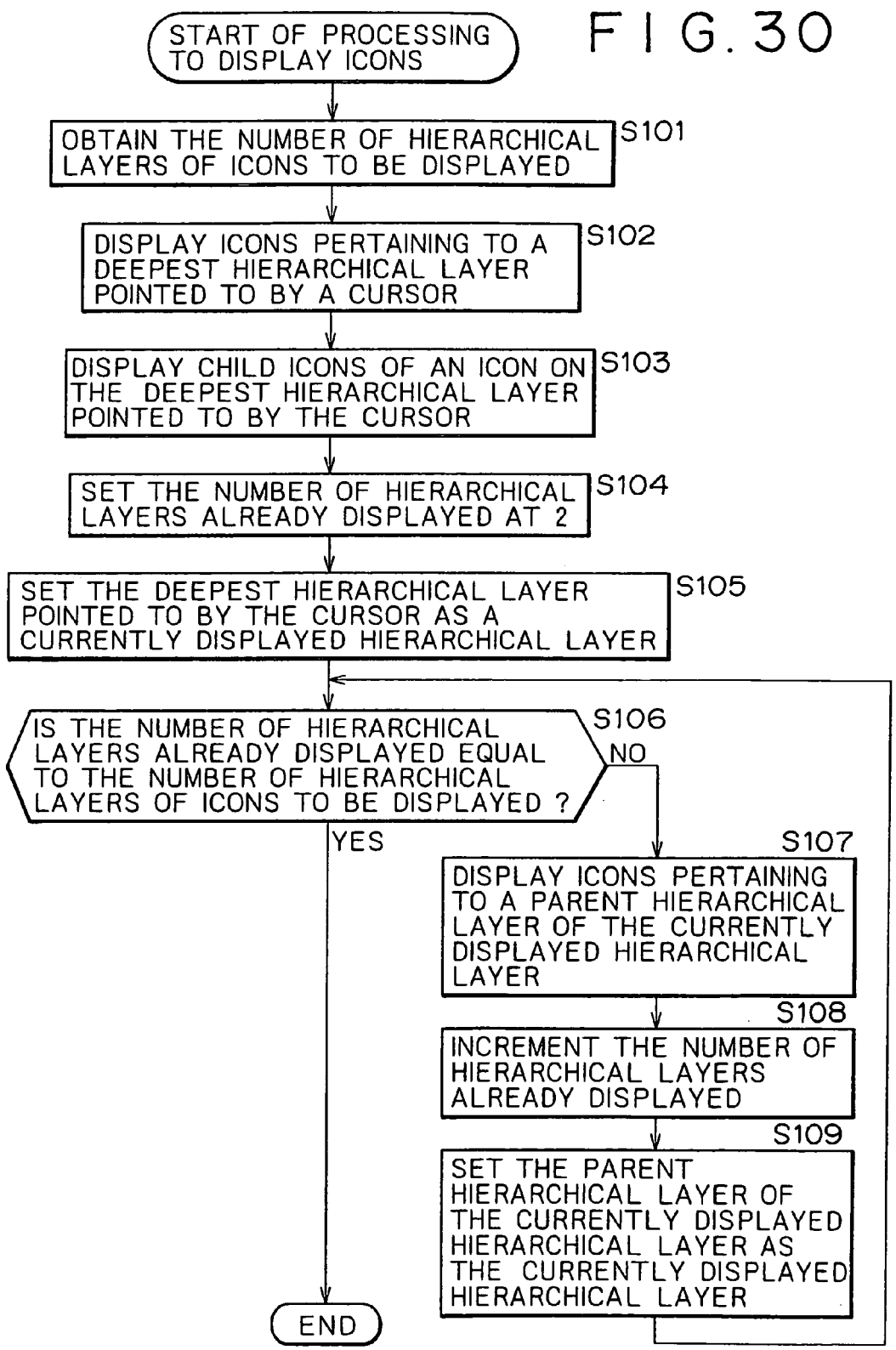
FIG. 30 shows a flowchart used for explaining processing to display icons.

The following description explains processing carried out by the CPU 51 employed in the internal control unit 25 by execution of the control program stored in the control-program area in the memory 31 to display icons 71 by referring to a flowchart shown in FIG. 30.

As shown in the figure, the flowchart begins with a step S101 at which the control program is executed to read in the number of hierarchical layers of icons 71 to be displayed on the monitor apparatus 8 from a data area of the memory 31. As described earlier, the number of hierarchical layers is set on the screen shown in FIG. 25. The flow of the control program then goes on to a next step S102 at which the graphics-display-signal-forming unit 29 is driven to display icons 71 pertaining to a deepest hierarchical layer specified by the cursor 81 on the monitor apparatus 8.

The flow of the control program then goes on to a next step S103 to drive the graphics-display-signal-forming unit 29 to display icons 71, which are child icons of an icon 71 specified by the cursor 81 on the deepest hierarchical layer, on the monitor apparatus 8.

The flow of the control program then goes on to a next step S104 at which the number of already displayed hierarchical layers is set at 2. The flow of the control program then goes on to a next step S105 at which the deepest hierarchical layer specified by the cursor 81 is taken as a currently displayed hierarchical layer.

The flow of the control program then goes on to a next step S106 to form a judgment as to whether or not the number of already displayed hierarchical layers is equal to the number of hierarchical layers of icons 71 to be displayed on the monitor apparatus 8 read in at the step S101. If the outcome of the judgment indicates that the number of already displayed hierarchical layers is not equal to the number of hierarchical layers of icons 71 to be displayed on the monitor apparatus 8, the flow of the control program goes on to a next step S107 at which the graphics-display-signal-forming unit 29 is driven to display icons 71 pertaining to the parent hierarchical layer of the currently displayed hierarchical layer on the monitor apparatus 8.

The flow of the control program then goes on to a next step S108 at which the number of already displayed hierarchical layers is incremented. Then, the flow of the control program then goes on to a next step S109 at which the parent hierarchical layer of the currently displayed hierarchical layer is set as the currently displayed hierarchical layer. The flow of the control program then goes back to the step S106 to again form a judgment as to whether or not the number of already displayed hierarchical layers is equal to the number of hierarchical layers of icons 71 to be displayed on the monitor apparatus 8 read in at the step S101.

If the outcome of the judgment formed at the step S106 indicates that the number of already displayed hierarchical layers is equal to the number of hierarchical layers of icons 71 to be displayed on the monitor apparatus 8, on the other hand, the processing is ended. This is because all hierarchical layers of icons 71 to be displayed have already appeared on the monitor apparatus 8.

As described above, the set top box 1 displays as many hierarchical layers on the monitor apparatus 8 as indicated by the number of hierarchical layers of icons 71 to be displayed set on the screen shown in FIG. 25.

Figure 31:
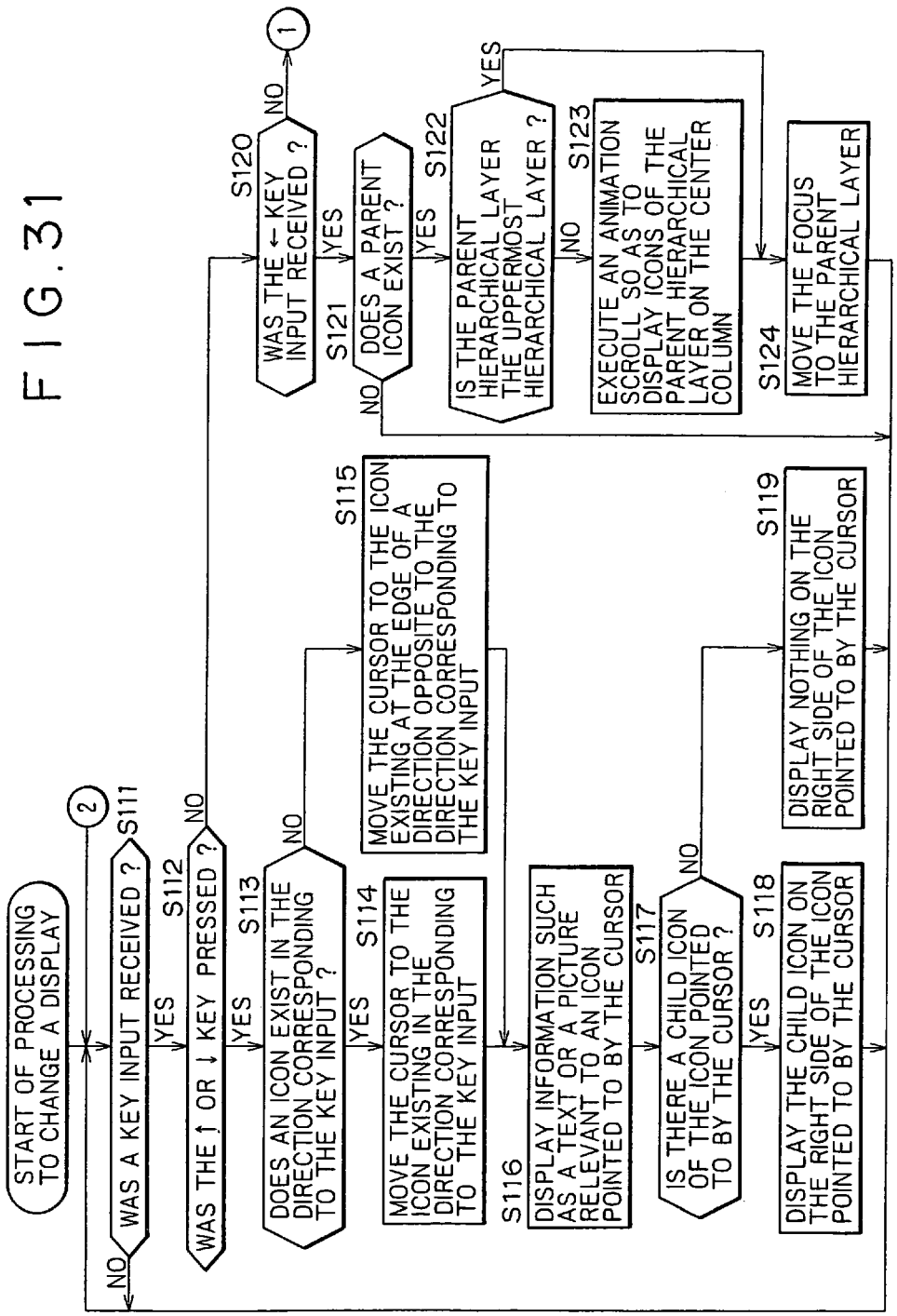
FIG. 31 shows a flowchart used for explaining processing to change a screen display.
Figure 32:
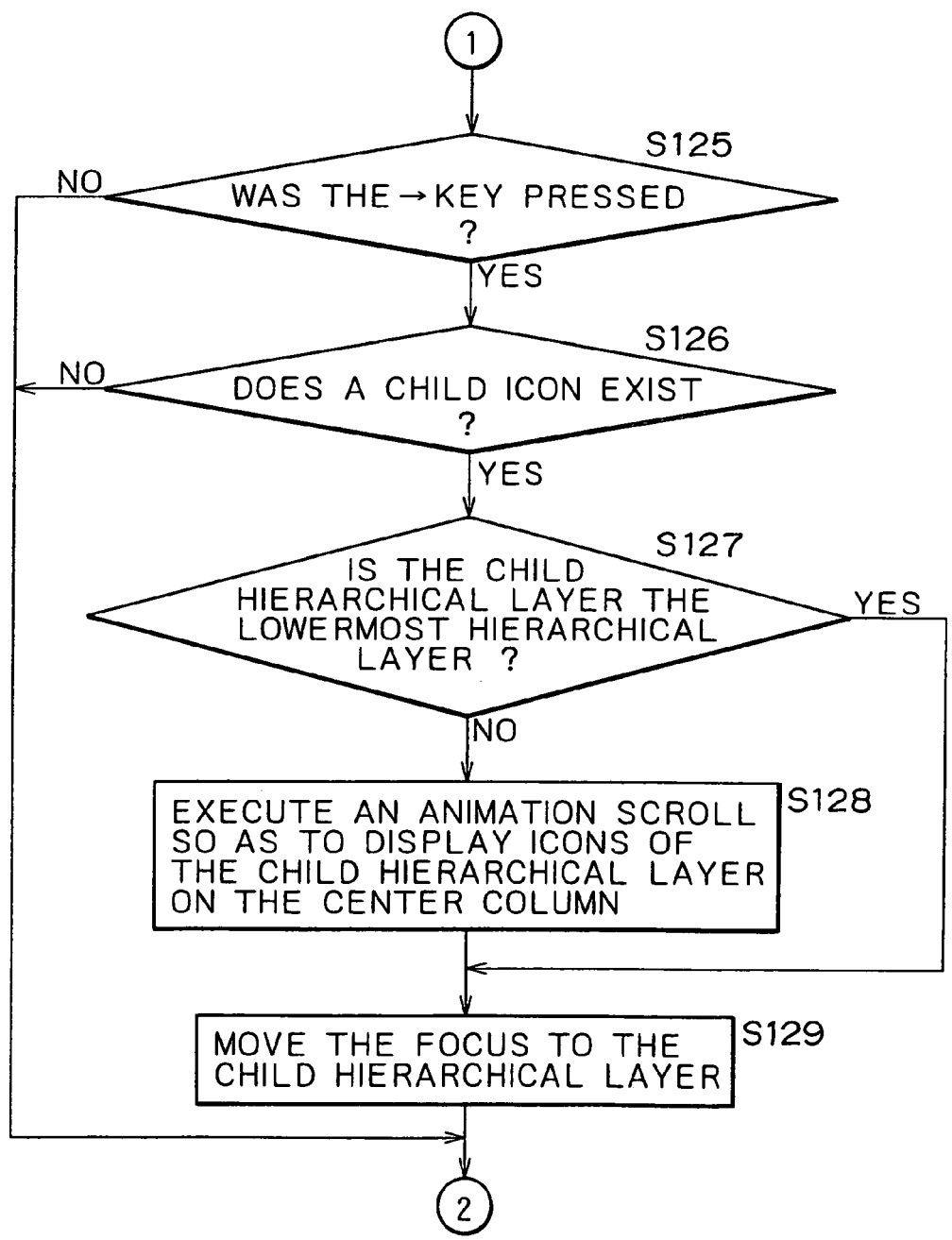
FIG. 32 shows a flowchart used for explaining other processing to change a screen display.

The following description explains processing carried out by the CPU 51 employed in the internal control unit 25 by execution of the control program stored in the control-program area in the memory 31 to change a display of icons 71 by referring to a flowchart shown in FIGS. 31 and 32. As shown in the figures, the flowchart begins with a step S111 at which the control program is executed to form a judgment as to whether or not a signal supplied by the operation control unit 24 is a key input entered by operating the input unit 23 or the remote commander 5. The judgment is formed at the step S111 repeatedly till a key input is entered via the input unit 23 or the remote commander 5.

As the outcome of the judgment formed at the step S111 indicates existence of a key input entered via the input unit 23 or the remote commander 5, the flow of the control program goes on to a step S112 to form a judgment as to whether or not the signal supplied by the operation control unit 24 represents an operation of the "↑" or "↓" key of the input unit 23 or an operation of the button 43 of the remote commander 5 in a direction indicated by the arrow B or D shown in FIG. 2. If the outcome of the judgment indicates that the signal supplied by the operation control unit 24 represents an operation of the "↑" or "↓" key of the input unit 23 or an operation of the button 43 of the remote commander 5 in a direction indicated by the arrow B or D shown in FIG. 2, the flow of the control program goes on to a step S113.

At the step S113 of the control program, a signal supplied by the internal control unit 25 to the graphics-display-signal-forming unit 29 is examined to form a judgment as to whether or not an icon 71 exists at an adjacent icon position in the upward direction relative to an icon 71 specified by the cursor 81 on a hierarchical layer serving as a target of focused attention for an operation of the "↑" key of the input unit 23 or an operation of the button 43 of the remote commander 5 in a direction indicated by the arrow D shown in FIG. 2, or an icon 71 exists at an adjacent icon position in the downward direction for an operation of the "↓" key of the input unit 23 or an operation of the button 43 of the remote commander 5 in a direction indicated by the arrow B shown in FIG. 2. If the outcome of the judgment indicates that an icon 71 exists at an adjacent icon position in a direction corresponding to the operation of the key of the input unit 23 or the button 43, the flow of the control program goes on to a step S114 at which the cursor 81 is moved to the icon existing in the direction. Then, the flow of the control program goes on to a step S116.

If the outcome of the judgment formed at the step S113 indicates that an icon 71 does not exist at an adjacent icon position in a direction corresponding to the operation of the key of the input unit 23 or the button 43, on the other hand, the flow of the control program goes on to a step S115 at which the cursor 81 is moved to an icon 71 at the end of a direction opposite to the direction corresponding to the operation of the key of the input unit 23 or the button 43. Then, the flow of the control program goes on to the step S116.

At the step S116 of the control program, a string of characters, a text and a picture associated with the icon 71 specified by the cursor 81 are displayed on the fields 72, 73 and 74 respectively.

Then, the flow of the control program goes on to a step S117 to form a judgment as to whether or not child icons 71 of the icon 71 specified by the cursor 81 exist. If the outcome of the judgment indicates that child icons 71 of the icon 71 specified by the cursor 81 exist, the flow of the control program goes on to a step S118 at which the child icons 71 are displayed on the right-hand side of the icon 71 specified by the cursor 81. The flow of the control program then goes back to the step S111 to repeat the processing.

If the outcome of the judgment formed at the step S117 indicates that a child icon 71 of the icon 71 specified by the cursor 81 does not exist, on the other hand, the flow of the control program goes on to a step S119 at which none is displayed on the right-hand side of the icon 71 specified by the cursor 81. The flow of the control program then goes back to the step S111 to repeat the processing.

If the outcome of the judgment formed at the step S112 indicates that the signal supplied by the operation control unit 24 does not represent an operation of the "↑" or "↓" key of the input unit 23 or an operation of the button 43 of the remote commander 5 in a direction indicated by the arrow B or D shown in FIG. 2, on the other hand, the flow of the control program goes on to a step S120 to form a judgment as to whether the signal supplied by the operation control unit 24 represents an operation of the "←" key of the input unit 23 or an operation of the button 43 of the remote commander 5 in a direction indicated by the arrow C shown in FIG. 2. If the outcome of the judgment formed at the step S120 indicates that the signal supplied by the operation control unit 24 represents an operation of the "←" key of the input unit 23 or an operation of the button 43 of the remote commander 5 in a direction indicated by the arrow C shown in FIG. 2, the flow of the control program goes on to a step S121.

At the step S121 of the control program, a signal supplied by the internal control unit 25 to the graphics-display-signal-forming unit 29 is examined to form a judgment as to whether or not a parent icon 71 of the icon 71 on a hierarchical layer serving as a target of focused attention exists. If the outcome of the judgment indicates that a parent icon 71 of the icon 71 on the hierarchical layer serving as a target of focused attention exists, the flow of the control program goes on to a step S122 to form a judgment as to whether or not the parent hierarchical layer of the hierarchical layer serving as a target of focused attention is a hierarchical layer at the highest level of the icon hierarchy.

If the outcome of the judgment formed at the step S122 indicates that the parent hierarchical layer of the hierarchical layer serving as a target of focused attention is not a hierarchical layer at the highest level of the icon hierarchy, the flow of the control program goes on to a step S123 at which an animation scroll is carried out to display icons 71 of the parent hierarchical layer on the middle column of icons 71 among 3 columns appearing on the screen. Then, the flow of the control program goes on to a step S124.

If the outcome of the judgment formed at the step S122 indicates that the parent hierarchical layer of the hierarchical layer serving as a target of focused attention is a hierarchical layer at the highest level of the icon hierarchy, on the other hand, the flow of the control program goes on directly to the step S124, skipping the step S123. This is because an animation scroll operation cannot be carried out.

At the step S124 of the control program, the focus of attention is shifted to the parent hierarchical layer. The flow of the control program then goes back to the step S111 to repeat the processing.

If the outcome of the judgment formed at the step S121 indicates that a parent icon 71 of the icon 71 on the hierarchical layer serving as a target of focused attention does not exist, on the other hand, the flow of the control program goes back to the step S111 to repeat the processing. This is because the focus of attention cannot be shifted to a non-existent parent hierarchical layer.

If the outcome of the judgment formed at the step S120 indicates that the signal supplied by the operation control unit 24 represents neither an operation of the "←" key of the input unit 23 nor an operation of the button 43 of the remote commander 5 in a direction indicated by the arrow C shown in FIG. 2, on the other hand, the flow of the control program goes on to a step S125 of the flowchart shown in FIG. 32 to form a judgment as to whether the signal supplied by the operation control unit 24 represents an operation of the "→" key of the input unit 23 or an operation of the button 43 of the remote commander 5 in a direction indicated by the arrow A shown in FIG. 2. If the outcome of the judgment formed at the step S120 indicates that the signal supplied by the operation control unit 24 represents an operation of the "→" key of the input unit 23 or an operation of the button 43 of the remote commander 5 in a direction indicated by the arrow A shown in FIG. 2, the flow of the control program goes on to a step S126.

At the step S126 of the control program, a signal supplied by the internal control unit 25 to the graphics-display-signal-forming unit 29 is examined to form a judgment as to whether or not child icons 71 of an icon 71 specified by the cursor 81 exist. If the outcome of the judgment indicates that child icons 71 of the icon 71 specified by the cursor 81 exist, the flow of the control program goes on to a step S127 to form a judgment as to whether or not a child hierarchical layer of the hierarchical layer serving as a target of focused attention is a hierarchical layer at the lowest level of the icon hierarchy.

If the outcome of the judgment formed at the step S127 indicates that the child hierarchical layer of the hierarchical layer serving as a target of focused attention is not a hierarchical layer at the lowest level of the icon hierarchy, the flow of the control program goes on to a step S128 at which an animation scroll is carried out to display icons 71 of the child hierarchical layer on the middle column of icons 71 among 3 columns appearing on the screen. Then, the flow of the control program goes on to a step S129.

If the outcome of the judgment formed at the step S127 indicates that the child hierarchical layer of the hierarchical layer serving as a target of focused attention is a hierarchical layer at the lowest level of the icon hierarchy, on the other hand, the flow of the control program goes on directly to the step S129, skipping the step S128. This is because an animation scroll operation cannot be carried out.

At the step S129 of the control program, the focus of attention is shifted to the child hierarchical layer. The flow of the control program then goes back to the step S111 to repeat the processing.

If the outcome of the judgment formed at the step S126 indicates that a child icon 71 of the icon 71 on the hierarchical layer serving as a target of focused attention does not exist, on the other hand, the flow of the control program goes back to the step S111 to repeat the processing. This is because the focus of attention cannot be shifted to a non-existent child hierarchical layer.

If the outcome of the judgment formed at the step S125 indicates that the signal supplied by the operation control unit 24 represents neither an operation of the "→" key of the input unit 23 nor an operation of the button 43 of the remote commander 5 in a direction indicated by the arrow A shown in FIG. 2, on the other hand, the flow of the control program goes back to the step S111 to repeat the processing. This is because there is no command to change the display.

As described above, the set top box 1 is capable of displaying icons 71 and a string of characters, a text and a picture associated with a specific icon 71 indicated by the cursor 81.

In this way, by merely operating the "↑", "↓", "∆" and "←" keys of the input unit 23 or the button 43 of the remote commander 5, the user is capable of driving the set top box 1 to display a string of characters, a text and a picture for a desired content, to play back a desired content for trial listening and to download a desired content.

It should be noted that, while the set top box 1 displays icons 71 pertaining to the same hierarchical layer as an array on a column as described above, such icons 71 can also be displayed on a row.

In addition, the set top box 1 is also capable of displaying not only icons 71 of the parent hierarchical layer of a hierarchical layer serving as a target of focused attention but also icons 71 of all ancestor hierarchical layers.

The sequence of processes described above can be carried out by hardware or software. If software is used for carrying out the sequence of processes, programs constituting the software are installed from a program storage medium into a computer built in dedicated hardware or typically into a general-purpose personal computer. By installing a variety of programs into a general-purpose personal computer, the personal computer is made capable of executing a variety of functions.

Figure 33:
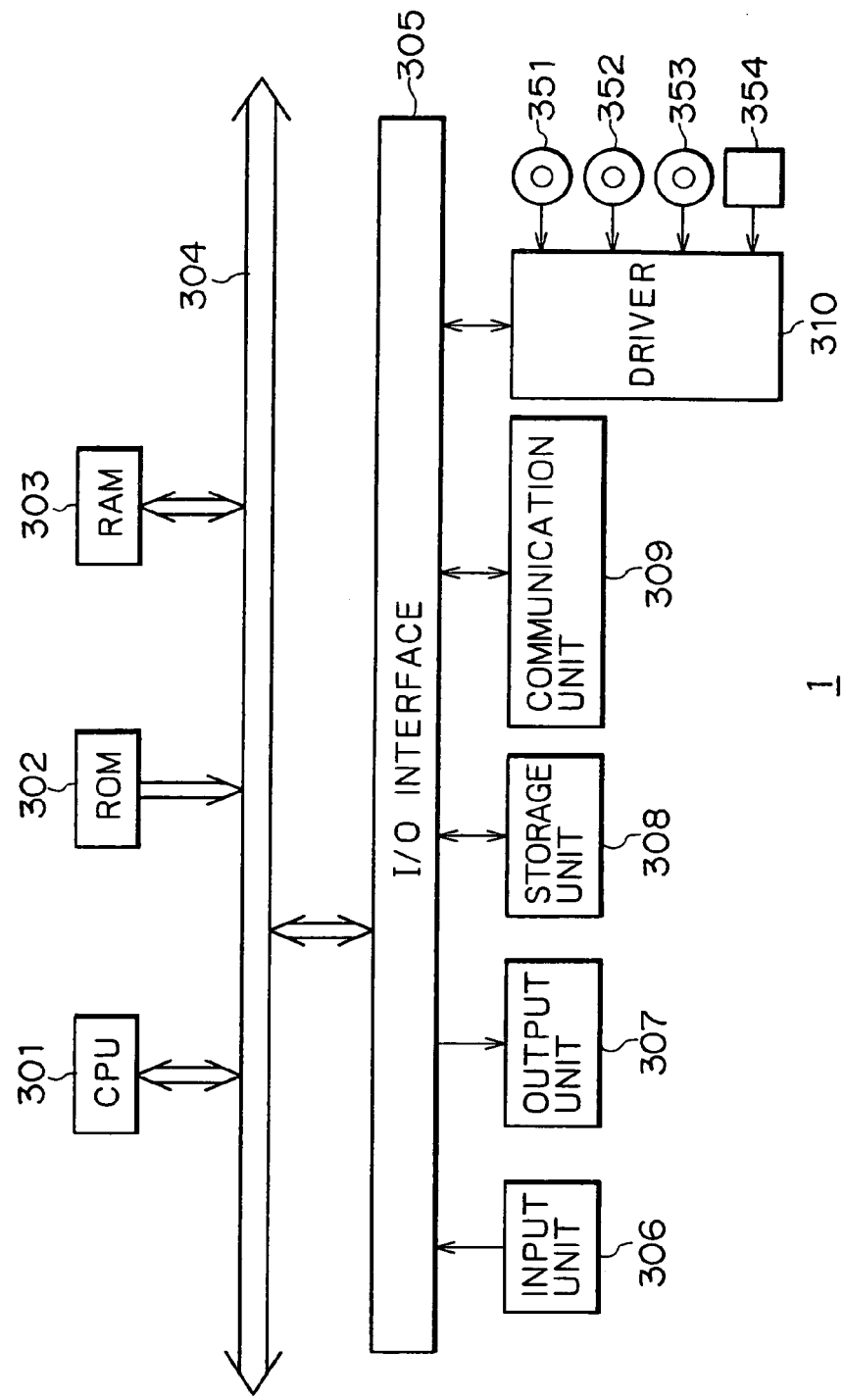
FIG. 33 is a block diagram showing a configuration of the set top box including program storage media.

FIG. 33 is a block diagram showing the configuration of the set top box 1 in another way to include program storage media. As shown in FIG. 33, typical program storage media for storing programs put in a state of being readily installable and executable by a computer include not only a magnetic disc 351 including a floppy disc, an optical disc 352 including a CD-ROM (Compact Disc Read Only Memory and a DVD (Digital Versatile Disc), a magneto-optical disc 353 including an MD (Mini-Disc) and packaged media such as a semiconductor memory 354, but also a ROM 302 for storing programs and a hard disc included in a storage unit 308. A ROM 302 and a storage unit 308 are presented to the user by typically including them in a computer in advance.

A CPU 301 shown in FIG. 33 corresponds to the internal control unit 25 shown in FIG. 1. The CPU 301 executes a program stored in the ROM 302 or a program loaded into a RAM 303 in order to control the set top box 1 as a whole and carry out the sequence of processes described above. Programs executed by the CPU 301 thus include a control program. The ROM 302 is used for storing the programs including the control program and constant parameters required in the execution of the programs.

On the other hand, the RAM 303 is used as a memory for loading a program such as the control program to be executed by the CPU 301 and used for storing parameters with values thereof changing during the execution of the program.

An input unit 306 shown in FIG. 33 corresponds to the input unit 23 and the operation control unit 24 shown in FIG. 1. The input unit 306 typically includes a keyboard to be operated by the user. The input unit 306 outputs a signal representing an operation carried out by the user to an I/O interface 305. An output unit 307 corresponds to the video-signal-processing unit 26, the audio-signal-processing unit 27 or the video mix unit 28 shown in FIG. 1. The output unit 307 outputs a signal conveying a picture or a voice or a sound based on data supplied by the input unit 306 by way of the I/O interface 305.

The storage unit 308 includes typically a hard disc used for storing the programs including the control program and constant parameters required in the execution of the programs.

The ROM 302, the RAM 303 or the storage unit 308 corresponds to the memory 31 shown in FIG. 1.

A communication unit 309 shown in FIG. 33 corresponds to the tuner 21, the communication control unit 22 or the home-network I/O control unit 30 shown in FIG. 1. The communication unit 309 receives data transmitted to the set top box 1 by way of a network or through wire or wireless communication. The communication unit 309 also transmits a request for transmission of data to an apparatus such as the server 4.

A drive 310 shown in FIG. 33 drives a magnetic disc 351, an optical disc 352, a magneto-optical disc 353 or a semiconductor memory 35.4 mounted thereon in order to read out a program or data from the magnetic disc 351, the optical disc 352, the magneto-optical disc 353 or the semiconductor memory 354 and reversely write data into the magnetic disc 351, the optical disc 352, the magneto-optical disc 353 or the semiconductor memory 354.

The I/O interface 305 shown in FIG. 33 supplies data received from the input unit 306, the storage unit 308, the communication unit 309 or the drive 310 to the CPU 301 or the RAM 303 by way of the bus 304, and reversely supplies data from the CPU 301, the ROM 302 or the RAM 303 to the output unit 307, the storage unit 308, the communication unit 309 or the drive 310 by way of a bus 304.

The bus 304 transfers data exchanged among the CPU 301, the ROM 302, the RAM 303 and the I/O interface 305.

In this specification, steps composing a program stored in a storage medium are executed sequentially along the time axis one after another in accordance with an order the steps are described in the program. It should be noted that a program may of course comprise processes executed individually in parallel instead of steps to be executed sequentially along the time axis.

In this specification, a hardware and software system represents an entire apparatus comprising a plurality of units.

In the information-processing apparatus, the information-processing method and the program stored in the recording medium, according to the present invention, a display of an icon hierarchy including a plurality of first icons on a first hierarchical layer, a plurality of second icons on a second hierarchical layer at a level lower than the first hierarchical layer, a plurality of third icons on a third hierarchical layer at a level lower than the second hierarchical layer and a plurality of fourth icons on a fourth hierarchical layer at a level higher than the first hierarchical layer is controlled so as to exhibit an array of the first icons as a column or a row on a screen and an array of the second icons as another column or another row on the screen wherein: the number of first icons displayed on the screen and the number of second icons displayed on the screen are determined by the size of a display area on the screen; and the array of the first icons and the array of the second icons are displayed on the screen to form an array hierarchical structure; a desired icon is specified among the first or second icons displayed in the array hierarchical structure; and the array hierarchical structure displayed on the screen is changed so as to: display the third icons to replace the second icons in the array hierarchical structure on the screen and display the second icons to replace the first icons in the array hierarchical structure on the screen when the icon-specifying means specifies one of the second icons in the array hierarchical structure; display the fourth icons to replace the third icons in the array hierarchical structure on the screen, display the third icons to replace the second icons in the array hierarchical structure on the screen and display the second icons to replace the first icons in the array hierarchical structure on the screen when the icon-specifying means specifies one of the third icons in the array hierarchical structure.

As a result, the user is capable of searching information for a desired content with ease even if the user is not familiar with operations.

While a preferred embodiment of the present invention has been described using specific terms, such description is for illustrative purposes only, and it is to be understood that changes and variations may be made without departing from the spirit or scope of the following claims.

What is claimed is:

1. An information-processing apparatus comprising:
    icon-specifying means for specifying a desired icon from icons displayed in an array hierarchical structure;
    a first display control means for controlling a display of an icon hierarchy including a plurality of first icons on a first hierarchical layer, a plurality of second icons on a second hierarchical layer at a level lower than said first hierarchical layer, a plurality of third icons on a third hierarchical layer at a level lower than said second hierarchical layer and a plurality of fourth icons on a fourth hierarchical layer at a level lower than said third hierarchical layer so as to exhibit an array of said first icons as a column or a row on a screen and an array of said second icons as another column or another row on said screen wherein:
    the number of said first icons displayed on said screen and the number of said second icons displayed on said screen are determined by the size of a display area on said screen; and
    said array of said first icons, said array of said second icons and said array of said third icons are displayed on said screen to form an array hierarchical structure when said icon-specifying means specifies one of said second icons in said array hierarchical structure:
    second display control means for changing said array hierarchical structure displayed on said screen so as to:
    display said second icons to replace said first icons in said array hierarchical structure on said screen, display said third icons to replace said second icons in said array hierarchical structure on said screen and display said fourth icons to replace said third icons in said array hierarchical structure on said screen when said icon-specifying means specifies one of said third icons in said array hierarchical structure; and
    layer-count-acquiring means for acquiring the number of hierarchical layers to be displayed wherein said first control means is capable of controlling said display so as to exhibit icons pertaining to as many hierarchical layers as indicated by said number of hierarchical layers to be displayed, which is acquired by said layer-count-acquiring means.

2. An information-processing apparatus according to claim 1 wherein said first to fourth icons each represents a content or a class of a content.

3. An information-processing apparatus according to claim 2, said apparatus further having reception means for receiving a content, a content class or information relevant to a content or relevant to a hierarchical layer of contents.

4. An information-processing apparatus according to claim 3, said apparatus further having third display control means for controlling said display so as to exhibit information relevant to an icon specified by said icon-specifying means or information relevant to a hierarchical layer to which said specified icon pertains.

5. An information-processing apparatus according to claim 1, said apparatus further having fourth display control means for controlling a display of a picture show a route to one of said second icons.

6. An information-processing apparatus according to claim 1 wherein said first control means is capable of controlling said display so as to scroll said first and second icons when said displayed icons are updated.

7. An information-processing apparatus according to claim 1 wherein said icon specifying means is capable of specifying:
    an icon on a hierarchical layer at a level lower than a hierarchical layer specified by a cursor in accordance with an operation of a predetermined key for a first direction;
    an icon on a hierarchical layer at a level higher than a hierarchical layer specified by said cursor in accordance with an operation of a predetermined key for a second direction; and
    an icon on the same hierarchical layer specified by a cursor in accordance with an operation of a predetermined key for a third or fourth direction.

8. An information-processing method comprises:
    an icon specifying step of specifying a desired icon from icons displayed in array hierarchical structure:
    a first display step of controlling a display of an icon hierarchy including a plurality of first icons on a first hierarchical layer, a plurality of second icons on a second hierarchical layer at a level lower than said first hierarchical layer, a plurality of third icons on a third hierarchical layer at a level lower than said second hierarchical layer and a plurality of fourth icons on a fourth hierarchical layer at a level lower than said third hierarchical layer so as to exhibit an array of said first icons as a column or a row on a screen and an array of said second icons as another column or another row on said screen wherein:
    the number of said first icons displayed on said screen and the number of said second icons displayed on said screen are determined by the size of a display area on said screen; and
    said array of said first icons, said array of said second icons and said array of said third icons are displayed on said screen to form an array hierarchical structure when said icon-specifying means specifies one of said second icons in said array hierarchical structure;
    a second display control step of changing said array hierarchical structure displayed on said screen so as to:
    display said second icons to replace said first icons in said array hierarchical structure on said screen, display said third icons to replace said second icons in said array hierarchical structure on said screen and display said fourth icons to replace said third icons in said array hierarchical structure on said screen when said icon-specifying means specifies one of said third icons in said array hierarchical structure; and
    layer-count acquiring step for acquiring the number of hierarchical layers to be displayed wherein said first control means is capable of controlling said display so as to exhibit icons pertaining to as many hierarchical layers as indicted by said number of hierarchical layers to be displayed, which is acquired by said layer-count-acquiring step.

9. A recording medium for storing a program to be executed by a computer to implement an information-processing method, which comprises:
    an icon specifying control step of specifying a desired icon from icons displayed in an array hierarchical structure;
    a first display control step of controlling a display of an icon hierarchy including a plurality of first icons on a first hierarchical layer, a plurality of second icons on a second hierarchical layer at a level lower said first hierarchical layer, a plurality of third icons on a third hierarchical layer at a level lower than said second hierarchical layer and a plurality of fourth icons on a fourth hierarchical layer at a level lower than said third hierarchical layer so as to exhibit an away of said first icons as a column or a row on a screen and an array of said second icons as another column or another row on said screen wherein:

the number of said first icons displayed on said screen and the number of said second icons displayed on said screen are determined by the size of a display area on said screen; and said array of said first icons, said array of said second icons and said array of said third icons are displayed on said screen to form an array hierarchical structure when said icon-specifying means specifies one of said second icons in said array hierarchical structure;

a second display control step of changing said array hierarchical structure displayed on said screen so as to:

display said second icons to replace said first icons in said array hierarchical structure on said screen, display said third icons to replace said second icons in said array hierarchical structure on said screen and display said fourth icons to replace said third icons in said array hierarchical structure on said screen when said icon-specifying means specifies one of said third icons in said array hierarchical structure; and a layer-count acquiring step of acquiring the number of hierarchical layers to be displayed wherein said first control means is capable of controlling said display so as to exhibit icons pertaining to as many hierarchical layers as indicated by said number of hierarchical layers to be displayed, which is acquired by said layer-count-acquiring step.

\* \* \* \* \*